United States Patent (10) Patent No.: US 10,645,591 B2
Ode et al. (45) Date of Patent: May 5, 2020

(54) WIRELESS COMMUNICATION SYSTEM, COMMUNICATION TERMINAL, BASE STATION AND METHOD FOR CELL CONTROL

(71) Applicant: FUJITSU LIMITED, Kawasaki-shi, Kanagawa (JP)

(72) Inventors: Takayoshi Ode, Yokohama (JP); Shinichiro Aikawa, Yokohama (JP); Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/840,761

(22) Filed: Dec. 13, 2017

(65) Prior Publication Data
US 2018/0103380 A1 Apr. 12, 2018

Related U.S. Application Data

(63) Continuation of application No. PCT/JP2015/069076, filed on Jul. 1, 2015.

(51) Int. Cl.
*H04W 76/18* (2018.01)
*H04W 76/15* (2018.01)
(Continued)

(52) U.S. Cl.
CPC ............. *H04W 16/14* (2013.01); *H04L 5/001* (2013.01); *H04L 5/0053* (2013.01);
(Continued)

(58) Field of Classification Search
CPC ..... H04W 16/14; H04W 76/15; H04W 76/10; H04W 74/0833; H04W 48/10;
(Continued)

(56) References Cited

U.S. PATENT DOCUMENTS

2002/0198977 A1 12/2002 Cho
2007/0223611 A1 9/2007 Ode et al.
(Continued)

FOREIGN PATENT DOCUMENTS

EP 3297351 A1 3/2018
JP 2003-018642 1/2003
(Continued)

OTHER PUBLICATIONS

JPOA—Japanese Office Action dated Oct. 9, 2018 for corresponding Japanese Patent Application No. 2017-525763 with machine translation.

(Continued)

*Primary Examiner* — Hoon J Chung
*Assistant Examiner* — Brian P Cox
(74) *Attorney, Agent, or Firm* — Fujitsu Patent Center

(57) ABSTRACT

A wireless communication system includes: a first base station configured to communicate using a frequency within a licensed band; a plurality of second base stations configured to communicate using a frequency within an unlicensed band; and a communication terminal configured to be able to communicate with the first base station and any of the plurality of second base stations, wherein the communication terminal is further configured to detect first identification information broadcasted from the first base station, the first identification information indicating a first communication network to which the first base station belongs, detect second identification information broadcasted from third base station being any of the plurality of second base stations, the second identification information indicating a second communication network to which the second base stations belong, determine whether to establish a connection with the third base station, in accordance with the first
(Continued)

identification information and the second identification information.

5 Claims, 36 Drawing Sheets

(51) Int. Cl.
| | |
|---|---|
| *H04W 48/10* | (2009.01) |
| *H04W 16/14* | (2009.01) |
| *H04W 72/04* | (2009.01) |
| *H04L 5/00* | (2006.01) |
| *H04L 27/00* | (2006.01) |
| *H04W 76/10* | (2018.01) |
| *H04W 74/08* | (2009.01) |

(52) U.S. Cl.
CPC ........ *H04L 5/0098* (2013.01); *H04L 27/0006* (2013.01); *H04W 48/10* (2013.01); *H04W 72/04* (2013.01); *H04W 74/0833* (2013.01); *H04W 76/10* (2018.02); *H04W 76/15* (2018.02)

(58) Field of Classification Search
CPC .. H04W 72/04; H04L 27/0006; H04L 5/0053; H04L 5/001; H04L 5/0098
See application file for complete search history.

(56) References Cited

U.S. PATENT DOCUMENTS

| | | | |
|---|---|---|---|
| 2010/0008402 A1 | 1/2010 | Sugawara et al. | |
| 2010/0330994 A1 | 12/2010 | Matsuo et al. | |
| 2011/0206032 A1 | 8/2011 | Uemura et al. | |
| 2011/0256868 A1 | 10/2011 | Nogami et al. | |
| 2012/0093112 A1 | 4/2012 | Qu et al. | |
| 2012/0094681 A1 | 4/2012 | Freda et al. | |
| 2013/0077554 A1 | 3/2013 | Gauvreau et al. | |
| 2013/0163543 A1 | 6/2013 | Freda et al. | |
| 2016/0309509 A1* | 10/2016 | Yan | ................... H04W 72/0453 |
| 2017/0295576 A1* | 10/2017 | Fukuta | ................. H04W 16/14 |

FOREIGN PATENT DOCUMENTS

| | | |
|---|---|---|
| JP | 2008-103959 | 5/2008 |
| JP | 2009-207108 | 9/2009 |
| JP | 4515460 | 7/2010 |
| JP | 2013-042258 | 2/2013 |
| JP | 2013-545365 | 12/2013 |
| JP | 2014-529276 | 10/2014 |
| JP | 2015-505436 | 2/2015 |
| WO | 2008/090603 | 7/2008 |
| WO | 2009/020017 | 2/2009 |
| WO | 2010/073468 | 7/2010 |
| WO | WO-2014204360 A1 * 12/2014 | ............ H04W 28/18 |

OTHER PUBLICATIONS

Nokia Networks, "PCI confusion and collision in LAA system", 3GPP TSG-RAN WG2 Meeting #89bis, Bratislava, Slovakia, Apr. 20-24, 2015, XP050936323, Cited in EESR dated May 17, 2018 for corresponding European Patent Application No. 15897178.8.
TR 36.889, V13.0.0 (Jun. 2015), 3rd Generation Partnership Project; Technical Specification Group Radio Access Network; Study on Licensed-Assisted Access to Unlicensed Spectrum; (Release 13) Cited in EESR dated May 17, 2018 for corresponding European Patent Application No. 15897178.8.
EESR—Extended European Search Report dated May 17, 2018 for corresponding European Patent Application No. 15897178.8.
3GPP.TS.36.211.V8.9.0 "3rd Generation Partnership Project; Technical Specification Group Radio Access Network; Evolved Universal Terrestrial Radio Access (E-UTRA); Physical Channels and Modulation (Release 8)" (Dec. 2009), (83 pages).
3GPP.TS.23.003.V8.16.0 3rd Generation Partnership Project; Technical Specification Group Core Network and Terminals; Numbering, addressing and identification (Release 8) (Mar. 2012), (77 pages).
International Search Report and Written Opinion of the International Searching Authority (Form PCT/ISA/220, PCT/ISA/210, Form PCT/ISA/237), mailed in connection with PCT/JP2015/069076 and dated Aug. 25, 2015, with partial English translation (9 pages).
Nokia Corporation et al. "Overview of possible LAA impact to RAN2", 3GPP TSG-RAN WG2 Meeting #89 R2-150188, Feb. 9-13, 2015, Cited in ISR (8 pages).
EPOA—European Office Action dated Jun. 26, 2019 for corresponding European Patent Application No. 15897178.8.

* cited by examiner

FIG. 6

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 |
| 1 | 1 | 2 | 35 | 5 | 7 | 69 | 10 | 13 | 103 | 16 | 20 | 137 | 23 | 28 |
| 2 | 2 | 3 | 36 | 6 | 8 | 70 | 11 | 14 | 104 | 17 | 21 | 138 | 24 | 29 |
| 3 | 3 | 4 | 37 | 7 | 9 | 71 | 12 | 15 | 105 | 18 | 22 | 139 | 25 | 30 |
| 4 | 4 | 5 | 38 | 8 | 10 | 72 | 13 | 16 | 106 | 19 | 23 | 140 | 0 | 6 |
| 5 | 5 | 6 | 39 | 9 | 11 | 73 | 14 | 17 | 107 | 20 | 24 | 141 | 1 | 7 |
| 6 | 6 | 7 | 40 | 10 | 12 | 74 | 15 | 18 | 108 | 21 | 25 | 142 | 2 | 8 |
| 7 | 7 | 8 | 41 | 11 | 13 | 75 | 16 | 19 | 109 | 22 | 26 | 143 | 3 | 9 |
| 8 | 8 | 9 | 42 | 12 | 14 | 76 | 17 | 20 | 110 | 23 | 27 | 144 | 4 | 10 |
| 9 | 9 | 10 | 43 | 13 | 15 | 77 | 18 | 21 | 111 | 24 | 28 | 145 | 5 | 11 |
| 10 | 10 | 11 | 44 | 14 | 16 | 78 | 19 | 22 | 112 | 25 | 29 | 146 | 6 | 12 |
| 11 | 11 | 12 | 45 | 15 | 17 | 79 | 20 | 23 | 113 | 26 | 30 | 147 | 7 | 13 |
| 12 | 12 | 13 | 46 | 16 | 18 | 80 | 21 | 24 | 114 | 0 | 5 | 148 | 8 | 14 |
| 13 | 13 | 14 | 47 | 17 | 19 | 81 | 22 | 25 | 115 | 1 | 6 | 149 | 9 | 15 |
| 14 | 14 | 15 | 48 | 18 | 20 | 82 | 23 | 26 | 116 | 2 | 7 | 150 | 10 | 16 |
| 15 | 15 | 16 | 49 | 19 | 21 | 83 | 24 | 27 | 117 | 3 | 8 | 151 | 11 | 17 |
| 16 | 16 | 17 | 50 | 20 | 22 | 84 | 25 | 28 | 118 | 4 | 9 | 152 | 12 | 18 |
| 17 | 17 | 18 | 51 | 21 | 23 | 85 | 26 | 29 | 119 | 5 | 10 | 153 | 13 | 19 |
| 18 | 18 | 19 | 52 | 22 | 24 | 86 | 27 | 30 | 120 | 6 | 11 | 154 | 14 | 20 |
| 19 | 19 | 20 | 53 | 23 | 25 | 87 | 0 | 4 | 121 | 7 | 12 | 155 | 15 | 21 |
| 20 | 20 | 21 | 54 | 24 | 26 | 88 | 1 | 5 | 122 | 8 | 13 | 156 | 16 | 22 |
| 21 | 21 | 22 | 55 | 25 | 27 | 89 | 2 | 6 | 123 | 9 | 14 | 157 | 17 | 23 |
| 22 | 22 | 23 | 56 | 26 | 28 | 90 | 3 | 7 | 124 | 10 | 15 | 158 | 18 | 24 |
| 23 | 23 | 24 | 57 | 27 | 29 | 91 | 4 | 8 | 125 | 11 | 16 | 159 | 19 | 25 |
| 24 | 24 | 25 | 58 | 28 | 30 | 92 | 5 | 9 | 126 | 12 | 17 | 160 | 20 | 26 |
| 25 | 25 | 26 | 59 | 0 | 3 | 93 | 6 | 10 | 127 | 13 | 18 | 161 | 21 | 27 |
| 26 | 26 | 27 | 60 | 1 | 4 | 94 | 7 | 11 | 128 | 14 | 19 | 162 | 22 | 28 |
| 27 | 27 | 28 | 61 | 2 | 5 | 95 | 8 | 12 | 129 | 15 | 20 | 163 | 23 | 29 |
| 28 | 28 | 29 | 62 | 3 | 6 | 96 | 9 | 13 | 130 | 16 | 21 | 164 | 24 | 30 |
| 29 | 29 | 30 | 63 | 4 | 7 | 97 | 10 | 14 | 131 | 17 | 22 | 165 | 0 | 7 |
| 30 | 0 | 2 | 64 | 5 | 8 | 98 | 11 | 15 | 132 | 18 | 23 | 166 | 1 | 8 |
| 31 | 1 | 3 | 65 | 6 | 9 | 99 | 12 | 16 | 133 | 19 | 24 | 167 | 2 | 9 |
| 32 | 2 | 4 | 66 | 7 | 10 | 100 | 13 | 17 | 134 | 20 | 25 | - | - | - |
| 33 | 3 | 5 | 67 | 8 | 11 | 101 | 14 | 18 | 135 | 21 | 26 | - | - | - |

FIG. 12

| MCC | MNC | BRAND | COMMUNICATION PROVIDER |
|---|---|---|---|
| 440 | 00 | EMOBILE | E-MOBILE |
| 440 | 10 | NTT DOCOMO | NTT DOCOMO |
| 440 | 20 | Soft Bank | SOFTBANK MOBILE |
| 440 | 50 | KDDI | KDDI |
| 440 | 54 | KDDI | KDDI |

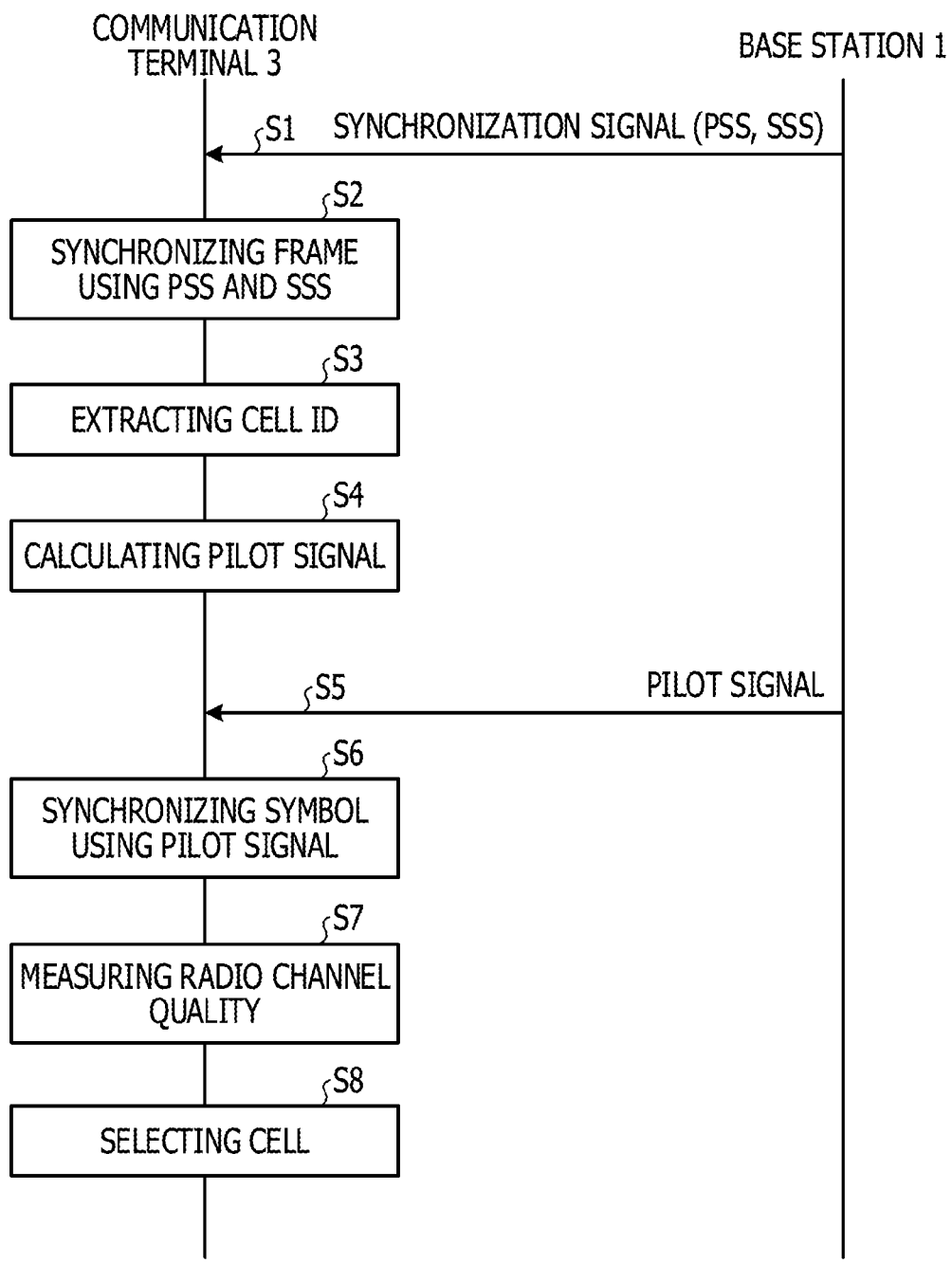

WIRELESS COMMUNICATION SYSTEM, COMMUNICATION TERMINAL, BASE STATION AND METHOD FOR CELL CONTROL

CROSS-REFERENCE TO RELATED APPLICATION

This application is a continuation application of International Application PCT/JP2015/069076 filed on Jul. 1, 2015 and designated the U.S., the entire contents of which are incorporated herein by reference.

FIELD

The present invention relates to a wireless communication system, a communication terminal, a base station, and a method for cell control.

BACKGROUND

Presently, a specification of the LTE-Advanced system, which is an evolved version of the Long Term Evolution (LTE) system, is studied by the 3rd Generation Partnership Project (3GPP). The LTE-Advanced system has, for example, a configuration as described below. Specifically, the LTE-Advanced system includes a base station or a base station device (hereinafter collectively referred to as "base station") called as evolved Node B (eNB), and a communication terminal, terminal, subscriber unit, or terminal device (hereinafter collectively referred to as "communication terminal") called as User Equipment (UE). The base station is a transmission device, a transmitter, or a transmission station that transmits a downlink signal to the communication terminal, and also is a reception device, a receiver, or a reception station that receives an uplink signal from the communication terminal. Likewise, the communication terminal is a reception device, a receiver, or a reception station that receives the downlink signal from the base station, and also is a transmission device, a transmitter, or a transmission station that transmits the uplink signal to the base station. The LTE-Advanced system includes a Mobility Management Entity (MME) which is a controller constituting the core network, and a Serving Gate Way (S-GW) which is a server for transmitting data such as user data. Further, the LTE-Advanced system includes a S1 which is an interface between the MME/S-GW and the eNB, and an X2 which is an interface between eNBs. The S1 and the X2 are interfaces using the GPRS Tunneling Protocol (GTP) based on the Transmission Control Protocol/Internet Protocol (TCP/IP).

Then, the base station forms a cell defined with the frequency and the service area or the communication area, communicates with a communication terminal accommodated in the cell, and communicates with another base station, thereby enabling communication terminals accommodated in the same cell or different cells to communicate with each other.

The LTE system is capable of setting the uplink/downlink bandwidths or system bandwidth to 1.4 MHz, 3 MHz, 5 MHz, 10 MHz, 15 MHz, and 20 MHz. Each of the bands thus set is defined as Component Carrier (hereinafter sometimes referred to as "CC"). The reason why multiple bandwidths may be set as above is that the LTE system is based on the premise that bandwidths allocated to conventional Global Systems for Mobile communications (GSM) (registered trademark) and Wideband Code Division Multiple Access (W-CDMA) are used in the LTE system.

Here, the 3GPP defines the "cell" as "a service area formed using one frequency", that is, "a service area covered by one frequency". One base station has one band only. Further, one cell is formed for one CC, and the cell and the CC or the band are in a one-to-one correspondence. Thus, in the 3GPP, "base station", "cell", "band", and "CC" may be handled as being synonymous with each other. Description below is given based on the above premise. In practice, one base station may use a plurality of bands and include a plurality of sectors (which correspond to cells in the 3GPP). In this case, the technique disclosed herein may be applied in the same manner as described below, unless otherwise specified.

The cell is a band which is segmented from a band allocated to one communication system (for example, W-CDMA system and LTE system) based on a bandwidth (system bandwidth) constituting the system. Thus, user multiplexing or multiple access is available in each band. Further, user multiplexing is possible by allocating a radio resource of the data channel using the band to one or more communication terminals by scheduling. In other words, the cell may constitute one communication system and is different from a block, a resource block, a group, or a cluster into which a plurality of sub-carriers are aggregated as the radio resource allocation unit for user multiplexing in the Orthogonal Frequency-Division Multiple Access (OFDMA).

Here, since the LTE system is desired to achieve a faster transmission than the conventional GSM systems and the W-CDMA systems, the bandwidth is desired to be wider than those of these communication systems. Meanwhile, a band used in the wireless communication system is generally different depending on circumstances of individual countries. Further, in Europe where two or more countries are accessible each other by land and share their border each other, the frequency band in use is adjusted between countries in consideration of the interference. As a result, the number of bandwidths available for the wireless communication system in individual countries is reduced, and the bandwidth is chopped. In view of the problem, a technique of providing a wide band by aggregating narrowed and chopped bands is introduced to achieve a wide band in the LTE system.

As a technique for achieving the wide band, a technique called as Carrier Aggregation (hereinafter alternatively referred to as "CA") is studied for the LTE-Advanced system. The CA is a technique to communicate by simultaneously using a plurality of frequency bands. Specifically, the CA is a technique to communicate between at least one transmission device and at least one reception device simultaneously using a plurality of frequency bands, or a technique to communicate between one transmission device and at least one reception device simultaneously using a plurality of frequency bands. If these are satisfied, the name of the technique for achieving the wide band is not limited to the CA. When data is transmitted using a certain frequency, the frequency used for transmission of data generally has a bandwidth. Therefore, "frequency band" and "frequency" may be synonymous with each other hereinafter.

When implementing the CA, a main cell is established first. The main cell in the CA is called as primary cell. The primary cell is sometimes called as first cell, first band, main band, or main cell. Hereinafter, the primary cell may be referred to as "PCell".

Then, in the CA, the cell is added or aggregated into the PCell. The cell added to the PCell is called as secondary cell. The secondary cell is sometimes called as second band, extended band, or subband. Hereinafter, the secondary cell may be referred to as "SCell".

In the LTE Release 10-12, seven SCells may be established at the maximum in the CA. Specifically, the CA may be achieved by using eight CCs including the PCell at the maximum. Presently, achieving of establishing 32 CCs at the maximum is studied. In other words, the CA is a technique to aggregate the PCell and at least one SCell. The CA is classified depending on whether a frequency of the PCell and a frequency of the SCell is continuous (contiguous/non-contiguous) and whether the frequencies are included in the same frequency band (intra frequency band/inter frequency band). Further, the CA is classified depending on whether control information for data communication using the SCell is transmitted by the SCell (straight scheduling) or by the PCell or another SCell (cross carrier scheduling). Here, the Physical Downlink Shared Channel (PDSCH) being a downlink shared channel is used for data communication using the SCell. On the other hand, the Physical Downlink Control Channel (PDCCH) being a downlink control channel is used for transmission of the control information for data communication using the SCell.

For example, to introduce the CA into a communication system, a cell configuration including the PCell which is a cell having a wider area and the the SCell which is a cell having an area narrower than the PCell is studied. In this cell configuration, at least a portion of the area in the SCell overlaps the PCell. A cell having a wider area may be called as macro cell. A cell having a narrower area may be called as micro cell, pico cell, femtocell, or small cell.

Frequency band used for the cellular system is determined by a decree in consideration of circumstances of individual countries based on the international frequency allocation. The cellular system includes, for example, the Wideband Code Division Multiple Access (W-CDMA) system, the LTE system, the LTE-Advanced system, and the Worldwide interoperability for Microwave Access (WiMAX) (registered trademark) system.

Further, the frequency band used for the cellular system is allocated to communication providers by using, for example, auctions among communication providers. Specifically, a license is granted by designating a used frequency band for each of communication providers, and thereby communication providers are permitted to use the designated frequency band. The frequency band thus permitted to use by the license is called as "licensed band" or "frequency for which a license has to be possessed". In other words, the licensed band is a frequency band of the license system. The licensed band is a frequency band that a specific communication provider permitted to use the licensed band is allowed to use exclusively.

Meanwhile, there is a communication system that is allowed to communicate without the license by communicating with a transmission power equal to or lower than the maximum transmission power specified by the decree. Such communication system is called as specific small power system. Frequency bands such as the Industry Science Medical (ISM) band and the 5 GHz band using a transmission power equal to or lower than the transmission power specified by the decree may be used freely without the license. Such frequency bands that may be used without the license are called "unlicensed band" or "frequency for which a license does not have to be possessed". In other words, the unlicensed band is a frequency band of the non-license system. Thus, since the unlicensed band is a frequency band that may be used freely without the license, exclusive use of the unlicensed band by only specific communication providers is not permitted. In other words, since the unlicensed band may be used freely by all communication providers, exclusive use of the unlicensed band by only specific communication providers is not permitted. Thus, premise of the unlicensed band is temporary use thereof. The communication system using the unlicensed band includes, for example, the Wireless Fidelity (Wi-Fi) system using the ISM band (IEEE 802.11a).

In recent years, licensed bands used for communication are added one by one to cope with increasing communication traffic. For example, a new 3.5 GHz band is added to an existing 1.7 GHz band. However, since frequency resource is finite, increasing licensed band used for communication depletes the number of remaining frequencies. Thus, it is difficult to cope with the increasing communication traffic just by increasing the licensed band used for communication.

To solve the problem, use of the unlicensed band used in the Wi-Fi system in the LTE system and the LTE-Advanced system (cellular system) is studied. In other words, use of the unlicensed band in the LTE system and the LTE-Advanced system in addition to the licensed band is studied.

For example, it is studied that in implementing the CA, the licensed band in the LTE system is used as the PCell and the unlicensed band in the Wi-Fi system is used as the SCell (first study). According to the first study, the CA is implemented by simultaneously using multiple Radio Access Technologies (RATs) different from each other: the LTE and the Wi-Fi. Communication simultaneously using multiple RATs different from each other may be called as system aggregation. In the 3GPP, the first study is under way as a dual connectivity using the LTE and the Wi-Fi.

For example, it is studied that in implementing the CA, the licensed band in the LTE system is used as the PCell and an unlicensed band to which the LTE-Advance system is applied is used as the SCell (second study). In the 3GPP, the second study is under way as the Licensed-Assisted Accessing in LTE (LAA).

Further, control to use the unlicensed band as the SCell by the licensed band used as the PCell may be called as licensed assisted.

Examples of the related art include Japanese Laid-open Patent Publication No. 2003-018642, No. 2008-103959, No. 2009-207108, and No. 2013-042258, Japanese National Publication of International Patent Application No. 2013-545365, No. 2014-529276, and No. 2015-505436, Japanese Patent No. 4515460, International Publication Pamphlet No. WO 2008/090603, No. WO 2009/020017, and No. WO 2010/073468, Non Patent Literature 1: TS36.211V8.9.0 "3rd Generation Partnership Project; Technical Specification Group Radio Access Network; Evolved Universal Terrestrial Radio Access (E-UTRA); Physical Channels and Modulation (Release 8)", and Non Patent Literature 2: TS23.003V8.16.0 "3rd Generation Partnership Project; Technical Specification Group Core Network and Terminals; Numbering, addressing and identification (Release 8)."

SUMMARY

According to an aspect of the invention, a wireless communication system includes: a first base station configured to communicate using a frequency within a licensed band; a plurality of second base stations configured to communicate using a frequency within an unlicensed band; and a communication terminal configured to be able to communicate with the first base station and any of the plurality of second base stations, wherein the communication terminal is further configured to detect first identification information broadcasted from the first base station, the first identification information indicating a first communication network to which the first base station belongs, detect second identification information broadcasted from third base station being any of the plurality of second base stations, the second identification information indicating a second communication network to which the second base stations belong, determine whether to establish a connection with the third base station, in accordance with the first identification information and the second identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a mapping table.

FIG. 12 is a diagram illustrating an example of a MCC and a MNC in Japan.

FIG. 17 is a diagram illustrating an example of a sequence of synchronization and radio channel quality measurement according to the first embodiment.

DESCRIPTION OF EMBODIMENTS

In both of the above first and second studies, the licensed band is used as the PCell of the CA, and the unlicensed band is used as the SCell of the CA. Since exclusive use of the unlicensed band by only specific communication providers is not permitted, the SCell is preferably established dynamically when the unlicensed band is used as the SCell of the CA. A "cell ID" specific to each of cells is set to each cell for identification, and a cell ID is also set to the PCell and the SCell. As described below, the cell ID may be derived from a synchronization signal that the communication terminal receives from the base station. In other words, the cell ID and the synchronization signal are in a one-to-one correspondence.

Figure 1:
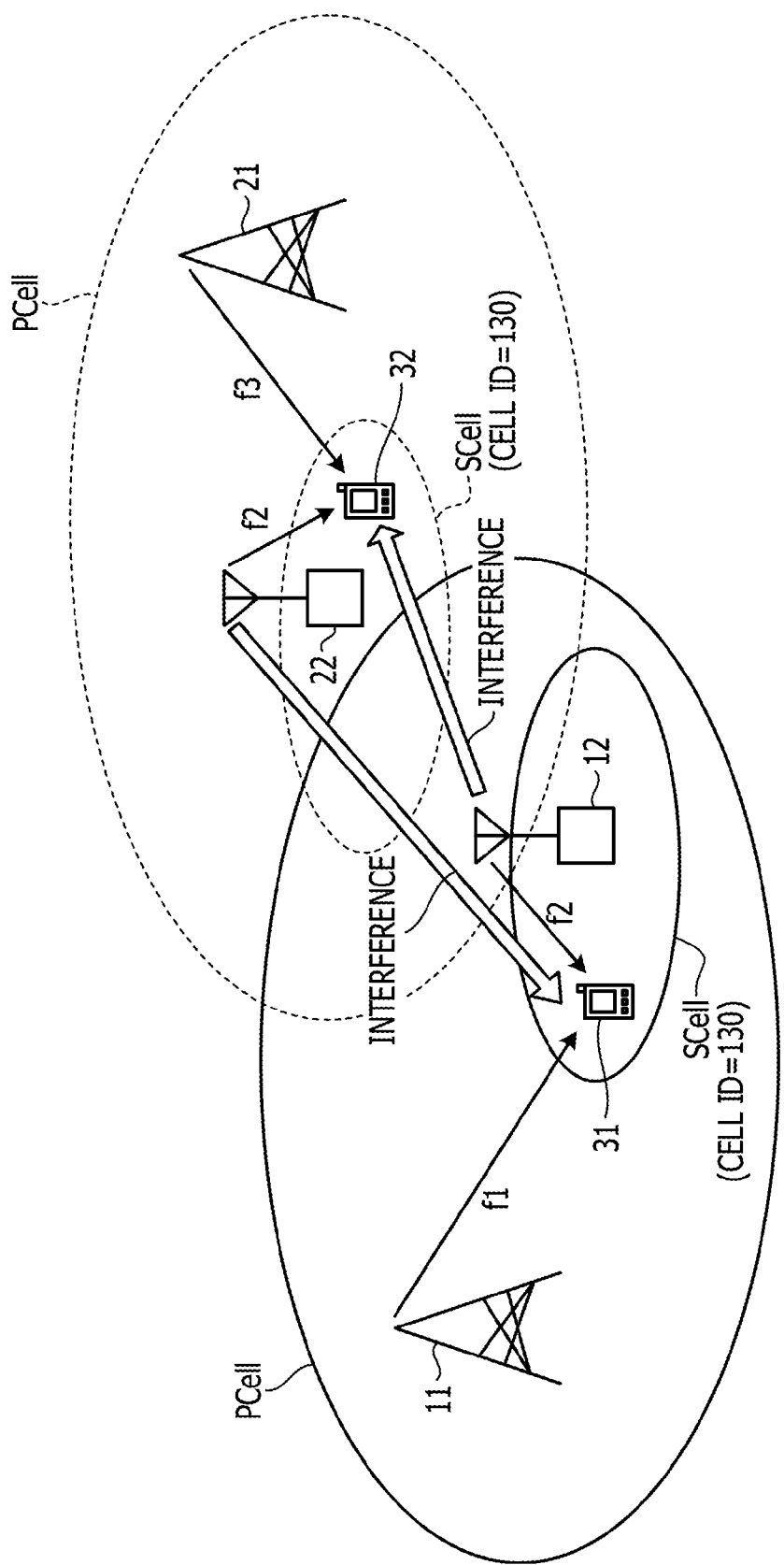
FIG. 1 is a diagram for illustrating the problems.

FIG. 1 is a diagram for illustrating the technical problems. In FIG. 1, base stations 11 and 12 are base stations of a communication provider A, while base stations 21 and 22 are base stations of a communication provider B. The A company and the B company are communication providers different from each other. The base station 11 forms the PCell as the licensed band (licensed band f1) of a frequency f1, and the base station 12 forms the SCell as the unlicensed band (unlicensed band f2) of a frequency f2. In other words, the base stations 11 and 12 implement the CA of the A company to a communication terminal 31 on which a communication service has been contracted with the A company. Meanwhile, the base station 21 forms the PCell as the licensed band (licensed band f3) of a frequency f3, and the base station 22 forms the SCell as the unlicensed band (unlicensed band f2) of a frequency f2. In other words, the base stations 21 and 22 implement the CA of the B company to a communication terminal 32 on which a communication service has been contracted with the B company. The frequencies f1, f2, and f3 are frequencies different from each other.

Communication networks are organized for each of communication providers, and organized communication networks are different from each other depending on the communication provider. For example, a communication network organized by the A company and a communication network organized by the B company are communication networks different from each other, and the base stations 11 and 12 are included in the communication network organized by the A company, while the base stations 21 and 22 are included in the communication network organized by the B company. One communication provider may organize one or more communication networks. To identify individual communication networks, "network identification information" that uniquely identifies the communication network is typically assigned to each of individual communication networks.

Here, the cell ID may be uniquely and freely set by the communication provider. Thus, in FIG. 1, it is supposed that the A company sets a cell ID of "130" to the SCell of the unlicensed band f2, while in the same manner as the A company, the B company sets a cell ID of "130" to the SCell of the unlicensed band f2. In this case, a synchronization signal transmitted from the base station 12 and a synchronization signal transmitted from the base station 22 are identical with each other. In other words, it is supposed that mutually neighboring SCells have the same cell ID and the same synchronization signal. In this case, communication terminals 31 and 32 are difficult to determine whether the SCell having the cell ID "130" is a SCell of the A company or a SCell of the B company. Therefore, communication terminals 31 and 32 respectively measure a mixture of the radio channel quality of the SCell of the A company and the radio channel quality of the SCell of the B company as radio channel quality of one SCell. In other words, communication terminals 31 and 32 are unable to accurately measure the radio channel quality of the SCell. If the radio channel quality of the SCell is not measured accurately, implementation of the CA is difficult.

A frequency of the SCell formed by the base station 12 and a frequency of the SCell formed by the base station 22 are the same unlicensed band f2. Thus, when a distance from the base station 12 to the communication terminal 31 and a distance from the base station 22 to the communication terminal 32 are different from each other, mutual interference occurs between a synchronization signal transmitted from the base station 12 and a synchronization signal transmitted from the base station 22. Mutual interference between synchronization signals may cause difficulty of correctly demodulating the received synchronization signal at the communication terminal, making difficult to acquire a correct cell ID. If the correct cell ID of the SCell is not acquired, implementation of the CA is difficult.

For example, when the SCell is added to the PCell, a base station forming the PCell requests the selected SCell to establish a channel to the communication terminal, receives a dedicated random access preamble (hereinafter alternatively referred to as "DRAP") from the selected SCell, and notifies the communication terminal. The communication terminal implements the random access with the SCell using the DRAP notified by the base station. Hereinafter, the random access is sometimes referred to as "RA".

However, when the SCell selected by the base station is a SCell of a communication network other than a communication network to which the base station belongs due to overlapping of cell IDs between SCells, the DRAP notified to the communication terminal is a DRAP in the SCell of the other communication network. For this reason, in the SCell receiving a DRAP transmitted from the communication terminal (in other words, a SCell of a desired communication network), the DRAP may not be recognized as a DRAP, and collision between DRAPs may occur. In other words, the RA between the communication terminal and the SCell may fail, and the radio channel between the communication terminal and the SCell may not be established. Without establishing the radio channel between the communication terminal and the SCell, implementation of the CA is difficult.

In the above case, even if the RA between a communication terminal and a SCell succeeds incidentally, the SCell where a channel to the communication terminal is established is not a SCell of a communication network desired by the communication terminal. On the other hand, the base station exchanges data with the communication terminal using the SCell of the desired communication network. In other words, a SCell where a channel to a communication terminal is established and a SCell which is used for exchange of data between the base station and the communication terminal are different from each other. Thus, data from the base station does not reach the communication terminal through the SCells. Consequently, implementation of the CA is difficult.

Therefore, when user data transmitted on one communication service is divided into multiple pieces and then transmitted by the CA using a plurality of cells (for example, PCell and one SCell), it is difficult to transmit the divided user data via a plurality of different communication networks. In other words, it is difficult to implement the CA between a plurality of different communication networks.

The disclosed technique is provided to solve the above problems, and has an object to enable implementation of a CA using the unlicensed band.

According to a disclosed embodiment, implementing of the CA using the unlicensed band is enabled. Enabling of implementation of the CA using the unlicensed band achieves high-speed transmission.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Hereinafter, embodiments of a wireless communication system, a communication terminal, a base station, and a method for cell control disclosed here are described with reference to the accompanying drawings. The wireless communication system, the communication terminal, the base station, and the method for cell control disclosed herein are not limited by the embodiments described hereinafter. For example, although the following describes the LTE system as an example, the wireless communication system, the communication terminal, the base station, and the method for cell control disclosed herein are not limited to the LTE system. Also, the multiple access scheme is not limited. For example, TDMA, CDMA, OFDMA, SC-FDMA, or NOMA may be adopted as the multiple access scheme.

First Embodiment

<Configuration of Radio Communication System>

Figure 2:
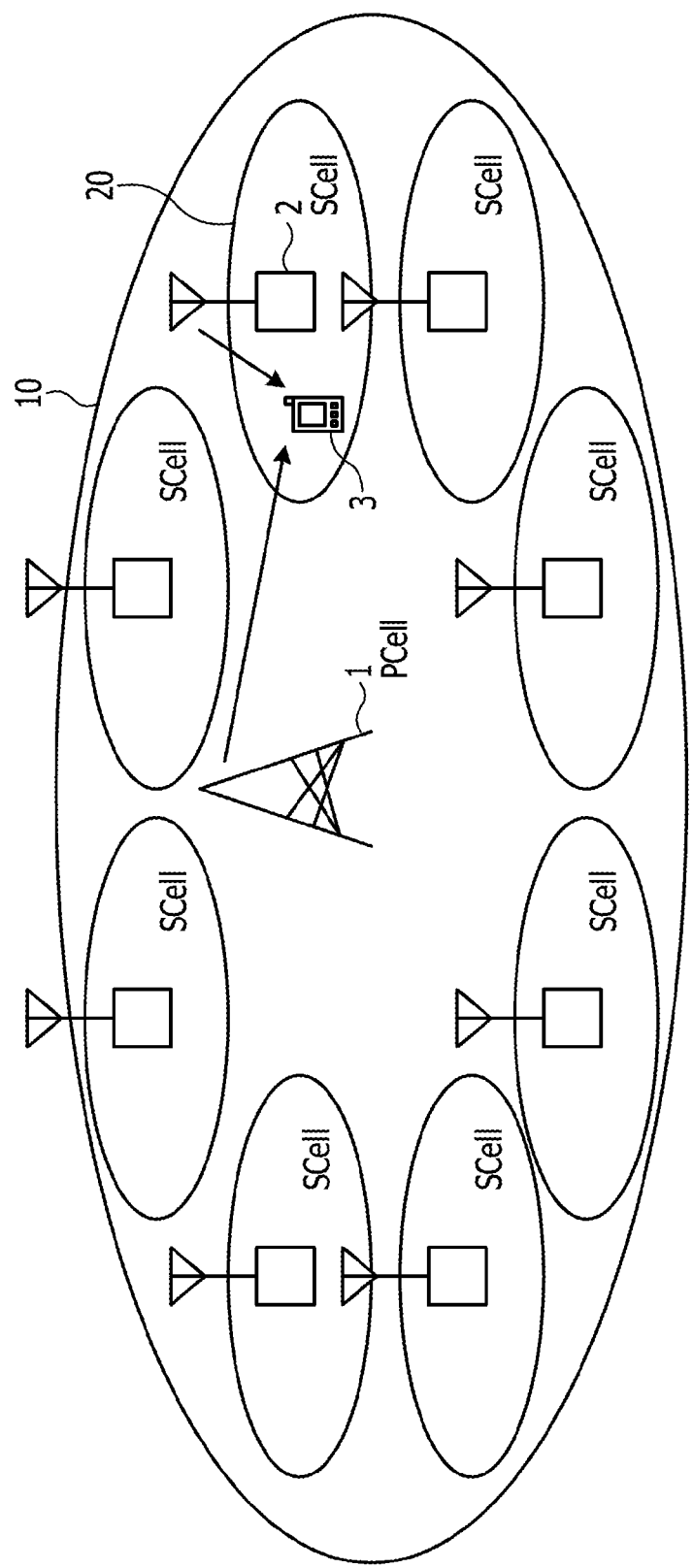
FIG. 2 is a diagram illustrating a configuration example of a wireless communication system according to a first embodiment.

FIG. 2 is a diagram illustrating a configuration example of a wireless communication system according to the first embodiment. As illustrated in FIG. 2, the wireless communication system according to the first embodiment includes a base station 1, a base station 2, and a communication terminal 3.

The base station 1 forms a cell 10 which is PCell. The base station 2 forms a cell 20 which is SCell. The cell 10 being the PCell includes a plurality of cells 20 being the SCells. The base stations 1 and 2 are connected with each other via wire or wireless, and are capable of transmitting and receiving data from each other. The base stations 1 and 2 may be combined as one base station. In this case, the base stations 1 and 2 are connected with each other within the system (for example, via an interface inside the system) and are capable of transmitting and receiving data from each other.

For conventional CAs, for example, a plurality of CCs are set in the base station 1, and the CA is performed in a CC of the same base station 1. Meanwhile, for example, implementation of the CA between the base station 1 and another base station is studied presently. This corresponds to implementation of a dual cell-high speed downlink packet access (DC-HSDPA) between the base station 1 and another station. The implementation of the DC-HSDPA between the base station 1 and another base station is called as dual band (DB)-HSPDA or DB-DC-HSDPA and standardized. Further, 4C-HSDPA using four frequencies is also standardized.

The DC-HSDPA, the DB-DC-HSDPA, and the 4C-HSDPA mentioned above may be construed as being equivalent to the CA. Although the following describes with the CA as an example, the disclosed technique also may be implemented in the DC-HSDPA, the DB-DC-HSDPA, or the 4C-HSDPA.

<Configuration of Base Station>

Figure 3:
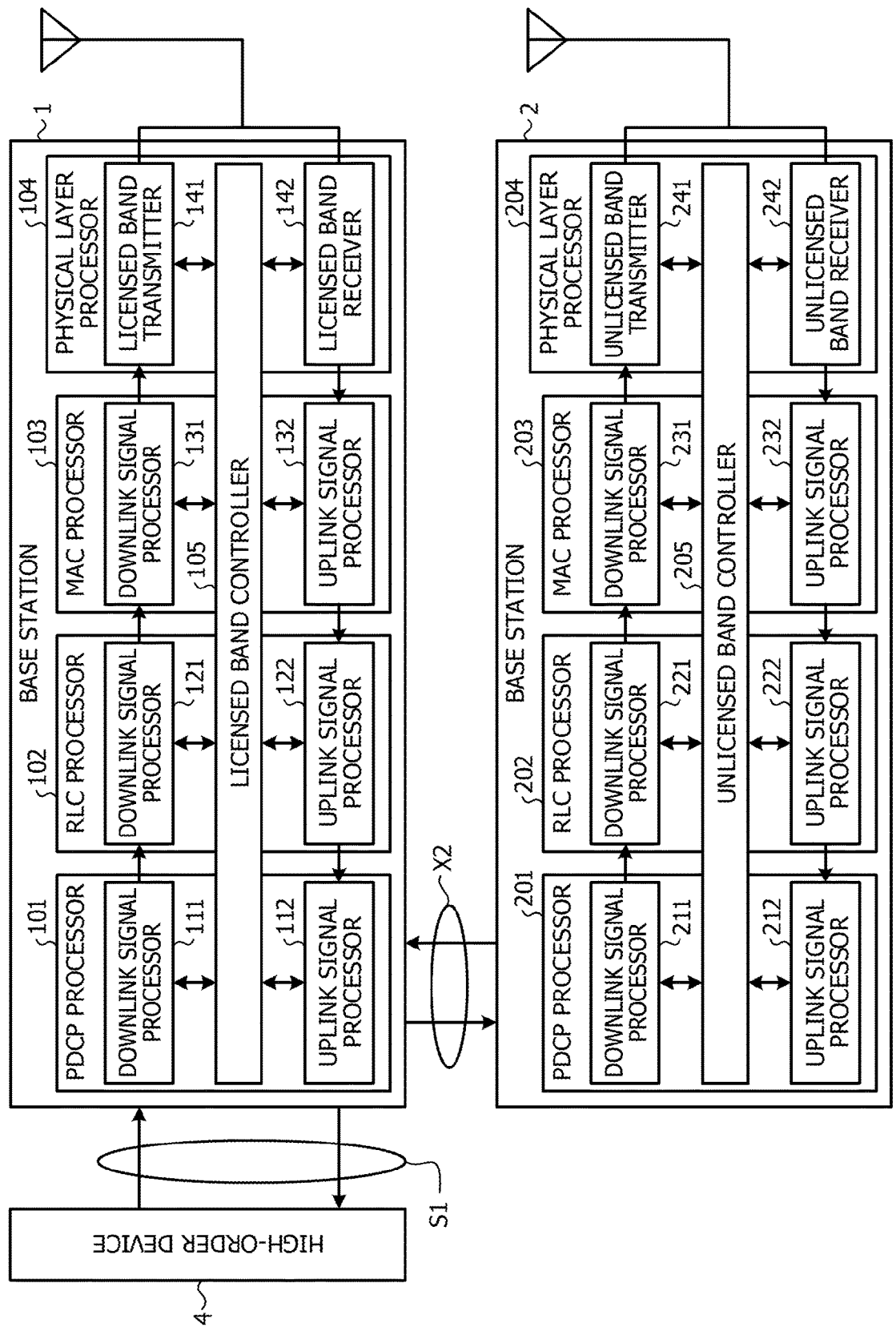
FIG. 3 is a block diagram illustrating configuration examples of base stations according to the first embodiment.

Next, configurations of the base station 1 and 2 are described with reference to FIG. 3. FIG. 3 is a block diagram illustrating configuration examples of the base stations according to the first embodiment.

As illustrated in FIG. 3, the base station 1 includes a packet data convergence protocol (PDCP) processor 101, a radio link control (RLC) processor 102, a media access control (MAC) processor 103, and a physical layer processor 104. The base station 1 also includes a licensed band controller 105. The licensed band controller 105 operates in cooperation with other processors. For convenience of illustrating in the figure, the licensed band controller 105 is illustrated as being placed across respective processors, although, in practice, being a processor different from the respective processors. However, the licensed band controller 105 may be considered as a part of the respective processors by extracting a portion thereof that works in cooperation with the processors.

The base station 2 includes a PDCP processor 201, a RLC processor 202, a MAC processor 203, and a physical layer processor 204. The base station 2 also includes an unlicensed band controller 205.

The base stations 1 and 2 are connected with each other by wire using, for example, an X2 interface. The base station 1 and a high-order device 4 are connected with each other by wire using, for example, S1 interface.

The PDCP processors 101 and 201 communicate with a high-order device 4. The high-order device 4 includes, for example, a MME and a S-GW. The high-order device 4 may be considered as a core network. The PDCP processors 101 and 201 include a data header information compression function, a data ciphering and deciphering release function, and a control information integrity protection and integrity verification function. The PDCP processor 101 includes a downlink signal processor 111 and an uplink signal processor 112. The PDCP processor 201 includes a downlink signal processor 211 and an uplink signal processor 212. Since the PDCP processor 101 and the PDCP processor 201 have the same configuration, description below is given using the PDCP processor 101 as an example, and description of the PDCP processor 201 is omitted.

The downlink signal processor 111 receives input of a signal such as user data from the high-order device 4. Then, the downlink signal processor 111 segments a data packet which is a received signal, adds a PDCP header such as a sequence number, and generates a PDCP PDU(RLC SDU). Then, the downlink signal processor 111 outputs a processed transmission signal to the downlink signal processor 121 of the RLC processor 102.

The uplink signal processor 112 receives a signal such as user data from the uplink signal processor 122 of the RLC processor 102. Then, the uplink signal processor 112 concatenates the received PDCP PDU (RLC SDU), removes the PDCP header, and regenerates the PDCP SDU or the IP packet. Then, the uplink signal processor 112 transmits a processed signal to the high-order device 4.

The PDCP processor 101 and the PDCP processor 201 communicate with each other using the PDCP SDU.

The RLC processors 102 and 202 include control function such as an auto repeat request (ARQ) or re-transmission processing function and, a signal re-transmission processing. The RLC processor 102 includes a downlink signal processor 121 and an uplink signal processor 122. The RLC processor 202 includes a downlink signal processor 221 and an uplink signal processor 222. Since the RLC processors 102 and 202 have the same configuration, description below is given using the RLC processor 102 as an example, and description of the RLC processor 202 is omitted.

The downlink signal processor 121 of the RLC processor 102 receives input of the PDCP PDU which is a signal processed by the downlink signal processor 111 of the PDCP processor 101. The downlink signal processor 121 segments the received PDCP PDU (RLC SUD), adds an RCL header such as a sequence number, and generates an RLC PDU.

Then, the downlink signal processor 121 outputs the generated RLC PDU to the downlink signal processor 131 of the MAC processor 103.

The uplink signal processor 122 of the RLC processor 102 receives input of the RLC PDU (MAC SDU) which is a signal processed by the uplink signal processor 132 of the MAC processor 103. The uplink signal processor 122 concatenates the received RLC PDU, removes the RLC header, and regenerates the RLC SDU (PDCP PDU). Then, the uplink signal processor 122 outputs the re-generated RLC SDU to the uplink signal processor 112 of the PDCP processor 101.

The MAC processors 103 and 203 include a function of implementing a hybrid ARQ (HARQ) between MACs of the communication terminal 3. Further, the MAC processors 103 and 203 include a scheduling function of selecting a communication terminal to which the uplink data transmission and the downlink data transmission are implemented, and parameters such as the amount of data transmitted, the radio resource, the modulation scheme, and the code rate, which are used in the data transmissions. Further, the MAC processors 103 and 203 include a function of controlling, for example, the RA and the radio channel control. The MAC processor 103 includes a downlink signal processor 131 and an uplink signal processor 132. Also, the MAC processor 203 includes a downlink signal processor 231 and an uplink signal processor 232. Since the MAC processors 103 and 203 have the same configuration, description below is given using the MAC processor 103 as an example, and description of the MAC processor 203 is omitted.

The downlink signal processor 131 of the MAC processor 103 receives input of the MAC SDU (RLC PDU) from the RLC processor 102. The downlink signal processor 131 segments the MAC SDU, adds a MAC header such as a sequence number, and generates a MAC PDU. The downlink signal processor 131 performs scheduling or assignment of the signal to the radio resource according to the signal scheduling information. Then, the downlink signal processor 131 outputs the MAC PDU to the licensed band transmitter 141 of the physical layer processor 104.

The uplink signal processor 132 of the MAC processor 103 receives input of the MAC PDU from the licensed band receiver 142 of the physical layer processor 104 in accordance with the scheduling. Then, the uplink signal processor 132 concatenates the MAC PDU, removes the MAC header, and regenerates the MAC SDU (RLC PDU). Then, the uplink signal processor 132 outputs the re-generated MAC SDU to the uplink signal processor 122 of the RLC processor 102.

The physical layer processors 104 and 204 perform, in a radio physical layer, synchronization processing, equalization processing, modulation/demodulation processing, error correcting code processing, and radio frequency (RF) control. The physical layer processor 104 includes a licensed band transmitter 141 and a licensed band receiver 142. The physical layer processor 204 includes an unlicensed band transmitter 241 and an unlicensed band receiver 242.

In the case where the system is a W-CDMA system, the base station 1 includes the MAC processor 103 and the physical layer processor 104, and the radio network controller (RNC) includes the PDCP processor 101 and the RLC processor 102. In this case, the RLC processor 102 further includes a function such as handover control. If the system is a W-CDMA system, the base station 2 also has the same configuration.

Figure 4:
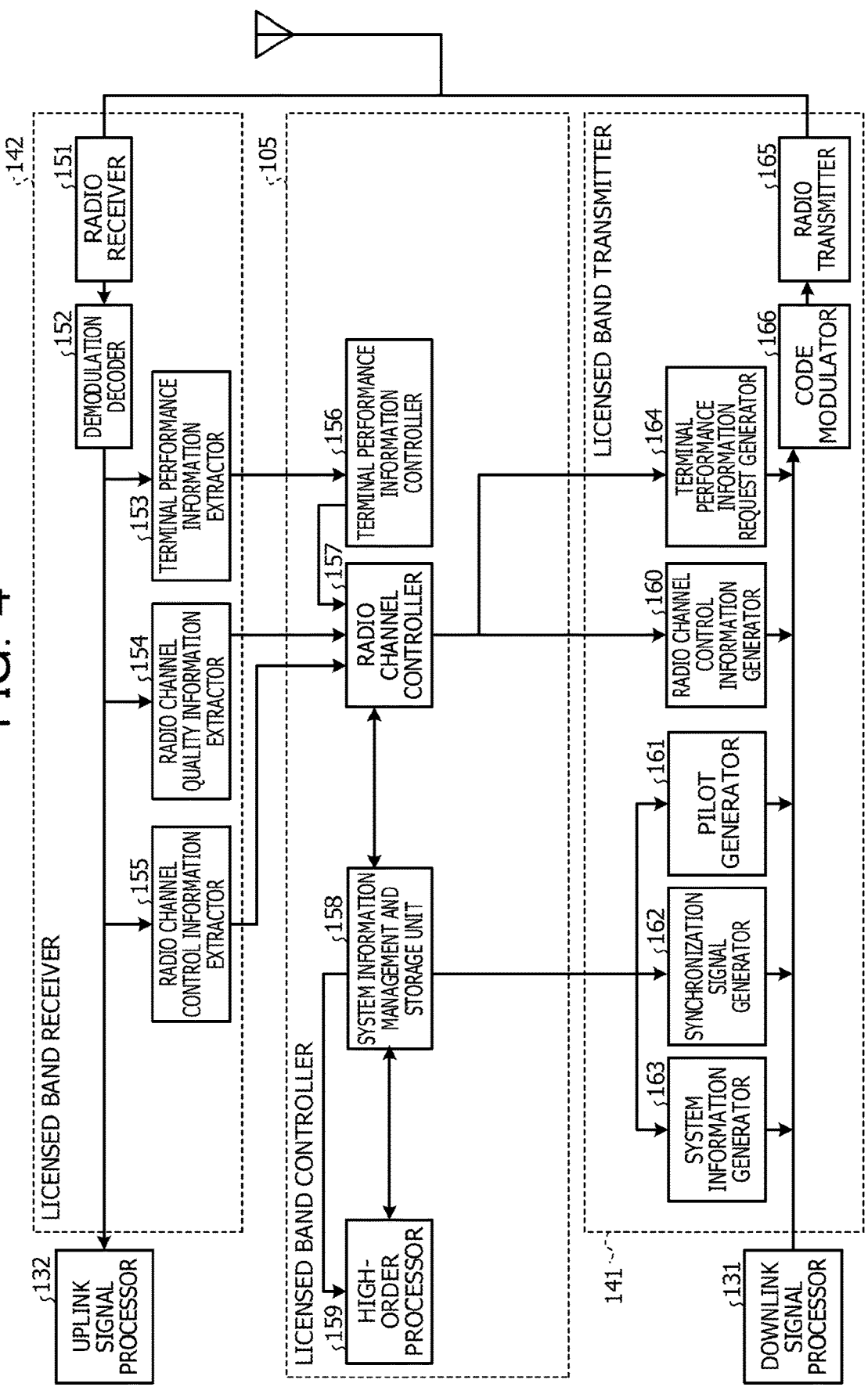
FIG. 4 is a block diagram illustrating configuration examples of a physical layer processor and a licensed band controller according to the first embodiment.

Now, details of the physical layer processor 104 and the licensed band controller 105 are described with reference to FIG. 4. FIG. 4 is a block diagram illustrating configuration examples of the physical layer processor and the licensed band controller according to the first embodiment. For the licensed band controller 105, however, FIG. 4 illustrates only functions desired in the physical layer processing.

The licensed band receiver 142 includes a radio receiver 151, a demodulation decoder 152, a terminal performance information extractor 153, a radio channel quality information extractor 154, and a radio channel control information extractor 155.

The radio receiver 151 receives a signal transmitted from the communication terminal 3 using the licensed band, via an antenna. Then, the radio receiver 151 amplifies the received signal and converts from the radio frequency to the base band signal. Then, the radio receiver 151 outputs the signal converted to the base band signal to the demodulation decoder 152.

The demodulation decoder 152 receives input of the signal from the radio receiver 151. Then, the demodulation decoder 152 performs demodulation processing of the received signal. Further, the demodulation decoder 152 performs demodulation processing of the demodulated signal. Then, the demodulation decoder 152 outputs the signal subjected to the respective processings to the uplink signal processor 132.

The terminal performance information extractor 153 extracts terminal performance information from the signal transmitted from the demodulation decoder 152. The terminal performance information includes information indicating whether the unlicensed band of the communication terminal 3 is available. Then, the terminal performance information extractor 153 outputs the extracted terminal performance information to a terminal performance information controller 156. Availability of the unlicensed band indicates whether communication using the unlicensed band is available as a function of the terminal, and is different from an availability based on the radio environment such as the radio channel quality.

The radio channel quality information extractor 154 extracts radio channel quality information including the reference signal received power (RSRP) from the signal transmitted from the demodulation decoder 152. Then, the radio channel quality information extractor 154 outputs the extracted radio channel quality information to a radio channel controller 157.

Radio channel quality collectively refers to the reception power, the pilot reception power, the reception quality, and the pilot reception quality. The reception power may be the reception electric field intensity. Radio channel quality may be called as the radio channel state information (CSI). The pilot reception power is, for example, a power such as the RSRP in the LTE system, and the common pilot channel received signal code power (CPICH RSCP) in the W-CDMA system. The reception quality is, for example, the signal-noise ratio (SIR). The pilot reception quality is, for example, the reference signal received quality (RSRQ) in the LTE system, and the common pilot channel received energy per chip divided by the power density (CPICH Ec/N0) in the W-CDMA system.

The radio channel quality information extractor 154 extracts the radio channel quality information of one or more cells from the signal transmitted from the demodulation decoder 152. Then, the radio channel quality information extractor 154 outputs the extracted radio channel quality information to the radio channel controller 157.

The radio channel control information extractor 155 extracts the radio channel control signal including the RA preamble transmitted from the demodulation decoder 152. Next, the radio channel control information extractor 155 acquires the RA preamble from the radio channel control signal. Then, the radio channel control information extractor 155 outputs the RA preamble to the radio channel controller 157.

Thereafter, the radio channel control information extractor 155 extracts input of the scheduled transmission transmitted from the communication terminal 3 as a response to RA response, from the signal transmitted by the demodulation decoder 152. Then, the radio channel control information extractor 155 outputs the scheduled transmission to the radio channel controller 157.

The radio channel control information extractor 155 extracts control information used for establishing a radio channel in the cell 20 from the signal transmitted from the demodulation decoder 152. Then, the radio channel control information extractor 155 outputs the extracted control information to the radio channel controller 157.

The radio channel control information extractor 155 extracts "error network notification" from the signal transmitted from the demodulation decoder 152. Then, the radio channel control information extractor 155 outputs the extracted error network notification to the radio channel controller 157. Detail of the error network notification is described later.

The licensed band controller 105 includes a terminal performance information controller 156, a radio channel controller 157, a system information management and storage unit 158, and a high-order processor 159.

Using the terminal performance information, the terminal performance information controller 156 determines whether the communication terminal 3 may use the unlicensed band. Then, the terminal performance information controller 156 notifies the radio channel controller 157 whether the communication terminal 3 may use the unlicensed band.

The radio channel controller 157 receives input of the RA preamble from the radio channel control information extractor 155. Then, the radio channel controller 157 makes control to reply the random access response (RA response) to the RA preamble. For example, the radio channel controller 157 makes control to request implementation of generation of a timing advanced indicator (TAI) that controls transmission timing of the communication terminal 3, aperiodic radio channel measurement, and report of the radio channel measurement. Then, the radio channel controller 157 outputs control information for the RA response to a radio channel control information generator 160.

The radio channel controller 157 receives input of the scheduled transmission from the radio channel control information extractor 155. The radio channel controller 157 controls to transmit a contention resolution to the communication terminal 3. Then, the radio channel controller 157 outputs control information for the contention resolution to the radio channel control information generator 160.

After the RA has completed and a radio channel has been established between the base station and the communication terminal 3, the radio channel controller 157 instructs a terminal performance information request generator 164 to transmit the terminal performance information request. Thereafter, the radio channel controller 157 receives input of information indicating whether the communication terminal 3 may use the unlicensed band, from the terminal performance information controller 156. Then, using the information indicating whether the communication terminal 3 may use the unlicensed band, the radio channel controller 157 identifies the communication terminal 3 and specifies the terminal category. The radio channel controller 157 includes, for example, a list containing terminal categories generated by categorizing depending on availability of the unlicensed band. The radio channel controller 157 instructs the radio channel control information generator 160 to generate control information for giving notice of use of the unlicensed band. The radio channel controller 157 instructs the radio channel control information generator 160 to notify the communication terminal 3 of the terminal category.

Thereafter, the radio channel controller 157 notifies the system information management and storage unit 158 of use of the unlicensed band for the communication terminal 3.

When determined to implement aperiodic radio channel quality measurement not conforming with the measurement cycle or measurement result report cycle (hereinafter collectively referred to as "measurement cycle"), the radio channel controller 157 notifies the radio channel control information generator 160 of radio channel quality measurement. In this case, the radio channel controller 157 transmits the condition of the radio channel quality measurement to the radio channel control information generator 160. The condition of the radio channel quality measurement (or radio channel quality measurement result report) include, for example, the measurement period or the radio resource (for example, entire system bandwidth or part of the system bandwidth). For example, when received input of the error network notification from the radio channel control information extractor 155, the radio channel controller 157 determines to implement aperiodic radio channel quality measurement.

The radio channel controller 157 receives input of radio channel quality measurement and calculation results from the radio channel quality information extractor 154 as a response to the aperiodic radio channel quality measurement request. Then, the radio channel controller 157 selects a communication terminal transmitting downlink data based on the acquired radio channel quality. Here, the following describes operations that take place when the radio channel controller 157 selects the communication terminal 3. Then, the radio channel controller 157 selects, for example, the data amount, the radio resource, the modulation scheme, and the code rate, which are used when implementing downlink data transmission to the communication terminal 3. Here, the radio resource used in the implementation is a radio source consisting of the frequency axis direction and the time axis direction in the LTE system. In the W-CDMA system, the used radio resource is a spread code. Next, the radio channel controller 157 outputs the selection result to the radio channel control information generator 160.

The radio channel controller 157 receives input of the pilot signal transmitted from a communication terminal including the communication terminal 3, from the radio channel control information extractor 155. Then, the radio channel controller 157 measures and calculates the uplink radio channel quality from the received pilot signal. Next, the radio channel controller 157 selects a communication terminal performing uplink data transmission based on the radio channel quality. This processing may be generally called as scheduling. In some cases, only a part of the channel selection processing is called as scheduling. Here, description is given on operations that take place when the radio channel controller 157 selects the communication terminal 3 as a communication terminal performing uplink data transmission based on the radio channel quality.

Next, the radio channel controller 157 selects, for example, the data amount, the radio resource, the modulation scheme, and the code rate, which are used when the communication terminal 3 performs uplink data transmission. Here, the radio resource used in the implementation is a radio source consisting of the frequency axis direction and the time axis direction in the LTE system. In the W-CDMA system, the used radio resource is a spread code. Thereafter, the radio channel controller 157 outputs the selection result to the radio channel control information generator 160.

Further, the radio channel controller 157 monitors the radio channel quality extracted by the radio channel quality information extractor 154. Then, when the radio channel quality satisfies a predetermined condition such as when a difference between a transmission rate with the communication terminal 3 and a predetermined transmission rate exceeds a threshold value, the radio channel controller 157 determines implementation of the CA. Then, the radio channel controller 157 notifies the high-order processor 159 of implementation of the CA.

Thereafter, the radio channel controller 157 receives input of the radio channel quality information of radio channels with communication terminals 3 of one or more cells from the radio channel quality information extractor 154. Then, the radio channel controller 157 selects the SCell out of cells other than the PCell based on the acquired radio channel quality information. For example, the radio channel controller 157 selects a cell having a radio channel quality equal to or higher than the threshold value as the SCell. When there exist a plurality of cells having the radio channel quality equal to or higher than the threshold value, it is preferable to select a cell having the highest radio channel quality as the SCell. When received input of the error network notification from the radio channel control information extractor 155, the radio channel controller 157 invalidates the previous selection result of the SCell and re-selects the SCell. The radio channel controller 157 receives input of the error network notification from the radio channel control information extractor 155 when the network identification information of the cell 10 and the network identification information of the cell 20 do not match each other in the communication terminal 3. Here, the following describes operations which take place when the radio channel controller 157 selects the cell 20 as the SCell.

Next, the radio channel controller 157 instructs the radio channel control information generator 160 to request the base station 2 for the control information used for establishing the radio channel. Here, the control information used for establishing the radio channel is, for example, control information used in the DRAP and RA allocated individually to communication terminals. The control information used for establishing the radio channel also includes the system information. The system information includes, for example, the condition of the radio channel quality measurement, the cell selection information, the neighboring cell information including the cell ID, the multicast broadcast single frequency network (MBSFN) related information, the network identification information, and the CA-related information. The system information includes system information broadcast and transmitted as control information shared by communication terminals 3 connected or going to be connected with the cell, and a system information notified and transmitted as individual control information of communication terminals 3 connected or going to be connected to the cell. The system information also may be construed as the control information. Further, the system information in the LTE (including LTE-Advanced) system and the W-CDMA system is called as system information block (master information block (MIB) or system information block (SIB)), which is an aggregation of system information.

Thereafter, the radio channel controller 157 receives input of control information used for establishing the radio channel in the cell 20 from the radio channel control information extractor 155. Then, the radio channel controller 157 instructs the radio channel control information generator 160 to give notice of the control information used for establishing the radio channel.

The high-order processor 159 performs control processing in the PDCP processor 101, the RLC processor 102, and the MAC processor 103.

The licensed band transmitter 141 includes a terminal performance information request generator 164, a radio channel control information generator 160, a pilot generator 161, a synchronization signal generator 162, a system information generator 163, a radio transmitter 165, and a code modulator 166.

After the RA has completed and a radio channel has been established between the base station and the communication terminal 3, the terminal performance information request generator 164 receives, from the radio channel controller 157, instruction to transmit the terminal performance information request. Then, the terminal performance information request generator 164 generates the terminal performance information request. Thereafter, the terminal performance information request generator 164 outputs the generated terminal performance information request to the code modulator 166 and transmits to the communication terminal 3.

The radio channel control information generator 160 receives input of the control information for the RA response from the radio channel controller 157. Then, the radio channel control information generator 160 generates the RA response using the acquired control information. Thereafter, the radio channel control information generator 160 outputs the generated RA response to the code modulator 166 and transmits to the communication terminal 3.

The radio channel control information generator 160 receives input of the control information for the contention resolution from the radio channel controller 157. Then, the radio channel control information generator 160 generates the contention resolution using the acquired control information. Thereafter, the radio channel control information generator 160 outputs the generated contention resolution to the code modulator 166 and transmits to the communication terminal 3.

The radio channel control information generator 160 receives, from the radio channel controller 157, notification of the radio channel quality measurement not conforming to the measurement period. In this case, the radio channel control information generator 160 also receives the condition of the radio channel quality measurement from the radio channel controller 157. Then, the radio channel control information generator 160 generates a radio channel quality measurement request using the condition of radio channel quality measurement. Thereafter, the radio channel control information generator 160 outputs the generated radio channel quality measurement request to the code modulator 166 and transmits to the communication terminal 3.

The radio channel control information generator 160 receives, from the radio channel controller 157, input of selection results such as the data amount, the radio resource, the modulation scheme, and the code rate, which are used when downlink data transmission to the communication terminal 3 is implemented. Then, the radio channel control information generator 160 generates the downlink control information including the selection result. Thereafter, the radio channel control information generator 160 outputs the generated downlink control information including the selection result to the code modulator 166 and transmits to the communication terminal 3.

The radio channel control information generator 160 receives, from the radio channel controller 157, input of selection results such as the data amount, the radio resource, the modulation scheme, and the code rate, which are used when the communication terminal 3 performs uplink data transmission. Then, the radio channel control information generator 160 generates the uplink control information including the selection results. Thereafter, the radio channel control information generator 160 outputs the generated uplink control information including the selection results to the code modulator 166 and transmits to the communication terminal 3.

Further, the radio channel control information generator 160 receives the instruction to generate control information for giving notice of use of the unlicensed band from the radio channel controller 157. Then, the radio channel control information generator 160 generates an unlicensed band use notification. Thereafter, the radio channel control information generator 160 outputs the generated unlicensed band use notification to the code modulator 166 and transmits to the communication terminal 3. The radio channel control information generator 160 also receives the instruction to give notice of the terminal category to the communication terminal 3 from the radio channel controller 157. Then, the radio channel control information generator 160 generates the control information giving notice of the terminal category. Thereafter, the radio channel control information generator 160 outputs the control information giving notice of the terminal category to the code modulator 166 and transmits to the communication terminal 3.

When performing the CA, the radio channel control information generator 160 receives the instruction to request control information used for establishing the radio channel to the base station 2, from the radio channel controller 157. Then, the radio channel control information generator 160 generates request of the control information used for establishing the radio channel. Thereafter, the radio channel control information generator 160 transmits the generated request of the control information used for establishing the radio channel to the base station 2 via the X2 interface.

The radio channel control information generator 160 also receives the instruction to give notice of the control information used for establishing the radio channel in the cell 20, from the radio channel controller 157. Then, the radio channel control information generator 160 generates control information for giving notice of the control information used for establishing the radio channel in the cell 20. Thereafter, the radio channel control information generator 160 transmits the generated control information for giving notice of the control information used for establishing the radio channel in the cell 20, to the base station 2 via the X2 interface. In this operation, the radio channel control information generator 160 also may notify the communication terminal 3 of cell information of the cell 20 including, for example, cell control information such as the cell ID, or may notify the communication terminal 3 of information indicating a communications network to which the cell 20 belongs, such as the network identification information.

Figure 5:
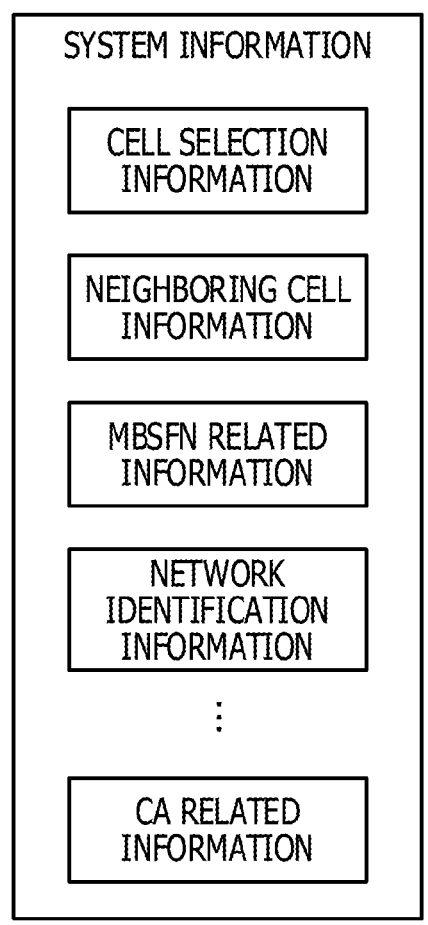
FIG. 5 is a diagram illustrating an example of system information according to the first embodiment.

The system information management and storage unit 158 stores and manages system information including the radio channel quality measurement condition; the cell selection information; the neighboring cell information including the cell ID; the MBSFN-related information; the network identification information; and the CA-related information. The content of the system information stored by the system information management and storage unit 158 is illustrated, for example, in FIG. 5. FIG. 5 is a diagram illustrating an example of system information according to the first embodiment. The radio channel quality measurement condition includes, for example, a bandwidth to be measured, a measurement period, and information of the cell to be measured. The network identification information is information indicating the communication network to which the base station (cell) belongs.

Here, the cell ID is alternatively called as cell identifier, C (Cell)-ID, physical cell (PC) ID, or PCID. The cell ID is an ID for identifying the cell. The cell ID is used to identify the cell, for example, in the radio channel quality measurement and the handover. In the LTE system, when a standby cell or a connected cell receives a synchronization signal, the communication terminal 3 recognizes the cell ID of the cell.

The cell ID is set, for example, as follows in the LTE system. Specifically, there are 168 groups each including three cell IDs. Thus, total 504 cell IDs may be set. The cell ID is calculated from Formula (1) given below:

$$N_{ID}^{cell}=3N_{ID}^{(1)}+N_{ID}^{(2)}$$

$$N_{ID}^{(1)}:0\sim167$$

$$N_{ID}^{(2)}:0\sim2 \quad (1)$$

The cell ID allocation method is not specified by the 3GPP. Specifically, the cell ID allocation method differs, for example, depending on the communication provider even in the same LTE system. N<(2)> ID is construed as the group number of the cell ID, whereas N<(1)> ID is construed as a number in a group.

The system information generator 163 acquires, for example, network identification information of the base station 1 (Cell 10, PCell) from the system information management and storage unit 158 after establishing the channel or before implementing the RA. Then, the system information generator 163 generates system information using, for example, the acquired network identification information. The system information also includes RA-related control information. Thereafter, the system information generator 163 outputs the system information including the network identification information to the code modulator 166 and transmits to the communication terminal 3.

The system information generator 163 acquires the radio channel quality measurement condition from the system information management and storage unit 158. Then, the system information generator 163 generates the acquired measurement condition of the radio channel quality measurement as the system information. Thereafter, the system information generator 163 outputs the system information including the measurement condition of the radio channel quality measurement to the code modulator 166 and transmits to the communication terminal 3. The system information generator 163 notifies communication terminals of the system information as individual control information for each of communication terminals, or alternatively notifies all or some of communication terminals that are in standby (camping) in the cell 10 or are connected to the cell 10, of the system information as shared common control information. The system information may include, for example, the measurement bandwidth and the cell selection priority.

The synchronization signal generator 162 calculates the synchronization signal based on the cell ID (in other word, the cell ID of the PCell) stored in the system information management and storage unit 158. The synchronization signal typically includes a plurality of signals or symbols, although, in some cases, including one signal or symbol. Therefore, the synchronization signal generator 162 calculates the synchronization signal or synchronization signal sequence (hereinafter collectively referred to as "synchronization signal"). Thereafter, the synchronization signal generator 162 outputs the generated synchronization signal to the code modulator 166 and transmits to the communication terminal 3. The LTE system has two synchronization signals specified as the synchronization signal: the one is a first synchronization signal (PSS: Primary Synchronization Signal), and the other is a second synchronization signal (SSS: Secondary Synchronization signal). The LTE system has no synchronization channel, and only the synchronization signal is defined. However, the two synchronization signals actually include a plurality of symbols. The disclosed technique may be applied in the same manner even when a synchronization channel transmitting a synchronization signal exists.

The pilot generator 161 calculates the pilot signal. The pilot signal (the pilot or the pilot symbol) typically includes a plurality of signals (symbols), although, in some cases, including one signal symbol. Therefore, the pilot generator 161 calculates the pilot signal or the pilot signal sequence (hereinafter collectively referred to as "pilot signal"). Then, the pilot generator 161 outputs the generated pilot signal to the code modulator 166 and transmits to the communication terminal 3. The LTE system has no pilot channel, and only the pilot signal is defined. The disclosed technique may be applied in the same manner even when a pilot channel transmitting a pilot signal exists.

Here, calculation of the PSS and the SSS is described below. Calculation method of the PSS is defined by Formula (2) and Table, both given below. Specifically, the PSS is calculated based on the group number N of the cell ID.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad (2)$$

TABLE 1

| $N_{ID}^{(2)}$ | Root index $u$ |
|---|---|
| 0 | 25 |
| 1 | 29 |
| 2 | 34 |

Further, the PSS is a Zadoff-Chu sequence (Zadoff-Chu code). The Zadoff-Chu sequence is a constant amplitude zero auto correlation waveform (CAZAC), a periodical complex signal of the complement of 1, or a sequence where the autocorrelation is zero. The PSS is represented by mapping 62 complex signals calculated from the above formula and table in the frequency axis direction (sub-carrier direction) of the orthogonal frequency division multiple access (OFDMA). The PSS is not scrambled.

The 62 complex signals are mapped in accordance with Formula (3) given below.

$$a_{k,l} = d(n), n = 0, \ldots, 61 \quad (3)$$

-continued
$$k = n - 31 + \frac{N_{RB}^{DL} N_{sc}^{RB}}{2}$$

where, (k, l) are resource elements in the symbol of the OFDMA used for transmission of the PSS.

Then, for example, when the frame structure is of the type 1, the PSS is mapped in the frequency direction or sub-carrier direction in a last symbol of slots 0 and 10, or where l is 6 in the normal sub-frame. For example, the PSS is placed at a symbol apart by ±31 symbols from the frequency center of the central 6RB. The PSS is not placed at five symbols at both ends.

As the PSS is placed at a last symbol in the time axis direction, the communication terminal 3 may identify the head of the slot. Specifically, the communication terminal 3 may synchronize with the slot in accordance with Formula (4) given below.

$$a_{k,l} = d(n), n = 0, \ldots, 61 \quad (4)$$
$$k = n - 31 + \frac{6 \times 12}{2}$$
$$= n + 5$$

The SSS calculation method is performed in accordance with the procedure given below. d(0), ..., d(61) representing the SSS are binary sequences of two lengths 31 determined using a scramble sequence given by the PSS. The binary sequences of the two lengths 31 defining the SSS are defined between sub-frames 0 and 5 in accordance with Formula (5) given below. The SSS is sometimes construed as a sequence scrambled to the calculated sequence.

$$d(2n) = \begin{cases} s_0^{(m_0)}(n)c_0(n) & \text{in subframe } 0 \\ s_1^{(m_1)}(n)c_0(n) & \text{in subframe } 5 \end{cases} \quad (5)$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

where 0≤n≤30. Then, m0 and m1 are represented as in the following Formula (6) using a cell ID group N<(1)> ID.

$$m_0 = m' \bmod 31 \quad (6)$$
$$m_1 = (m_0 + \lfloor m'/31 \rfloor + 1) \bmod 31$$
$$m' = N_{ID}^{(1)} + q(q+1)/2, q = \left\lfloor \frac{N_{ID}^{(1)} + q'(q'+1)/2}{30} \right\rfloor,$$
$$q' = \lfloor N_{ID}^{(1)}/30 \rfloor$$

These are represented as in a mapping table illustrated in FIG. 6. FIG. 6 is a diagram illustrating an example of the map table. As illustrated in FIG. 6, the mapping table depicts a correspondence relationship among the cell ID group N<(1)> ID, m0, and m1.

Then, S0<(m0)>(n) and S1<(m1)>(n) are represented as in Formula (7).

$$s_0^{(m_0)}(n) = \tilde{s}((n+m_0) \bmod 31)$$
$$s_1^{(m_1)}(n) = \tilde{s}((n+m_1) \bmod 31) \quad (7)$$

Then, respective terms satisfy the following Formula (8).

$$\tilde{s}(i)=1-2x(i), 0\leq i\leq 30$$

$$x(\bar{i}+5)=(x(\bar{i}+2)+x(\bar{i}))\bmod 2, 0\leq \bar{i}\leq 25 \quad (8)$$

In this case, default values are x(0)=0, x(1)=0, x(2)=0, x(3)=0, and x(4)=1.

Further, c0(n) and c1(n) that are two scramble sequences depending on the PSS are represented by the following Formula (9).

$$c_0(n)=\tilde{c}(n+N_{ID}^{(2)})\bmod 31)$$

$$c_1(n)=\tilde{c}(n+N_{ID}^{(2)}+3)\bmod 31) \quad (9)$$

where N<(2)> ID∈(0, 1, 2) corresponds to one in the cell ID group N<(1)> ID. Further, respective terms satisfy the following Formula (10).

$$\tilde{c}(i)=1-2x(i), 0\leq i\leq 30$$

$$x(\bar{i}+5)=(x(\bar{i}+3)+x(\bar{i}))\bmod 2, 0\leq \bar{i}\leq 25 \quad (10)$$

In this case, default values are x(0)=0, x(1)=0, x(2)=0, x(3)=0, and x(4)=1.

Scramble sequences Z1<(m0)>(n) and Z1<(m1)>(n) are represented by the following Formula (11).

$$z_1^{(m0)}(n)=\tilde{z}((n+(m_0\bmod 8))\bmod 31)$$

$$z_1^{(m1)}(n)=\tilde{z}((n+(m_1\bmod 8))\bmod 31) \quad (11)$$

where m0 and m1 are values that are obtained from the mapping table of FIG. 6. Respective terms satisfy the following Formula (12).

$$\tilde{z}(i)=1-2x(i), 0\leq i\leq 30$$

$$x(\bar{i}+5)=(x(\bar{i}+4)+x(\bar{i}+2)+x(\bar{i}+1)+x(\bar{i}))\bmod 2, 0\leq \bar{i}\leq 25 \quad (12)$$

In this case, default values are x(0)=0, x(1)=0, x(2)=0, x(3)=0, and x(4)=1.

From the above, the SSS is represented by different calculation methods: one method is to transmit in the sub-frame number of 0 and the slot number of 1 and, the other method is to transmit in the sub-frame number of 5 and the slot number of 11. Further, the SSS is represented by different calculation methods: one method is for the generated complex signal of an odd number, and the other method is for the generated complex signal of an even number. Like the PSS, the SSS is a signal string including 62 complex numbers.

Further, c0(n) and c1(n) are maximal length sequences (M sequences) or pseudo noise (PN) sequences, which are calculated using N<(2)> ID which is a number in the group number N<(1)> ID to which the cell ID belongs.

Likewise, S0<(m0)>(n) and S1<(m1)>(n) are also M sequences calculated from m0 and m1 derived from numbers N<(1)>ID and N<(1)> ID of groups to which the cell belongs, and the mapping table of FIG. 6.

Further, mapping of the SSS is described. A sequence d(n) representing the SSS is mapped into resource elements as represented by the following formula (13).

$$a_{k,l} = d(n), n = 0, \ldots, 61 \quad (13)$$

$$k = n - 31 + \frac{N_{RB}^{DL}N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

where resource elements (k, l) are represented by the following formula (14).

$$k = n - 31 + \frac{N_{RB}^{DL}N_{sc}^{RB}}{2} \quad (14)$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

$$n = -5, -4, \ldots, -1, 62, 63, \ldots, 66$$

On this basis, for example, in the case of type 1 or the frequency division duplex (FDD), the SSS is placed at symbols each ahead by one symbol from the end of the slot 1 and the slot 11. The last symbol is N<DL> symb−1. Here, "DL" (down link) refers to the downlink transmission path. "Symb" is the symbol referring to a symbol in the time axis direction. In the same manner as the PSS, the SSS is placed at a symbol apart by ±31st symbol from the center in the frequency axis direction or a central frequency of 6 RB at the center of the bandwidth. Since different SSSes are transmitted in the slot 1 and the slot 11, the head of the radio frame may be identified.

Next, calculation of the pilot signal is described. Here, the following describes about a cell-specific reference signal (hereinafter alternatively referred to as "CRS") which is a pilot signal common to communication terminals sharing a cell or connected or going to be connected to the cell. Although not described herein, a pilot signal calculation method is also specified in the same manner on a UE-specific reference signal or a dedicated reference signal (DRS) which is a pilot signal for each of individual communication terminals. Further, a pilot signal calculation method is also specified on a pilot signal for transmitting multimedia broadcast and multicast service (MBMS) data in the same manner. The disclosed technique also may be applied when a pilot signal for each of individual communication terminals or a pilot signal for transmitting the MBMS data is used.

The pilot signal is represented by the following formula (15).

$$r_{l,n_s}(m) = \frac{1}{\sqrt{2}}(1 - 2\cdot c(2m)) + j\frac{1}{\sqrt{2}}(1 - 2\cdot c(2m+1)), \quad (15)$$

$$m = 0, 1, \ldots, 2N_{RB}^{max,DL} - 1$$

where ns is the slot number of the radio frame, and l is the OFDMA symbol number of the slot. c(i) in the formula represents a gold sequence among the pseudo-random noise sequence or pseudo-random sequence (PN sequence), whose default value is represented by the following formula (16A). The gold sequence is generated by joining two PN sequences (M sequences) having two default values.

The formula (16A) is calculated based on 1-bit information indicating the slot number Ns, the ID, and the CP length.

$$c_{init} = 2^{10}\cdot(7\cdot(n_s+1)+l+1)\cdot(2\cdot N_{ID}^{cell}+1) + 2\cdot N_{ID}^{cell} + N_{CP} \quad (16A)$$

-continued $$N_{CP} = \begin{cases} 1 & \text{for normal } CP \\ 0 & \text{for extended } CP \end{cases}$$

where the gold sequence is calculated by the following formula (16B).

$$c(n)=(x_1(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad (16B)$$

where the gold sequence includes two default values, one of which is represented by the formula (16A). The other default value of the gold sequence is X1(0)=1 and X1(n)=0.

Further, the pilot signal is mapped into a<(p)>k, I used as reference symbols for an antenna port p in the slot ns, the a(p)k, I being defined by the following formula (17).

$$a^{(p)}_{k,l} = r_{l,n_s}(m') \quad (17)$$

$$k = 6m + (v + v_{shift}) \bmod 6$$

$$l = \begin{cases} 0, N^{DL}_{symb} - 3 & \text{if } p \in \{0, 1\} \\ 1 & \text{if } p \in \{2, 3\} \end{cases}$$

$$m = 0, 1, \ldots, 2 \cdot N^{DL}_{RB} - 1$$

$$m' = m + N^{max,DL}_{RB} - N^{DL}_{RB}$$

where v is represented by the following formula (18). The same also applies to the vshift.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad (18)$$

Figure 7:
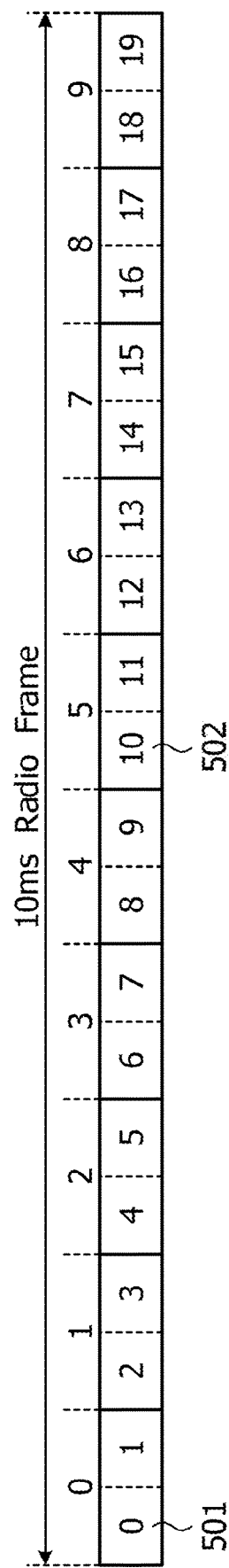
FIG. 7 is a diagram illustrating a construction example of a frame.
Figure 8:
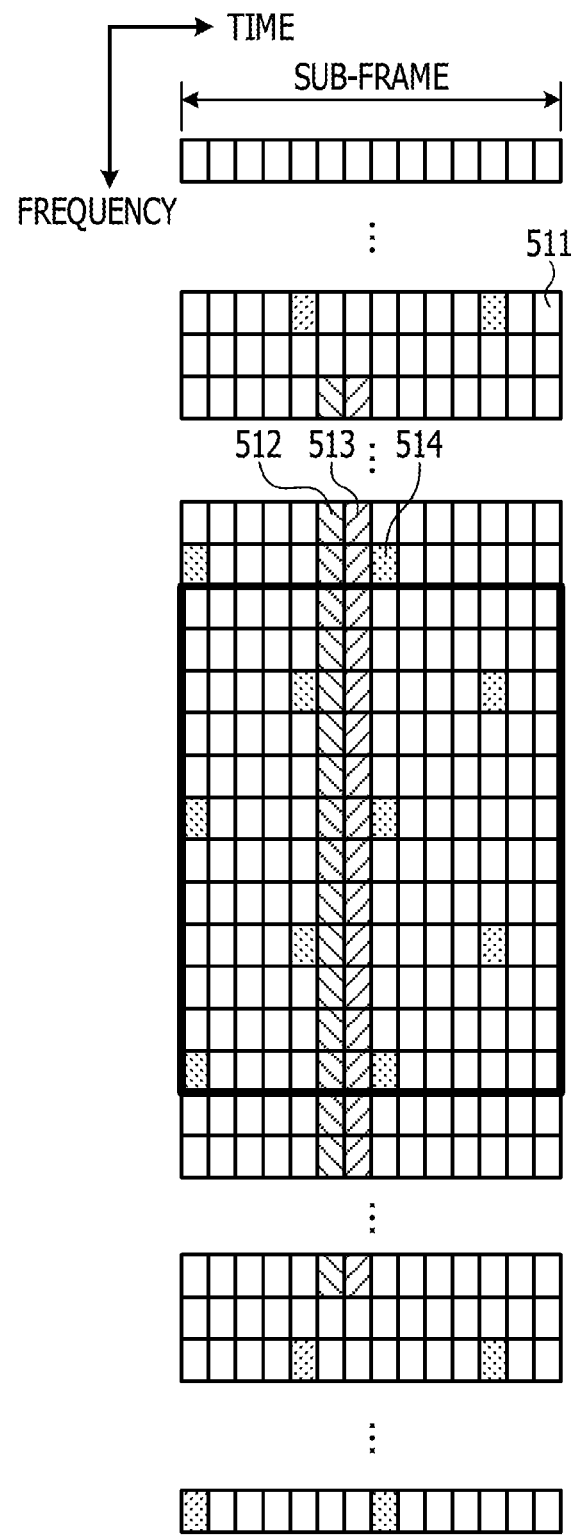
FIG. 8 is a diagram illustrating a mapping example of the PSS, the SSS, and a pilot signal in one sub-frame.

Further, mapping of PSS and SSS pilot signals is described with reference to FIGS. 7 and 8. FIG. 7 is a diagram illustrating an example of the frame structure. FIG. 8 is a diagram illustrating a mapping example of the PSS, the SSS, and the pilot signal in one sub-frame. Here, the mapping is described using the FDD as an example.

Upper figures in FIG. 7 represent sub-frame numbers. Lower figures in FIG. 7 represent slot numbers of time slots. As illustrated in FIG. 7, a radio frame of 10 ms includes 10 sub-frames. Then, two slots are allocated to each of sub-frames.

Then, the PSS and the SSS are mapped into slots 0, 10 represented by sequences 501, 502 as illustrated in FIG. 8. FIG. 8 illustrates the slot 0 in the enlarged state. A frame 511 in FIG. 8 indicates resource elements. Further, FIG. 8 represents the frequency in the vertical direction and the time in the horizontal direction. An area 512 is a 6th symbol of the slot 0, where the SSS is mapped. An area 513 is a 7th symbol of the slot 0, where the PSS is mapped. Then, the pilot signal is mapped in an area 514.

Referring back to FIG. 4, the code modulator 166 receives input of signals from the downlink signal processor 131, the terminal performance information request generator 164, the radio channel control information generator 160, the pilot generator 161, the synchronization signal generator 162, and the system information generator 163. The code modulator 166 performs coding and modulation of the input signals. Further, the code modulator 166 maps the received signals into the radio frame, the slot, or the sub-frame. The code modulator 166 outputs mapped signals to the radio transmitter 165.

The radio transmitter 165 receives input of signals mapped into the radio frame, the slot, or the sub-frame from the code modulator 166. Then, the radio transmitter 165 converts the frequency of the mapped signals to the radio frequency. Then, the radio transmitter 165 amplifies the mapped signals. Thereafter, the radio transmitter 165 transmits the mapped signals to the communication terminal 3 using the licensed band via the antenna.

Figure 9:
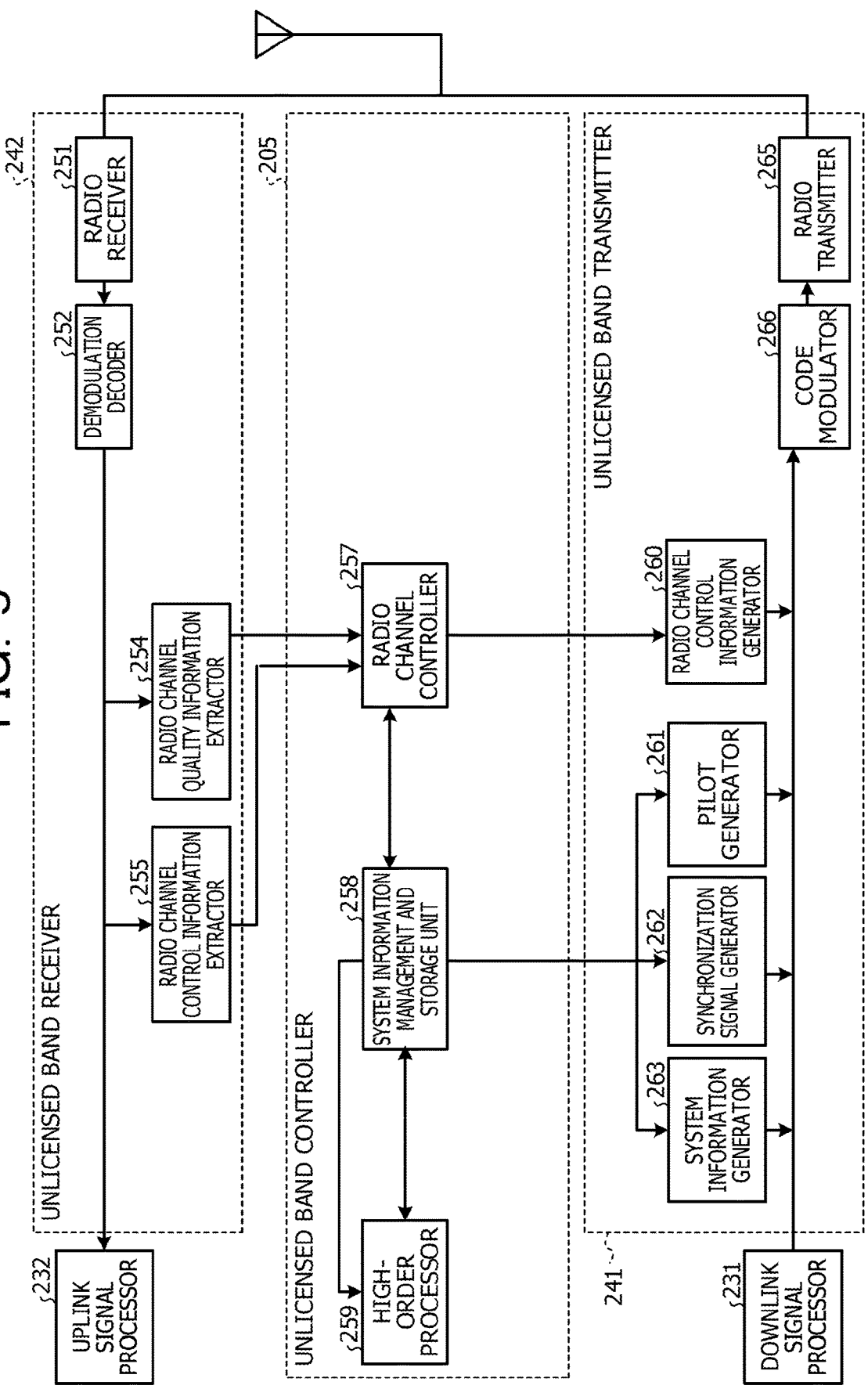
FIG. 9 is a block diagram illustrating configuration examples of the physical layer processor and the unlicensed band controller according to the first embodiment.

Next, detail of the physical layer processor 204 and the unlicensed band controller 205 of the base station 2 is described with reference to FIG. 9. FIG. 9 is a block diagram illustrating configuration examples of the physical layer processor and the unlicensed band controller according to the first embodiment. For the unlicensed band controller 205, however, FIG. 9 illustrates only functions requested in the physical layer processing. The base station 2 performs the following processings to the SCell.

The unlicensed band receiver 242 includes a radio receiver 251, a demodulation decoder 252, a radio channel quality information extractor 254, and a radio channel control information extractor 255.

The radio receiver 251 receives signals transmitted from the communication terminal 3 using the unlicensed band, via the antenna. Then, the radio receiver 251 amplifies the received signals and further converts from the radio frequency to the base band signal. Then, the radio receiver 251 outputs the signals converted to the base band signal to the demodulation decoder 252.

The demodulation decoder 252 receives input of the signals from the radio receiver 251. Then, the demodulation decoder 252 performs the demodulation processing of the received signals. Further, the demodulation decoder 252 performs the demodulation processing of the demodulated signal. Then, the demodulation decoder 252 outputs the signals subjected to the respective processings to the uplink signal processor 232.

The radio channel quality information extractor 254 extracts radio channel quality information including the RSRP out of the signals transmitted from the demodulation decoder 252. Then, radio channel quality information extractor 254 outputs the extracted radio channel quality information to a radio channel controller 257.

The radio channel control information extractor 255 extracts the radio channel control signal including the RA preamble transmitted from the demodulation decoder 252. The radio channel control information extractor 255 extracts the RA preamble out of the radio channel control signal. Then, the radio channel control information extractor 255 outputs the RA preamble to the radio channel controller 257.

The unlicensed band controller 205 includes a radio channel controller 257, a system information management and storage unit 258, and a high-order processor 259.

The radio channel controller 257 receives request of control information such as DRAP used for establishing the radio channel, from the radio channel control information extractor 255. Then, the radio channel controller 257 outputs control information used for establishing the radio channel to the radio channel control information generator 260. Further, the radio channel controller 257 acquires system information request out of the request of the control information used for establishing the radio channel. Then, the radio channel controller 257 outputs the system information request to the system information generator 263 via the system information management and storage unit 258.

The radio channel controller 257 receives input of the RA preamble from the radio channel control information extractor 255. Then, the radio channel controller 257 controls to reply the RA response to the RA preamble. For example, the radio channel controller 257 implements controls to request implementation of generation of the TAI that controls transmission timing of the communication terminal 3, aperiodic radio channel measurement, and radio channel measurement result report. Then, the radio channel controller 257 outputs control information for the RA response to the radio channel control information generator 260.

When determined to implement the radio channel quality measurement not conforming to the measurement period, the radio channel controller 257 notifies the radio channel control information generator 260 of the radio channel quality measurement. In this case, the radio channel controller 257 transmits the condition of the radio channel quality measurement to the radio channel control information generator 260.

The radio channel controller 257 receives input of the radio channel quality measurement and calculation result from the radio channel control information extractor 255 as a response to the aperiodic radio channel measurement request. Then, the radio channel controller 257 selects, based on the acquired radio channel quality, a communication terminal to which downlink data is transmitted. Here, the following describes operations that take place when radio channel controller 257 selects the communication terminal 3. Then, the radio channel controller 257 selects, for example, the data amount, the radio resource, the modulation scheme, and the code rate, which are used when performing the downlink data transmission to the communication terminal 3. Next, the radio channel controller 257 outputs the selection result to the radio channel control information generator 260.

Also, the radio channel controller 257 receives input of a pilot signal transmitted from a communication terminal including the communication terminal 3 from the radio channel control information extractor 255. Then, the radio channel controller 257 measures and calculates the uplink radio channel quality from the received pilot signal. Next, the radio channel controller 257 selects a communication terminal that performs uplink data transmission based on the radio channel quality. Here, the following describes operations that take place when the radio channel controller 257 selects the communication terminal 3 as a communication terminal that performs uplink data transmission based on the radio channel quality.

Next, the radio channel controller 257 selects, for example, the data amount, the radio resource, the modulation scheme, and the code rate, which are used when the communication terminal 3 performs uplink data transmission. Thereafter, the radio channel controller 257 outputs the selection result to the radio channel control information generator 260.

The high-order processor 259 performs control processing in the PDCP processor 201, the RLC processor 202, and the MAC processor 203.

The licensed band transmitter 241 includes a radio channel control information generator 260, a pilot generator 261, a synchronization signal generator 262, a system information generator 263, a radio transmitter 265, and a code modulator 266.

The radio channel control information generator 260 receives input of the control information for the RA response from the radio channel controller 257. Then, the radio channel control information generator 260 generates the RA response using the acquired control information. Thereafter, the radio channel control information generator 260 outputs the generated RA response to the code modulator 266 and transmits to the communication terminal 3.

The radio channel control information generator 260 receives, from the radio channel controller 257, the notification of the radio circuit quality measurement not conforming to the measurement period. In this case, the radio channel control information generator 260 also receives the condition of the radio channel quality measurement from the radio channel controller 257. Then, the radio channel control information generator 260 generates radio channel quality measurement request using the condition of the radio channel quality measurement. Thereafter, the radio channel control information generator 260 outputs the generated radio channel quality measurement request to the code modulator 266 and transmits to the communication terminal 3.

The radio channel control information generator 260 receives, from the radio channel controller 257, the selection result such as the data amount, the radio resource, the modulation scheme, and the code rate, which are used when downlink data transmission to the communication terminal 3 is implemented. Then, the radio channel control information generator 260 generates the downlink control information including the selection result. Thereafter, the radio channel control information generator 260 outputs the generated downlink control information including the selection result to the code modulator 266 and transmits to the communication terminal 3.

The radio channel control information generator 260 receives, from the radio channel controller 257, the selection result such as the data amount, the radio resource, the modulation scheme, and the code rate, which are used when the communication terminal 3 performs uplink data transmission. Then, the radio channel control information generator 260 generates the uplink control information including the selection result. Thereafter, the radio channel control information generator 260 outputs the generated uplink control information including the selection result to the code modulator 266 and transmits to the communication terminal 3.

The system information management and storage unit 258 stores and manages the condition of the radio channel quality measurement, the cell selection information, the neighboring cell information, the MBSFN-related information, the network identification information, and the CA-related information.

The system information generator 263 receives the system information request from the radio channel controller 257 via the system information management and storage unit 258. Then, the system information generator 263 acquires, for example, network identification information of the base station 2 (cell 20, SCell) from the system information management and storage unit 258. Then, the system information generator 263 generates system information using, for example, the acquired network identification information. The system information also includes RA-related control information. Thereafter, the system information generator 263 transmits the system information including the network identification information to the base station 1 via the X2 interface. The system information generator 263 may output the system information including the network identification information to the code modulator 266 and transmit to the communication terminal 3.

The synchronization signal generator 262 acquires cell IDs of neighboring cells of the communication terminal 3 from the system information management and storage unit 258. Then, the synchronization signal generator 262 calculates the synchronization signal. Thereafter, the synchronization signal generator 262 outputs the generated synchronization signal to the code modulator 266 and transmits to the communication terminal 3.

After the unlicensed band use notification is transmitted to the communication terminal 3, the pilot generator 261 calculates the pilot signal. Then, the pilot generator 261 outputs the generated pilot signal to the code modulator 266 and transmits to the communication terminal 3.

However, in the base station 2 using the unlicensed band, a processing different from that of the cell using the licensed band is performed. The unlicensed band also may be used by other systems. Therefore, when using the unlicensed band or transmitting with a frequency of the unlicensed band, non-use of the frequency is verified. For example, the radio channel controller 257 receives, from the radio channel quality information extractor 254, input of the radio channel quality information of the signal received with a frequency of the unlicensed band by the radio receiver 251. Then, the radio channel controller 257 determines whether there exists a significant radio signal but not noise among signals received with a frequency of the unlicensed band. For example, when the received signal strength indicator (RSSI) using an amplifier is a threshold value or more or when detector output is a threshold value or more, the radio channel controller 257 determines that a significant radio signal exists or the unlicensed band is used by another system. In this case, the radio channel controller 257 does not perform transmission with the frequency for a predetermined period. The significant radio signal represents a noise such as a thermal noise.

When determined that the unlicensed band is used by another system and therefore transmission is not available, the radio channel controller 257 verifies whether the unlicensed band is also used by another system with another frequency. After elapse of a predetermined period of time, the radio channel controller 257 verifies whether the unlicensed band is also used by another system. The predetermined time may be specified by the decree.

Meanwhile, when determined that the unlicensed band is not used by another system, the radio channel controller 257 instructs the synchronization signal generator 262 and the pilot generator 261 via the system information management and storage unit 258 to transmit or broadcast the synchronization signal and the pilot. The method for verifying non-collision prior to the transmission in such a manner is called as the listen before talk (LBT) or the CSAM/CA.

The code modulator 266 receives input of signals from the downlink signal processor 231, the radio channel control information generator 260, the pilot generator 261, the synchronization signal generator 262, and the system information generator 263. The code modulator 266 performs coding and modulation of input signals. Further, the code modulator 266 maps the input signals into the radio frame, the slot, or the sub-frame. The code modulator 266 outputs the mapped signals to the radio transmitter 265.

The radio transmitter 265 receives input of signals mapped into the radio frame, the slot, or the sub-frame from the code modulator 266. Then, the radio transmitter 265 converts the frequency of the mapped signals to the radio frequency. Further, the radio transmitter 265 amplifies the mapped signals. Thereafter, the radio transmitter 265 transmits the mapped signals to the communication terminal 3 using the unlicensed band via the antenna.

In the above description, both the PCell and the SCell perform data transmission in the same manner. However, transmission of user data may not be performed by the PCell but the SCell only. Also, when the base station 1 notifies the communication terminal 3 of the network identification information of the base station 2 (the cell 20), transmission of the system information may be performed by the PCell only, but not SCell.

<Configuration of Communication Terminal>

Figure 10:
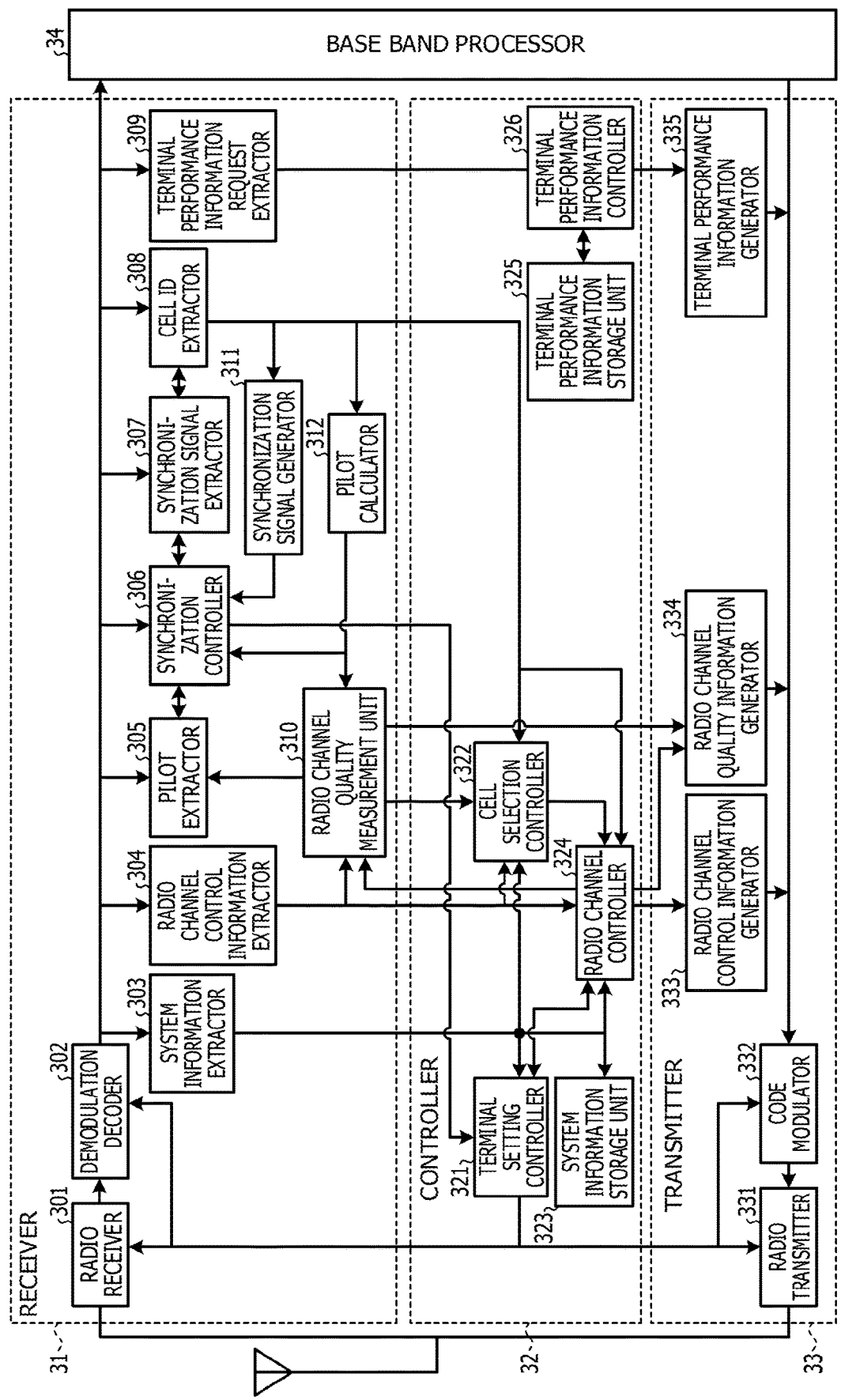
FIG. 10 is a block diagram illustrating a configuration example of a communication terminal according to the first embodiment.

Next, the communication terminal 3 is described with reference to FIG. 10. FIG. 10 is a block diagram illustrating a configuration example of the communication terminal according to the first embodiment. The communication terminal 3 includes a receiver 31, a controller 32, a transmitter 33, and a base band processor 34. The communication terminal 3 is a communication terminal which is capable of simultaneously communicating with both the licensed band and the unlicensed band. In other words, the communication terminal 3 is a communication terminal which is capable of simultaneously communicating with both the base station 1 (the PCell) of the licensed band and the base station 2 (the SCell) of the unlicensed band.

The receiver 31 includes a radio receiver 301, a demodulation decoder 302, a system information extractor 303, a radio channel control information extractor 304, a pilot extractor 305, a synchronization controller 306, and a synchronization signal extractor 307. Further, the receiver 31 includes a cell ID extractor 308, a terminal performance information request extractor 309, a radio channel quality measurement unit 310, a synchronization signal generator 311, and a pilot calculator 312.

The radio receiver 301 receives a signal transmitted from the base stations 1, 2 via an antenna. The radio receiver 301 receives a signal transmitted from the base station 1 (the cell 10, the PCell) using the licensed band. The radio receiver 301 receives a signal transmitted from the base station 2 (the cell 20, the SCell) using the unlicensed band. In this operation, the radio receiver 301 receives an instruction of the receiving frequency band from the terminal setting controller 321. Then, the radio receiver 301 amplifies the received signal and converts from the radio frequency to the base band signal. Then, the radio receiver 301 outputs the signal converted to the base band signal to the demodulation decoder 302.

The demodulation decoder 302 receives input of the signal from the radio receiver 301. Then, the demodulation decoder 302 performs demodulation processing of the received signal. Further, the demodulation decoder 302 performs demodulation processing of the demodulated signal. The demodulation decoder 302 demodulates and decodes in accordance with a predetermined modulation and coding scheme or a method corresponding to a modulation and coding scheme instructed by the terminal setting controller 321. Then, the demodulation decoder 302 outputs the signal subjected to the respective processings to the base band processor 34.

The system information extractor 303 extracts the system information transmitted from the base station 1 or the base station 2, out of signals transmitted from the demodulation decoder 302. Then, the system information extractor 303 causes the system information storage unit 323 to store the extracted system information. The system information extractor 303 outputs the extracted system information to the terminal setting controller 321, the cell selection controller 322, and the radio channel controller 324. The system information extracted by the system information extractor 303 includes the network identification information.

The radio channel control information extractor 304 extracts the control information of a layer (L) 1/L2 transmitted by the base station 1 or the base station 2 in the PDCCH, out of signals transmitted from the demodulation decoder 302. The control information includes such information, for example, allocation of the uplink (UL) radio resource and applied modulation and coding scheme. Further, the control information generator includes the unlicensed band use notification. Then, the radio channel control information extractor 304 outputs the extracted control information to the radio channel controller 324.

The radio channel control information extractor 304 extracts the radio channel quality measurement request out of the signal transmitted from the demodulation decoder 302. Then, the radio channel control information extractor 304 outputs the extracted radio channel quality measurement request to the radio channel controller 324.

The radio channel control information extractor 304 extracts the radio channel control request transmitted by the base station 1 or the base station 2, out of signals transmitted from the demodulation decoder 302. Then, the radio channel control information extractor 304 outputs the radio channel control request to radio channel quality measurement unit 310 and the radio channel controller 324.

The pilot extractor 305 extracts the pilot signal out of signals transmitted from the demodulation decoder 302 based on the timing of the radio frame and the slot detected by the synchronization controller 306. Then, the pilot extractor 305 outputs the extracted pilot signal to the synchronization controller 306 and the radio channel quality measurement unit 310. For example, in the LTE system, the pilot signal is a reference signal (RS).

The synchronization signal extractor 307 extracts the synchronization signal transmitted by the base station 1 in the PSS and the SSS for each of CCs, out of signals transmitted from the demodulation decoder 302. Then, the synchronization signal extractor 307 outputs the synchronization signal to the cell ID extractor 308 and the synchronization controller 306.

The synchronization controller 306 detects the timing of the radio frame and the timing of the slot based on the synchronization signal extracted by the synchronization signal extractor 307. Then, the synchronization controller 306 notifies the terminal setting controller 321 and the pilot extractor 305 of the detected timings of the radio frame and the slot. The synchronization controller 306 also feedbacks detected timings of the radio frame and the slot to the synchronization signal extractor 307.

Further, the synchronization controller 306 receives input of the pilot calculated by the pilot calculator 312. Then, the synchronization controller 306 performs symbol synchronization based on the pilot signal extracted by the pilot extractor 305 and the pilot calculated by the pilot calculator 312. The symbol synchronization is a synchronization at a head timing of the symbol.

The cell ID extractor 308 receives input of the synchronization signal from the synchronization signal extractor 307. Next, the cell ID extractor 308 identifies the cell ID from the PSS and the SSS. For example, the cell ID extractor 308 may derive the cell ID of the base station 1 based on two synchronization signals: the PSS and the SSS transmitted from the base station 1. Then, the cell ID extractor 308 outputs the identified cell ID to the synchronization signal generator 311, the pilot calculator 312, and the cell selection controller 322.

The synchronization signal generator 311 receives input of the cell ID from the cell ID extractor 308. Then, the synchronization signal generator 311 generates the synchronization signal based on the acquired cell ID. Thereafter, the synchronization signal generator 311 outputs the generated synchronization signal to the synchronization controller 306.

The pilot calculator 312 receives input of the cell ID from the cell ID extractor 308. Then, the pilot calculator 312 calculates the pilot based on the acquired cell ID. Then, the pilot calculator 312 outputs the calculated pilot to the synchronization controller 306 and the radio channel quality measurement unit 310.

Here, the synchronization is described below. The following describes operations that take place, as an example, when the communication terminal 3 synchronizes with the base station 1. The synchronization controller 306 synchronizes in advance with the base station 1 to be measured to enable the radio channel quality measurement calculator 310 to measure radio channel quality. This is performed for identifying the pilot signal from other signals and for identifying the pilot signal itself.

As a synchronization method, the synchronization controller 306 identifies the head of the radio frame based on the synchronization signal transmitted from the base station 1. This is sometimes referred to as the frame synchronization. Further, the synchronization controller 306 identifies, using the synchronization signal, the head of the radio frame, the head of sub-frames constituting the radio frame, or the head of the slot. Identification of the head of sub-frames constituting the radio frame or the head of the slot is sometimes referred to as the frame synchronization or the slot synchronization.

The synchronization controller 306 calculates the correlation between a synchronization signal generated by the synchronization signal generator 311 in accordance with a synchronization signal generation method shared in advance by the base station 1 and the communication terminal 3, and a synchronization signal received from the base station 1 to identify the synchronization signal sequence and locate the head of the sequence. Thus, the synchronization controller 306 calculates the heads of frame and slot. The synchronization signal normally includes a plurality of signals, and is a signal sequence including a plurality of signals (a plurality of symbols), but not one signal or one symbol. For example, in the LTE system, the communication terminal 3 may calculate or identify the cell information by identifying the synchronization signal sequence. Here, the synchronization signal sequence includes the cell ID or the CID, or the physical cell identification (P-ID).

Further, the synchronization controller 306 performs symbol synchronization using the pilot signal. Here, the pilot signal sequence calculation method is shared in advance by the base station 1 and the communication terminal 3 as in the identification of the synchronization signal. Then, the synchronization controller 306 compares a pilot signal received from the base station 1 and a pilot calculated by the pilot calculator 312 with each other and calculates the correlation between the pilot signal and the pilot to perform symbol synchronization.

In the LTE system, the pilot calculator 312 may calculate the pilot signal based on the cell ID derived from the synchronization signal by the cell ID extractor 308. This reduces the time taken for the symbol synchronization. In other words, unless the cell ID is derived by receiving the synchronization signal, the time taken for the symbol synchronization increases.

The pilot extractor 305, the synchronization controller 306, and the synchronization signal extractor 307 perform synchronization by receiving the synchronization signal and the pilot signal from neighboring cells upon receiving the instruction to implement the synchronization from the radio channel quality measurement unit 310.

The terminal performance information request extractor 309 extracts the terminal performance information request transmitted from the base station 1, out of signals transmitted from the demodulation decoder 302. Then, the terminal performance information request extractor 309 outputs the extracted terminal performance information request to the terminal performance information controller 326.

The radio channel quality measurement unit 310 receives input of the pilot calculated by the pilot calculator 312. The radio channel quality measurement unit 310 receives the pilot signal from the pilot extractor 305. Then, the radio channel quality measurement unit 310 measures radio channel quality using the acquired pilot signal and the pilot calculated by the pilot calculator 312. In this operation, the radio channel quality measurement unit 310 measures, as the radio channel quality, for example, the pilot reception power (RSRP), the pilot reception quality (RSRQ), the radio channel quality or the channel quality, or the signal to interference ratio (SIR). As an index indicating the reception quality, for example, the radio channel quality index (CQI) and the signal to interference and noise ratio (SINR) may be used. Then, the radio channel quality measurement unit 310 notifies the radio channel quality information generator 334 of the measurement result of the radio channel quality. The radio channel quality measurement unit 310 feedbacks the measurement result of the radio channel quality to the pilot extractor 305.

The radio channel quality measurement unit 310 also measures the reception power or the reception electric field intensity using the pilot signal. Then, the radio channel quality measurement unit 310 notifies the cell selection controller 322 of the measurement result.

As the pilot signal, the LTE specifies the cell shared common pilot signal (CRS: cell specific reference signal) common to a plurality of communication terminals within the cell and the individual pilot signal (DRS: dedicated reference signal) individually allocated to communication terminals. Further, the LTE system specifies a pilot signal for positioning (PRS: positioning reference signal) and a pilot signal (CSI RS: channel state information reference signal) for measuring the radio channel quality (radio channel state information). Here, the common pilot signal is sometimes called as common reference signal, cell specific pilot, or common pilot. The individual pilot signal is sometimes called as dedicated pilot or UE specific RS. The pilot signal for positioning is sometimes called as positioning pilot or positioning RS. The pilot signal for measuring radio channel quality is sometimes called as channel state information pilot.

The radio channel quality measurement unit 310 may perform the measurement using any one of the pilot signals. In other words, the radio channel quality measurement unit 310 may measure the radio channel quality using a known signal, or a predetermined signal between the base station 1 or the base station 2 and the communication terminal 3, or within the wireless communication system.

The regular pilot signal is a signal aimed at the demodulation or a signal aimed at the radio channel quality measurement. The signal aimed at the demodulation is alternatively called as individual pilot signal or the demodulation pilot. The signal aimed at the radio channel quality measurement is alternatively referred to as common pilot signal.

Upon acquiring the radio channel control request from the radio channel control information extractor 304 or when the period for measuring the radio channel quality has come, the radio channel quality measurement unit 310 instructs the synchronization controller 306 and the synchronization signal extractor 307 via the pilot extractor 305 to implement synchronization.

The controller 32 includes a terminal setting controller 321, a cell selection controller 322, a system information storage unit 323, a radio channel controller 324, a terminal performance information storage unit 325, and a terminal performance information controller 326.

The terminal setting controller 321 receives input of the system information from the system information extractor 303. Then, the terminal setting controller 321 performs the following controls based on the system information.

The terminal setting controller 321 determines the radio resource allocated to the communication terminal 3 based on the control information specified by the radio channel controller 324, and determines the applied modulation and coding scheme. Then, the terminal setting controller 321 controls operations of the radio receiver 301, the demodulation decoder 302, the radio transmitter 331, and the code modulator 332.

The terminal setting controller 321 receives the unlicensed band use notification from the radio channel controller 324. Then, the terminal setting controller 321 determines that a radio resource of the unlicensed band is used in the communication terminal 3. Then, the terminal setting controller 321 sets the frequency corresponding to the unlicensed band to the radio receiver 301, the demodulation decoder 302, the radio transmitter 331, and the code modulator 332.

The cell selection controller 322 receives input of the system information from the system information extractor 303. Then, the cell selection controller 322 performs the cell selection control based on the system information. The cell selection controller 322 may acquire the control information such as the measurement bandwidth and the cell selection priority from the received system information prior to cell selection, and use the acquired information for cell selection.

The cell selection controller 322 receives the measurement result of the radio channel quality from the radio channel quality measurement unit 310. The cell selection controller 322 receives input of the cell ID from the cell ID extractor 308. Further, the cell selection controller 322 acquires the control information of the communication terminal 3 extracted by the radio channel control information extractor 304.

The cell selection controller 322 identifies the cell ID having a highest radio channel quality using the measurement result of the input radio channel quality, the cell ID and the control information of the communication terminal 3. For example, the cell selection controller 322 performs cell selection using at least one of the above RSRP and the RSRQ measured by the radio channel quality measurement unit 310. Then, the cell selection controller 322 outputs the cell ID of the selected cell to the radio channel controller 324. The cell selection controller 322 repeats cell selection until a cell satisfying the cell selection condition is located.

For example, in the LTE system, the cell selection controller 322 selects a base station having a highest radio channel quality using the RSRP and the RSRQ. The cell 10 that the cell selection controller 322 selects as a first radio channel turns to the PCell. Then, the communication terminal 3 performs standby and channel connection in the cell 10. In the W-CDMA system and the LTE system, the standby is called as "camp on". Further, the wireless communication system according to the first embodiment performs the CA. When selecting the SCell in the communication terminal 3 but not in the base station 1, the cell selection controller 322 selects the cell 20 which turns to the cell 20, as a second radio channel, out of a plurality of cells 20.

The radio channel controller 324 acquires the cell ID extracted by the cell ID extractor 308. The radio channel controller 324 acquires the control information extracted by the radio channel control information extractor 304. The radio channel controller 324 receives input of the cell ID of the cell selected as the connection destination from the cell selection controller 322. The radio channel controller 324 receives input of the system information from the system information extractor 303. Then, the radio channel controller 324 performs the following controls based on the system information. The system information of the base station 1 includes the network identification information of the base station 1, the cell 10 (the PCell), and the system information of the base station 2 includes the network identification information of the base station 2 (the cell 20, the SCell).

For example, the radio channel controller 324 receives input of the cell ID from the radio channel control information extractor 304. Then, the radio channel controller 324 determines whether the cell ID notified from the base station 1 or the base station 2 and the calculated cell ID match each other. When the cell IDs match each other, the radio channel controller 324 causes the system information storage unit 323 to store information of the cell.

Then, if connected to the licensed band, when the cell IDs match each other, the radio channel controller 324 causes the radio channel quality measurement unit 310 to measure the radio channel quality of the cell in the licensed band.

Meanwhile, if connected to the unlicensed band, when the cell IDs match each other, the radio channel controller 324 compares network identification information of the cell 10 and network identification information of the cell 20 with each other.

When the network identification information of the cell 10 and the network identification information of the cell 20 match each other, the radio channel controller 324 causes the radio channel quality measurement unit 310 to measure the radio channel quality of the cell in the unlicensed band (in other word, the cell 20 having the cell ID acquired from the radio channel control information extractor 304). Meanwhile, when the network identification information of the cell 10 and the network identification information of the cell 20 do not match each other, the radio channel controller 324 does not cause the radio channel quality measurement unit 310 to measure the radio channel quality of the cell in the unlicensed band. In other words, when the network identification information of the cell 10 and the network identification information of the cell 20 match each other, measurement of the radio channel quality of the cell in the unlicensed band is performed, and when both of the network identification information do not match each other, measurement of the radio channel quality of the cell in the unlicensed band is not performed. When the network identification information of the cell 10 and the network identification information of the cell 20 do not match each other, the radio channel controller 324 causes the radio channel quality information generator 334 not to generate the radio channel quality information. Meanwhile, when the network identification information of the cell 10 and the network identification information of the cell 20 match each other, the radio channel controller 324 causes the radio channel quality information generator 334 to generate the radio channel quality information.

Further, when the network identification information of the cell 10 and the network identification information of the cell 20 do not match each other, the radio channel controller 324 outputs the instruction to generate "error network notification" to the radio channel control information generator 333 in order to invalidate the selection result of the SCell in the radio channel controller 157 of the base station 1.

When the network identification information of the cell 10 and the network identification information of the cell 20 do not match each other, the radio channel controller 324 determines not to establish the radio channel between the communication terminal 3 and the cell 20. Meanwhile, when the network identification information of the cell 10 and the network identification information of the cell 20 match each other, the radio channel controller 324 determines to establish the radio channel between the communication terminal 3 and the cell 20.

The radio channel controller 324 acquires control information on the RA as the control information extracted by the radio channel control information extractor 304. Then, when data to be transmitted is generated during standby in the cell 10 or a call request is made, the radio channel controller 324 controls implementation of the RA based on the RA-related control information. For example, the radio channel controller 324 selects the RA preamble out of a plurality of predetermined preambles. Then, the radio channel controller 324 transmits the selected RA preamble to the base station 1.

Thereafter, the radio channel controller 324 acquires the RA response as the control information extracted by the radio channel control information extractor 304. Then, the radio channel controller 324 implements control for transmitting the scheduled transmission in accordance with the RA response. Thereafter, the radio channel controller 324 instructs the radio channel control information generator 333 to generate the scheduled transmission.

Upon receiving the control information used to establish the radio channel such as the control information used for the DRAP and the RA transmitted from the cell 10 from the radio channel control information extractor 304, the radio channel controller 324 performs the following controls. The radio channel controller 324 implements the RA with the cell 10 or the cell 20 which is the transmission source of the control signal. Use of the DRAP avoids simultaneous use of the preamble by another communication terminal and thereby avoids collision between preambles. For this reason, the radio channel controller 324 implements the RA (in other words, non-contention based random access procedure) different from the case where the above communication terminal 3 selects the preamble (in other words, contention based random access procedure). Here, the message giving notice of the DRAP transmitted from the cell 10 to the communication terminal is the message 0 which is called as random access preamble assignment.

The radio channel controller 324 instructs the radio channel control information generator 333 to transmit the RA preamble using the DRAP to the cell 20.

The terminal performance information storage unit 325 stores information indicating whether the communication terminal 3 may use the unlicensed band.

The system information storage unit 323 receives input of the system information transmitted from the base station 1, from the system information extractor 303. Then, the system information storage unit 323 stores the acquired system information.

The terminal performance information controller 326 acquires the terminal performance information request extracted by the terminal performance information request extractor 309. Then, the terminal performance information controller 326 acquires, from the terminal performance information storage unit 325, information indicating whether the communication terminal 3 may use the unlicensed band. Thereafter, the terminal performance information controller 326 instructs the terminal performance information generator 335 to transmit the information indicating whether the communication terminal 3 may use the unlicensed band, and the terminal performance information to the base station 1.

The transmitter 33 includes a radio transmitter 331, a code modulator 332, a radio channel control information generator 333, a radio channel quality information generator 334, and a terminal performance information generator 335.

The radio channel control information generator 333 receives the instruction to generate the scheduled transmission from the radio channel controller 324. Then, the radio channel control information generator 333 generates the scheduled transmission in accordance with the control of the radio channel controller 324. Thereafter, the radio channel control information generator 333 outputs the scheduled transmission to the code modulator 332 and transmits to the base station 1.

When connected to the cell 20, the radio channel control information generator 333 receives the instruction to transmit the RA preamble using the DRAP from the radio channel controller 324. Then, the radio channel control information generator 333 transmits the RA preamble using the DRAP to the cell 20. In this operation, the RA preamble may contain the DRA only.

The radio channel control information generator 333 generates the error network notification in accordance with the instruction from the radio channel controller 324 to generate the error network notification, outputs to the code modulator 332, and transmits to the base station 1.

The radio channel quality information generator 334 receives input of the measurement result of the radio channel quality from the radio channel quality measurement unit 310. Next, the radio channel quality information generator 334 generates the control information (the measurement report) indicating the reception quality based on the measurement result of radio channel quality. For example, the channel quality indication (CQI) representing the reception quality with discrete values may be used as the measurement report.

The terminal performance information generator 335 receives the information indicating whether the unlicensed band is available, and the instruction to transmit the terminal performance information to the base station 1, from the terminal performance information controller 326. Then, the terminal performance information generator 335 generates, in accordance with the instruction, the terminal performance information including the information indicating whether the unlicensed band is available. Then, the terminal performance information generator 335 outputs the generated terminal performance information to the code modulator 332 and transmits to the base station 1.

The code modulator 332 receives input of signals from the base band processor 34, the radio channel control information generator 333, the radio channel quality information generator 334, and the terminal performance information generator 335. Then, the code modulator 332 encodes the received signals. Further, the code modulator 332 performs demodulation processing of the encoded signals. The code modulator 332 encodes and modulates using a predetermined modulation and coding scheme or a method corresponding to the modulation and coding scheme instructed by the terminal setting controller 321. Then, the code modulator 332 outputs signals subjected to respective processings to the radio transmitter 331.

The radio transmitter 331 receives input of signals processed by the code modulator 332. The radio transmitter 331 receives the instruction of the frequency band of transmission from the terminal setting controller 321. Then, the radio transmitter 331 amplifies the signals and further converts from the base band signal to the radio frequency. Then, the radio transmitter 331 transmits the signals converted to the radio frequency to the base stations 1 and 2 via the antenna. The radio transmitter 331 transmits signals to the base station 1 using the licensed band, and signals to the base station 2 using the unlicensed band.

The base band processor 34 receives input of the base band signal from the demodulation decoder 302. Then, the base band processor 34 processes the signal in accordance with, for example, the processing specified by the received signal. For example, the base band processor 34 stores data into a storage destination specified by the received signal. The base band processor 34 converts the signal to the voice and outputs using the speaker.

When the processing is signal transmission, the base band processor 34 acquires data in accordance with the instruction input by the operator. For example, the base band processor 34 reads data from the memory. Then, the base band processor 34 outputs the signal including the acquired data to the code modulator 332. The base band processor 34 receives the voice from the microphone, converts the voice to the signal, and outputs to the code modulator 332.

<Example of Network Identification Information>

Here, network identification information listed in (A) to (G) below may be utilized as above network identification information for identifying the communication network to which the base station or the cell belongs. The communication network is sometimes called as the public land mobile network (PLMN).

(A) IMSI (MCC+MNC+MSIN) or HNI (MCC+MNC)
(B) TAI (MCC+MNC+TAC) or LAI (MCC+MNC+LAC)
(C) CGI (MCC+MNC+LAC+CI)
(D) BSIC (NCC+BCC)
(E) RSZI (CC, NDC+ZC)
(F) PLMN (MNC)
(G) Lower layer information where "lower layer information (G)" is information for identifying the communication network in the so-called physical layer (layer 1 (L1) in the LTE) and the MAC (layer 2 (L2) in the LTE). Hereinafter, network identification information of above (A) to (E) is described.

(A) IMSI (MCC+MNC+MSIN) or HNI (MCC+MNC)

Figure 11:
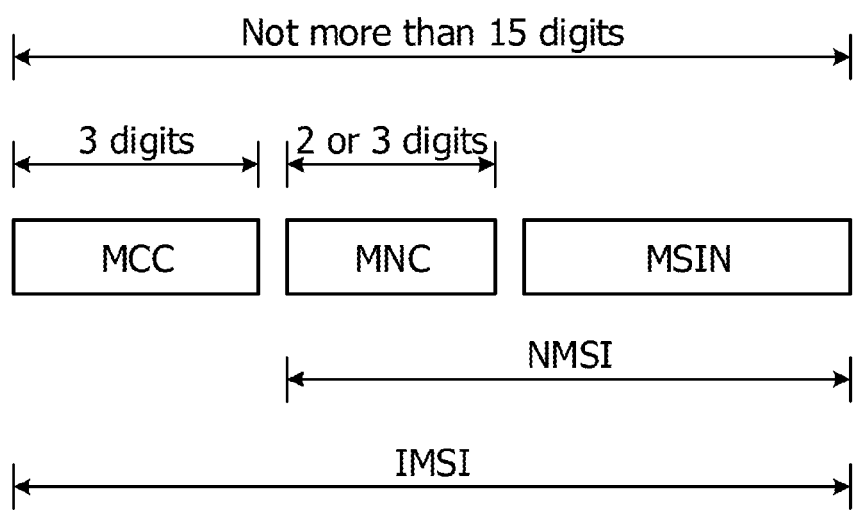
FIG. 11 is a diagram illustrating a configuration example of a IMSI.

In the 3GPP, the international mobile subscriber identity (IMSI) is used as a unique identification number allocated to respective communication terminals. The IMSI consists of 15 digits or more of the decimal number. Breakdown of the 15 digits is illustrated in FIG. 11. FIG. 11 illustrates a configuration example of the IMSI. As illustrated in FIG. 11, first three digits in the IMSI represent the mobile country code (MCC) which indicates the code of the country to which the target communication terminal belongs. The following two or three digits represent the mobile network code (MNC) which indicates the PLMN or communication network to which the target communication terminal belongs. Then, remaining digits represent the mobile station identification number (MSIN) which indicates the communication terminal number in the PLMN. The MNC and the MSIN constitutes the national mobile station identity (NMSI). Combination of the MCC and the MNC corresponds one-to-one to combination of the communication provider and the communication service brand.

For example, the MCC and the MNC are established in Japan as illustrated in FIG. 12. FIG. 12 is a diagram illustrating an example of the MCC and the MNC in Japan. The MCC and the MNC may be collectively called as the home network identity (HNI). The HNI is information indicating to which country and to which communication network (to which communication provider or operator) the target communication terminal belongs. The HNI identifies the communication network to which the cell belongs.

(B) TAI (MCC+MNC+TAC) or LAI (MCC+MNC+LAC)

The tracking area identity (TAI) indicates the location registration area registered to call out the target communication terminal upon receipt of the incoming call. The TAI is information indicating to which country, to which communication network (to which communication provider or operator), and to which location registration area the target communication terminal belongs. The TAI consists of the MCC, the MNC, and the tracking area code (TAC). The TAC is an integer of 16 bits or a hexadecimal number represented by 0000 to FFFF. The TAI indicates the area collectively covering one or more cells. The TAI identifies the range in which the cell group or the target cell exists. Typically, the location registration area includes a plurality of cells.

Figure 13:
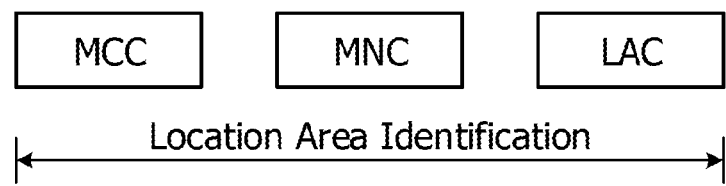
FIG. 13 is a diagram illustrating a configuration example of a LAI.

The local area identity (LAI) is information indicating to which country, to which communication network (to which communication provider or operator), and to which area the target communication terminal belongs. As illustrated in FIG. 13, the LAI consists of the MCC, the MNC, and the location area code (LAC). FIG. 13 is a diagram illustrating a configuration example of the LAI. The LAC is a code specifying the location area in the PLMN, and is a hexadecimal number of two octets (in other word, 16 bits) represented by 0000 to FFFF like the TAC.

(C) CGI (MCC+MNC+LAC+CI)

Figure 14:
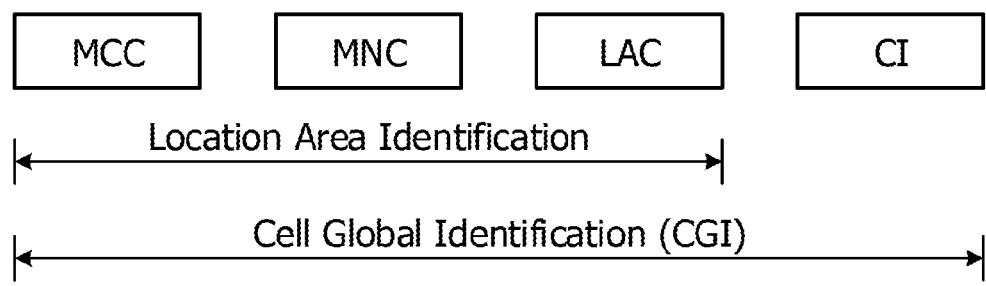
FIG. 14 is a diagram illustrating a configuration example of a CGI.

The cell global identification (CGI) is information indicating to which country and to which communication network (to which communication provider or operator) the target communication terminal belongs. The CGI is based on the LAI and consists of the MCC, the MNC, the LAC, and the cell identity (CI) as illustrated in FIG. 14. FIG. 14 is a diagram illustrating a configuration example of the CGI. The CI is a code indicating the location area or the routing area, and is a hexadecimal number of two octets (in other word, 16 bits) represented by 0000 to FFFF like the TAC.

(D) BSIC (NCC+BCC)

Figure 15:
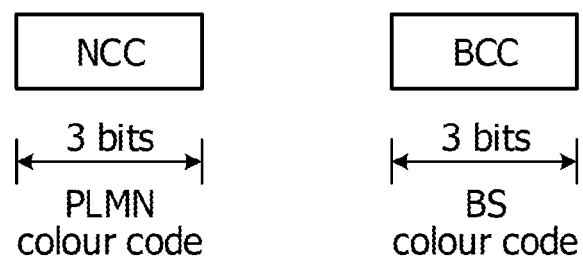
FIG. 15 is a diagram illustrating a configuration example of a BSIC.

The base station identity code (BSIC) has 64 values of 6 bits in total and is broadcast together with the synchronization channel of the SCH or the GSM. As illustrated in FIG. 15, the BSIC consists of the network color code (NCC) of three bits and the base station color code (BCC) of three bits. FIG. 15 is a diagram illustrating a configuration example of the BSIC. The NCC is a code color-coding respective countries by color. For example, Australia is specified with "0", Belgium with "1", and Cyprus with "3". The BCC is a code color-coding respective base stations.

(E) RSZI (CC, NDC+ZC)

Figure 16:
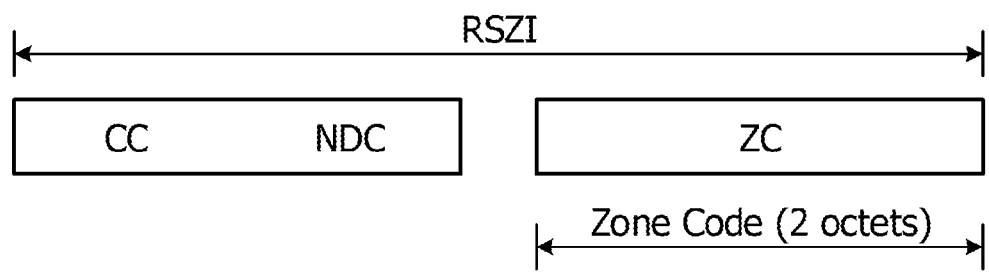
FIG. 16 is a diagram illustrating a configuration example of a RSZI.

The regional subscription zone identity (RSZI) consists of the country code (CC), the national destination code (NDC), and the zone code (ZC) as illustrated in FIG. 16. FIG. 16 is a diagram illustrating a configuration example of the RSZI. The CC is the ID of the country where the PLMN is placed. The NDC is information identifying the PLMN of the target country. The CC and the NDC are the number of the visitor location register (VLR) or the serving GPRS support node (SGSN) specified by E.164 of the ITU-T. The ZC is a four-digit hexadecimal number of two octets.

<Processing of Radio Channel Quality Measurement>

Next, a flow of the synchronization and the radio channel quality measurement is described with reference to FIG. 17. FIG. 17 is a diagram illustrating an example of the sequence of the synchronization and the radio channel quality measurement according to the first embodiment. Here, the following describes operations that take place when the communication terminal 3 is connected to the cell 10 of the base station 1.

The base station 1 transmits the PSS and the SSS being synchronization signals to the communication terminal 3 (step S1).

The communication terminal 3 performs frame synchronization using the PSS and the SSS extracted out of the received signal (step S2).

Next, the communication terminal 3 extracts the cell ID using the PSS and the SSS (step S3).

Next, the communication terminal 3 calculates the pilot signal based on the cell ID (step S4).

The base station 1 generates the pilot signal and transmits the generated pilot signal to the communication terminal 3 (step S5).

The communication terminal 3 performs symbol synchronization using the received pilot signal (step S6).

Next, the communication terminal 3 measures the radio channel quality using the radio channel control information extracted out of the received signal (step S7).

Then, the communication terminal 3 selects a cell to be connected using the measured radio channel quality (step S8).

<Processing of RA>

Figure 18A:
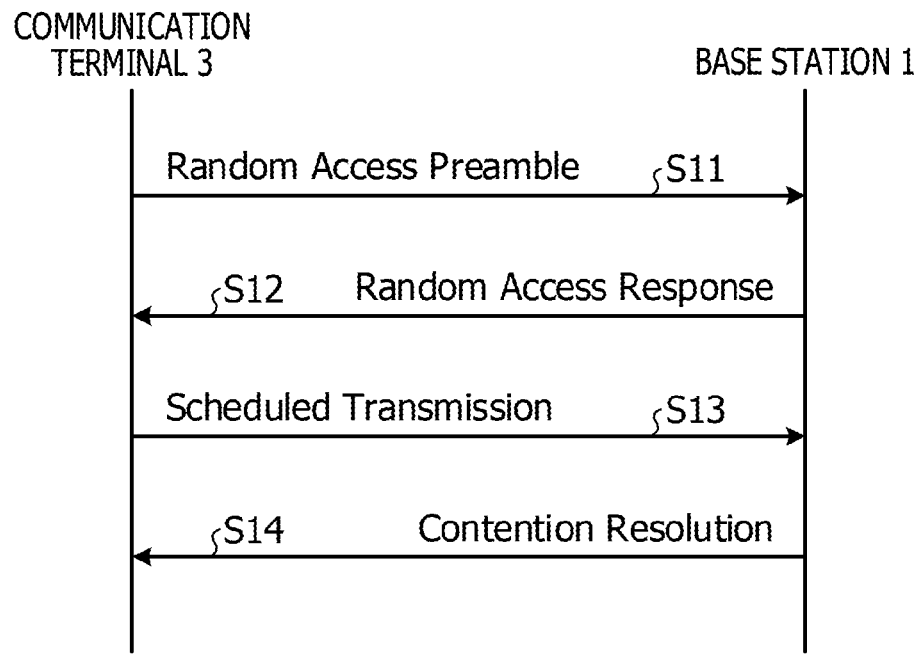
FIG. 18A is a sequence diagram of a contention based random access procedure.
Figure 18B:
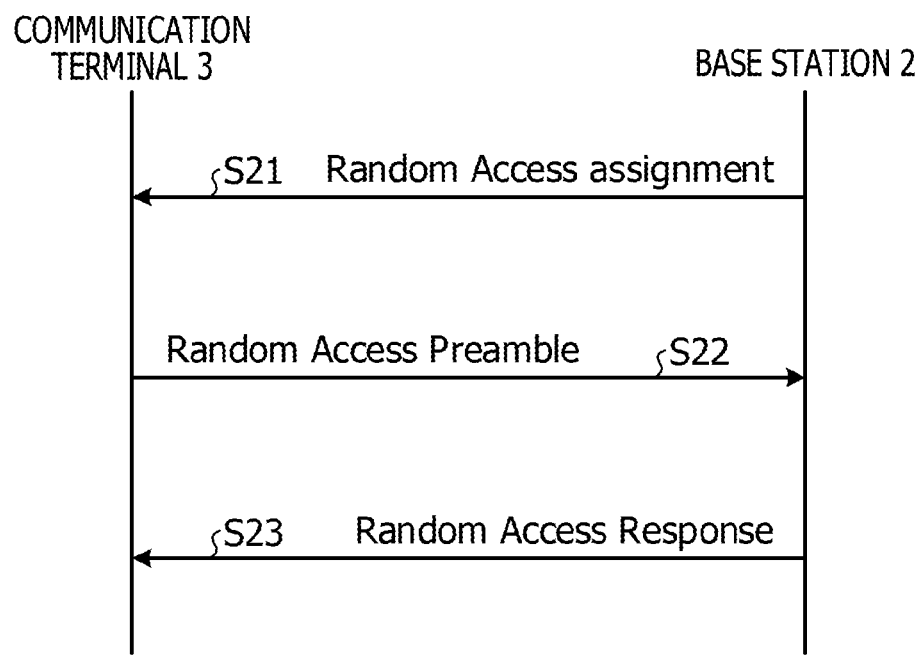
FIG. 18B is a sequence diagram of a non-contention based random access procedure.

Next, a flow of the RA is described with reference to FIGS. 18A and 18B. FIG. 18A is a sequence diagram of the contention based random access procedure. FIG. 18B is a sequence diagram of the non-contention based random access procedure.

In the contention based random access procedure, the communication terminal 3 transmits the random access preamble (RA preamble) to the base station 1 (step S11).

Upon receiving the RA preamble, the base station 1 transmits the random access response (RA response) to the communication terminal 3 (step S12).

Upon receiving the RA response, the communication terminal 3 transmits the scheduled transmission to the base station 1 (step S13).

Upon receiving the scheduled transmission, the base station 1 responds to the communication terminal 3 with the contention resolution (step S14). This establishes a radio channel between the communication terminal 3 and the base station 1, connecting the both with each other.

Meanwhile, in the non-contention based random access procedure, the base station 2 transmits the random access assignment (RA assignment) to the communication terminal 3 (step S21).

Upon receiving the RA assignment, the communication terminal 3 transmits the random access preamble (RA preamble) to the base station 2 (step S22).

Upon receiving the RA preamble, the base station 2 transmits the random access response (RA response) to the communication terminal 3 (step S23). This establishes a radio channel between the communication terminal 3 and the base station 2, connecting the both with each other.

<Processing of SCell Connection>

Figure 19:
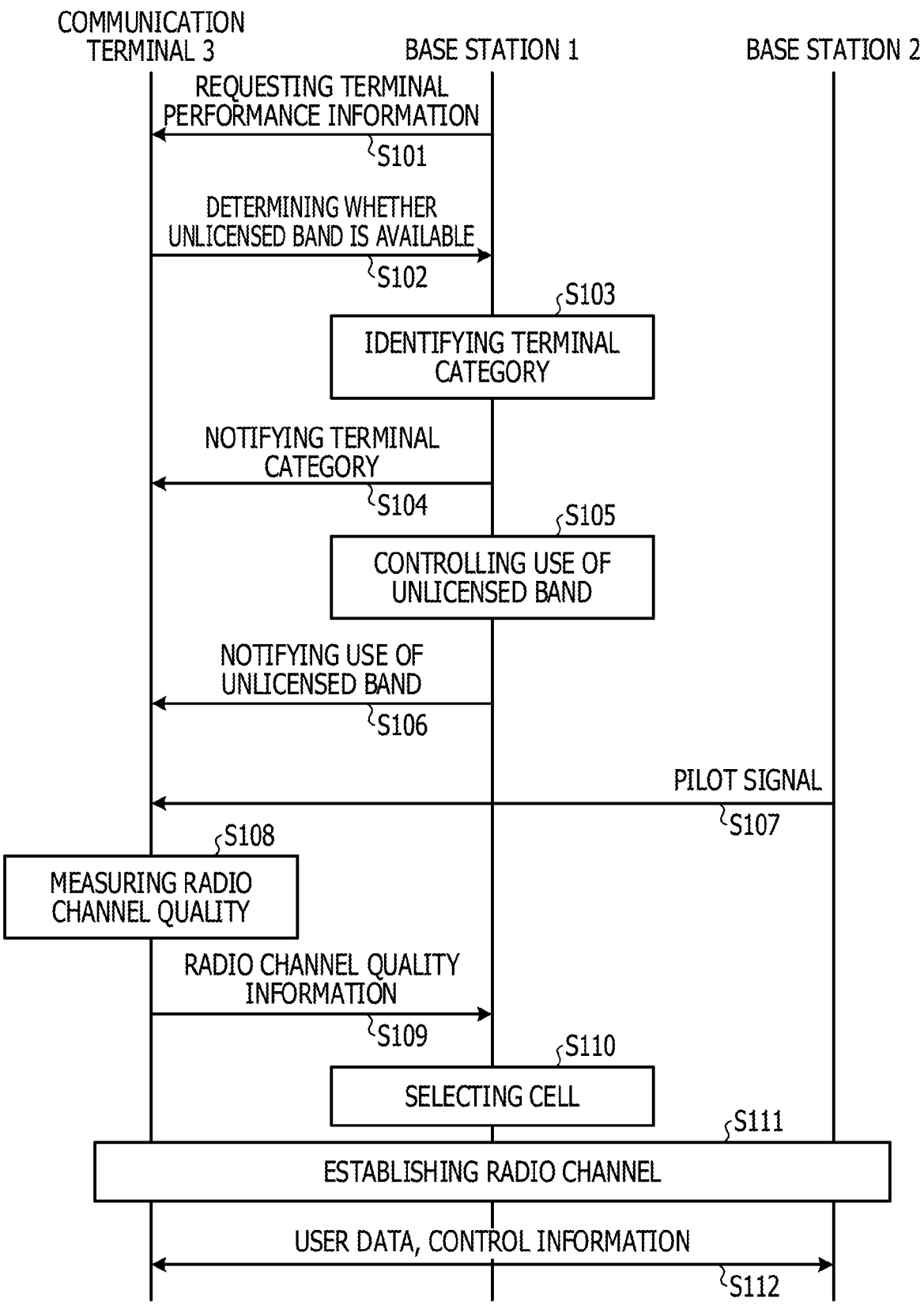
FIG. 19 is a diagram illustrating an example of a sequence of SCell connection in the wireless communication system according to the first embodiment.

Next, a flow of the SCell connection in the wireless communication system according to the first embodiment is described with reference to FIG. 19. FIG. 19 is a diagram illustrating an example of the sequence of the SCell connection in the wireless communication system according to the first embodiment.

The base station 1 transmits the terminal performance information request to the communication terminal 3 (step S101).

The communication terminal 3 generates, in response to the terminal performance information request extracted from the received signal, the terminal performance information including the information indicating whether the unlicensed band is available. Then, the communication terminal 3 transmits the generated terminal performance information to the base station 1 and thereby notifies the base station 1 whether the unlicensed band is available (step S102). Here, the communication terminal 3 is enabled to use the unlicensed band.

The base station 1 identifies the terminal category of the communication terminal 3 based on the availability of the unlicensed band included in the terminal performance information (step S103).

The base station 1 notifies the communication terminal 3 of the terminal category of the communication terminal 3 (step S104).

Further, the base station 1 performs unlicensed band use control including the determination as to whether the unlicensed band is available and generates of the radio channel quality measurement request of the unlicensed band (step S105).

The base station 1 generates the control information for giving notice of use of the unlicensed band and transmits the generated control information to the communication terminal 3, thereby giving notice of use of the unlicensed band to the communication terminal 3 (step S106).

The base station 2 transmits the pilot signal to the communication terminal 3 (step S107).

The communication terminal 3 measures radio channel quality between the communication terminal 3 and the base station 2 using the pilot signal transmitted from the base station 2 (step S108).

The communication terminal 3 generates radio channel quality information using measurement results of radio channel quality. Then, the communication terminal 3 transmits the generated radio channel quality information to the base station 1 (step S109).

The base station 1 acquires information of the radio channel quality between the communication terminal 3 and the base station 2. The base station 1 also acquires information of the radio channel quality among other neighboring base stations using the unlicensed band and the communication terminal 3. Then, the base station 1 selects the cell based on the acquired radio channel quality information (step S110). Here, the following describes operations that take place when the base station 1 selects the cell 20 formed by the base station 2 as the SCell.

When the base station 1 selects the base station 2, the RA procedure is performed among the base station 1, the base station 2, and the communication terminal 3 to establish a radio channel connecting the communication terminal 3 and the base station 2 with each other (step S111).

Thereafter, the base station 2 and the communication terminal 3 transmit and receive user data and control information using the established radio channel (step S112).

Here, the communication terminal 3, which has received the terminal performance information request from the base station 1 as described above, transmits the terminal performance information including information indicating whether the unlicensed band may be used to the base station 1. However, the transmission timing is not limited thereto. For example, the communication terminal 3 may transmit the terminal performance information to the base station 1 in a predetermined cycle. In this case, the base station 1 may wait for the terminal performance information transmitted from the communication terminal 3 without transmitting the terminal performance information request to the communication terminal 3.

Further, in the above description, the base station 1 acquires the performance information of the communication terminal 3, determines whether the unlicensed band may be used, and transmits the unlicensed band use notification and the system information of the base station 2 to the communication terminal 3. However, for example, the base station 2 may acquire the performance information of the communication terminal 3, determine whether the unlicensed band may be used, and transmit the unlicensed band use notification and the system information of the base station 2 to the communication terminal 3.

<Processing of CA>

Figure 20:
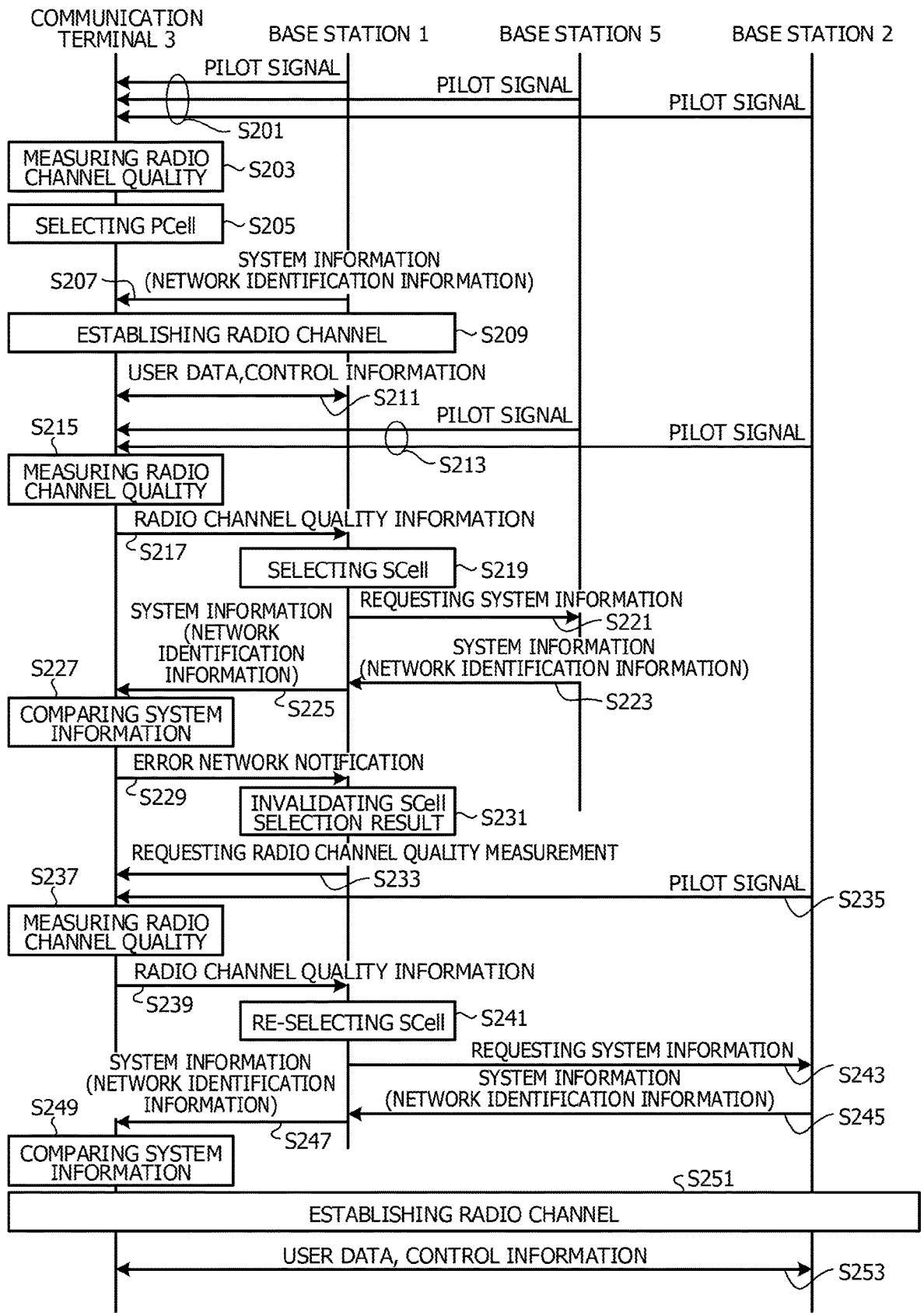
FIG. 20 is a diagram illustrating an example of a sequence of a CA processing in the wireless communication system according to the first embodiment.
Figure 21:
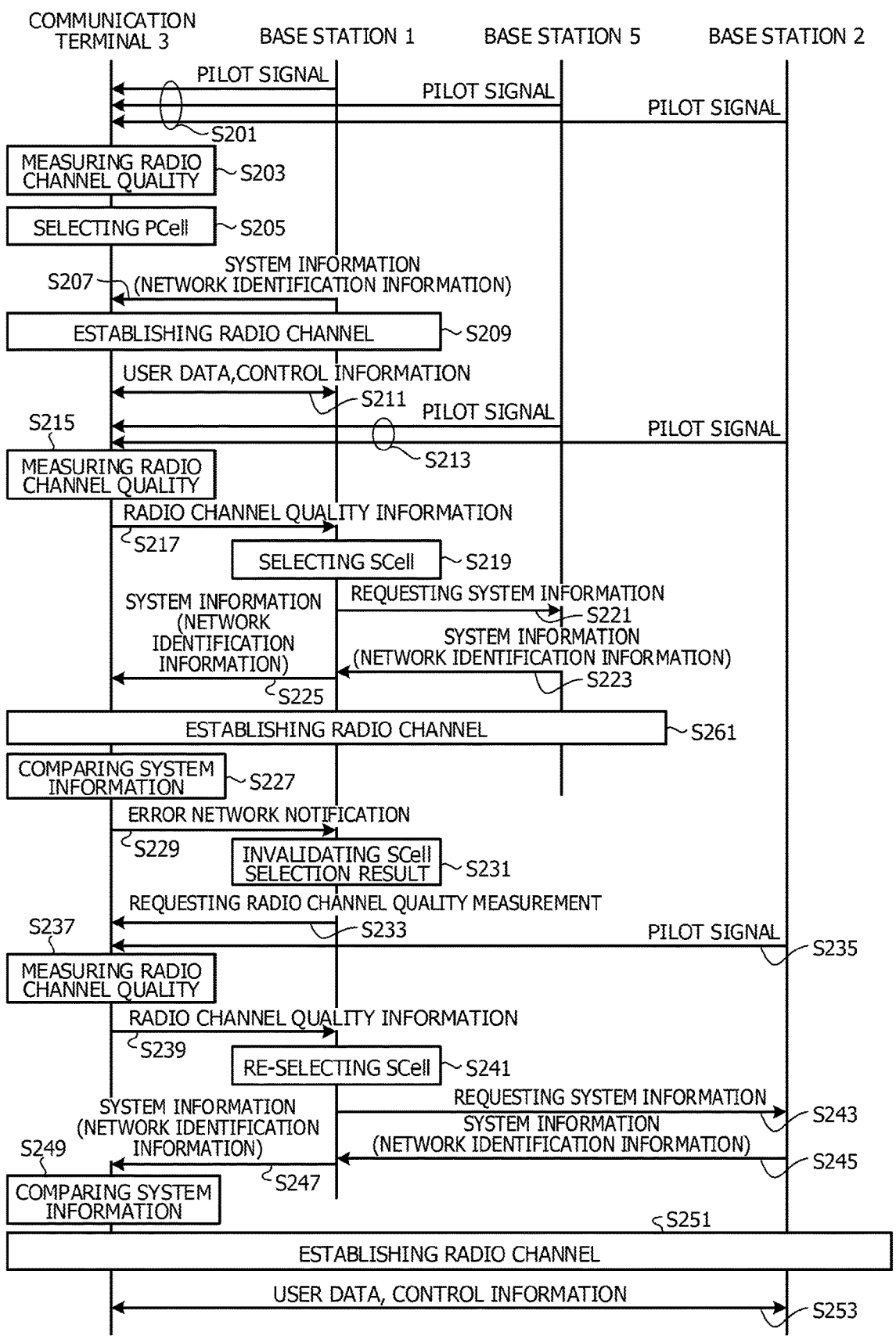
FIG. 21 is a diagram illustrating an example of a sequence of a CA processing in the wireless communication system according to the first embodiment.

Next, a flow of the CA processing in the wireless communication system according to the first embodiment is described with reference to FIGS. 20 and 21. FIGS. 20 and 21 are diagrams illustrating an example of the sequence of the CA processing in the wireless communication system according to the first embodiment. FIG. 20 illustrates the communication terminal 3 which detects mismatch of the communication network after receiving the system information. FIG. 21 illustrates the communication terminal 3 which detects mismatch of the communication network after performing the RA. In FIGS. 20 and 21, the base station 2 belongs to the same communication network as the base station 1, and the base station 5 belongs to a communication network different from the communication of the base station 1. The base station 5 forms the cell 50 and is capable of performing communication using the unlicensed band. The base stations 1 and 2, and 5 are connected with each other via the X2 interface.

First, a flow of the CA processing in the wireless communication system according to the first embodiment is described with reference to FIG. 20.

In the step S201, the base stations 1, 2, and 5 transmit the pilot signal to the communication terminal 3.

In the step S203, the communication terminal 3 measures the radio channel quality among the base stations 1, 2, and 5 using the received pilot signal.

In the step S205, the communication terminal 3 selects the cell using the measurement result of the radio channel quality. Here, the communication terminal 3 selects the cell 10 formed by the base station 1 as the PCell.

In the step S207, the base station 1 transmits the system information including identification information of the communication network to which the base station 1 belongs (in other word, network identification information of the cell 10) to the communication terminal 3.

In the step S209, the base station 1 and the communication terminal 3 implement the RA procedure to establish the radio channel.

In the step S211, the base station 1 and the communication terminal 3 transmit and receive user data and control information using the radio channel established in the step S209.

In the step S213, the base stations 2 and 5 transmit the pilot signal to the communication terminal 3.

In the step S215, the communication terminal 3 measures the radio channel quality between the communication terminal 3 and the base station 2 using the pilot signal transmitted from the base station 2. The communication terminal 3 also measures the radio channel quality between the communication terminal 3 and the base station 5 using the pilot signal transmitted from the base station 5.

In the Step S217, the communication terminal 3 generates the radio channel quality information using the measurement result of the radio channel quality measured in the step S215. Then, the communication terminal 3 transmits the generated radio channel quality information to the base station 1.

In the step S219, the base station 1 acquires the radio channel quality information between the communication terminal 3 and the base station 2, and the radio channel quality information between the communication terminal 3 and the base station 5. Then, the base station 1 selects, based on the acquired radio channel quality information, the SCell that communicates using the unlicensed band. Here, the base station 1 selects the cell 50 formed by the base station 5 as the SCell.

In the step S221, the base station 1 transmits the system information request to the base station 5.

In the step S223, the base station 5 transmits the system information thereof to the base station 1 in response to the system information request from the base station 1. The system information transmitted by the base station 5 includes the identification information of the communication network (in other word, network identification information of the cell 50) to which the base station 5 belongs, and the DRAFT.

In the step S225, the base station 1 transfers the system information of the base station 5 to the communication terminal 3.

In the step S227, the communication terminal 3 compares the system information of the base station 1 received in the step 207 and the system information of the base station 5 received in the step S225, with each other. Consequently, the communication terminal 3 detects mismatch between the network identification information of the cell 10 and the network identification information of the cell 50, and thus determines that the cell 50 belongs to a communication network different from the one of the cell 10. Thus, the communication terminal 3 determines not to establish a radio channel between the communication terminal 3 and the cell 50.

Thus, in the step S229, the communication terminal 3 transmits the error network notification to the base station 1.

In the step S231, the base station 1, which has received the error network notification from the communication terminal 3 in the step S229, invalidates the selection result of the SCell selection in the step S219. Specifically, the base station 1 cancels selection of the cell 50 as the SCell.

Thus, in the step S233, the base station 1 transmits the radio channel quality measurement request to the communication terminal 3.

In the step S235, the base station 2 transmits the pilot signal to the communication terminal 3.

In the step S237, the communication terminal 3 measures, in response to the radio channel quality measurement request received in the step S233, the radio channel quality between the communication terminal 3 and the base station 2 using the pilot signal received in the step S235.

In the Step S239, the communication terminal 3 generates the radio channel quality information using the measurement result of the radio channel quality measured in the step S237. Then, the communication terminal 3 transmits the generated radio channel quality information to the base station 1.

In the step S241, the base station 1, which has received the error network notification from the communication terminal 3 in the step S229, re-selects the SCell that communicates using the unlicensed band. Re-selection of the SCell is performed based on the radio channel quality information as in the step S219. However, in the step S241, the base station 1 preferably re-selects the SCell by excluding the cell 50 selected in the step S219 from selection candidates. Here, as a result of the re-selection of the SCell, the base station 1 selects the cell 20 formed by the base station 2 as the SCell.

Then, in the step S243, the base station 1 transmits the system information request to the base station 2.

In the step S245, the base station 2 transmits the system information thereof to the base station 1 in response to the system information request from the base station 1. The system information transmitted by the base station 2 includes the identification information of the communication network (in other word, network identification information of the cell 20) to which the base station 2 belongs, and the DRAP.

In the step S247, the base station 1 transfers the system information of the base station 2 to the communication terminal 3.

In the step S249, the communication terminal 3 compares the system information of the base station 1 received in the step 207 and the system information of the base station 2 received in the step S247, with each other. Therefore, the communication terminal 3 detects mismatch between the network identification information of the cell 10 and the network identification information of the cell 20, and thus determines that the cell 20 belongs to the same communication network as the cell 10. Thus, the communication terminal 3 determines to establish a radio channel between the communication terminal 3 and the cell 20.

In the step S251, the base station 2 and the communication terminal 3 implement the RA procedure to establish a radio channel.

In the step S253, the base station 2 and the communication terminal 3 transmit and receive user data and control information using the radio channel established in the step S251. Specifically, the communication terminal 3 performs the CA simultaneously using both of the radio channel established between the communication terminal 3 and the base station 1 (the cell 10, the PCell) of the licensed band (step S209) and the radio channel established between the communication terminal 3 and the base station 2, (the cell 20, the SCell) of the unlicensed band (step S251).

Next, a flow of the CA processing in the wireless communication system according to the first embodiment is described with reference to FIG. 21. In FIG. 21, steps identical with those of FIG. 20 are assigned with same reference numerals, and description thereof is omitted.

In other words, in FIG. 21, after the step S225, the base station 5 and the communication terminal 3 implements the RA procedure to establish a radio channel in the step S261.

After establishing the radio channel in the step S261, in the step S227, the communication terminal 3 compares the system information of the base station 1 received in the step 207 and the system information of the base station 5 received in the step S225, with each other. Therefore, the communication terminal 3 detects mismatch between the network identification information of the cell 10 and the network identification information of the cell 50, and thus determines that the cell 50 belongs to a communication network different from the one of the cell 10.

<Processing of Communication Terminal>

Figure 22:
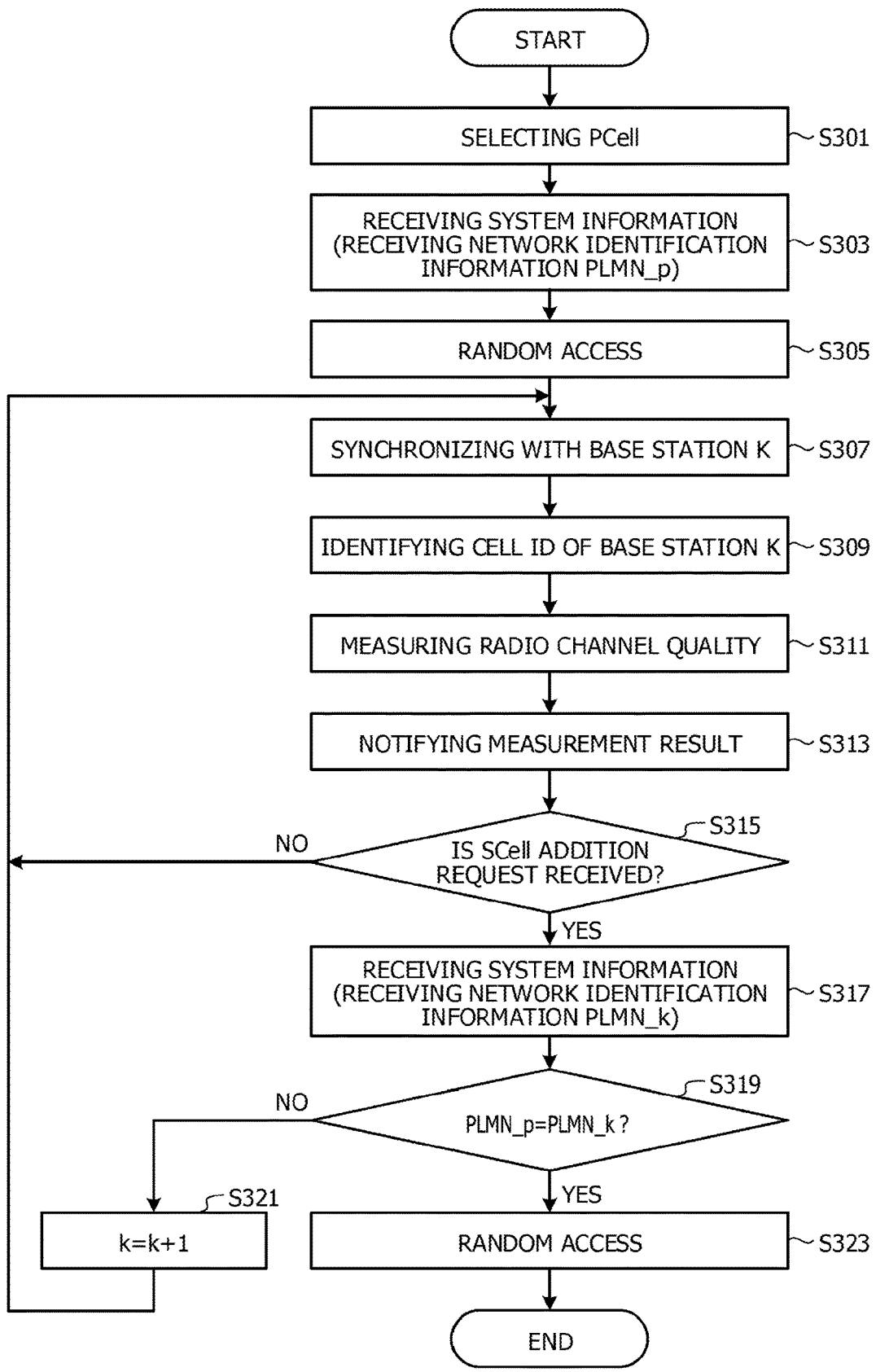
FIG. 22 is a flowchart for describing the CA processing by the communication terminal according to the first embodiment.
Figure 23:
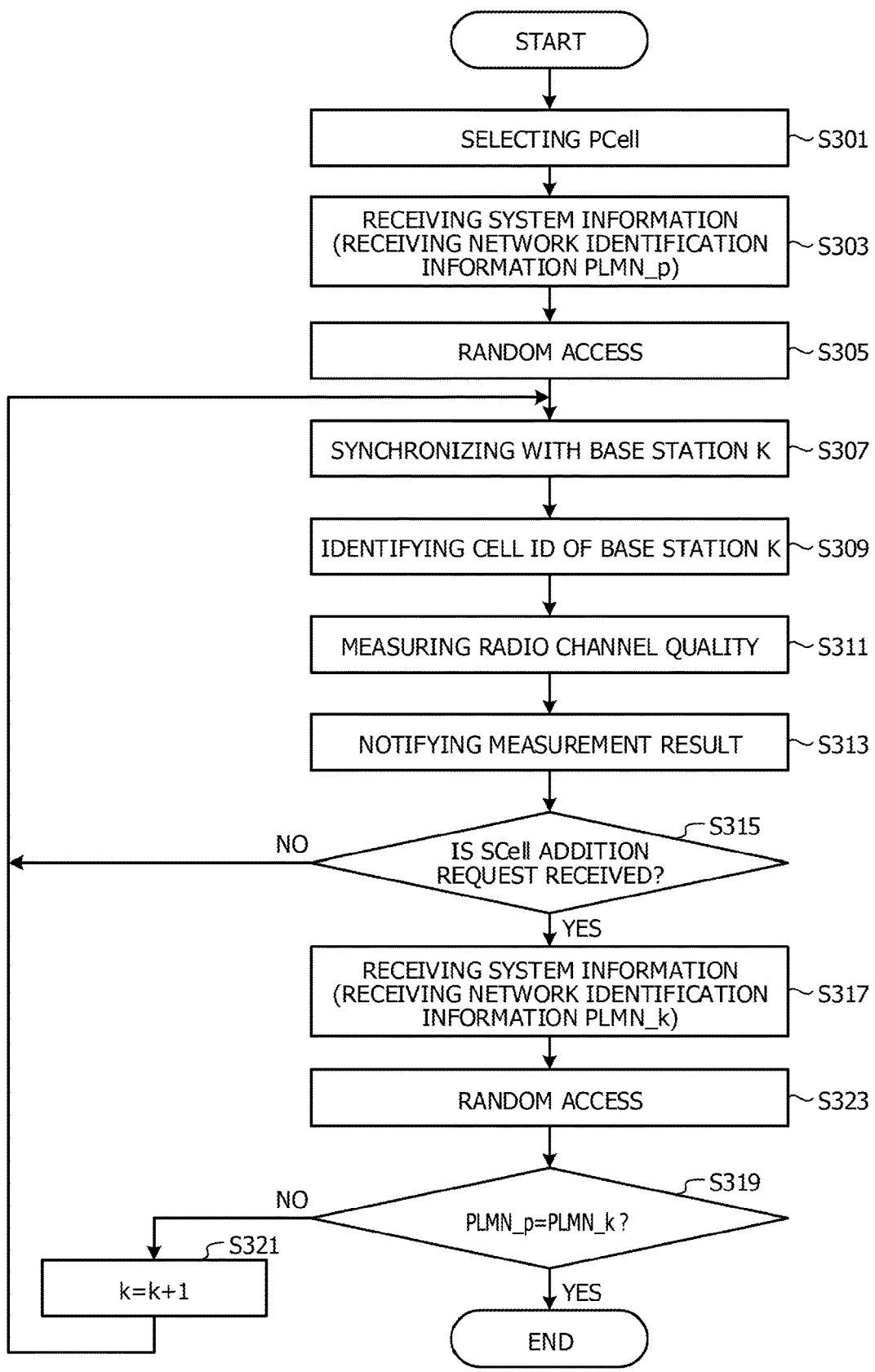
FIG. 23 is a flowchart for describing the CA processing by the communication terminal according to the first embodiment.

Next, a flow of the CA processing by the communication terminal 3 according to the first embodiment is described with reference to FIGS. 22 and 23. FIGS. 22 and 23 are flowcharts for describing the CA processing by the communication terminal according to the first embodiment. FIG. 22 illustrates the communication terminal 3 that compares network identification information before implementing the RA with the SCell. FIG. 23 illustrates the communication terminal 3 that compares network identification information after implementing the RA with the SCell.

First, a flow of the CA processing by the communication terminal 3 according to the first embodiment is described with reference to FIG. 22.

In the step S301, the communication terminal 3 selects the PCell using the pilot signal received from base stations neighboring the communication terminal 3.

In the step S303, the communication terminal 3 receives the system information of the PCell. The system information of the PCell includes the network identification information PLMN_p of the PCell.

In the step S305, the communication terminal 3 performs the RA between the communication terminal 3 and the PCell. This establishes a radio channel between the communication terminal 3 and the PCell.

In the step S307, the communication terminal 3 performs synchronization with a base station k which forms a cell other than the PCell selected in the step S301.

In the step S309, the communication terminal 3 identifies the cell ID of the base station k.

In the step S311, the communication terminal 3 measures the radio channel quality between the communication terminal 3 and the base station k.

In the step S313, the communication terminal 3 notifies the base station of the PCell of the measurement result of the radio channel quality.

In the step S315, the communication terminal 3 determines whether a cell addition request is received from the base station of the PCell. If the cell addition request is not received (step S315: No), the processing returns to the step S307.

Meanwhile, if the cell addition request is received (step S315: Yes), the processing proceeds to the step S317, and the communication terminal 3 receives the system information of the base station k. The system information of the base station k includes the network identification information PLMN_k of the base station k and the DRAP.

In the step S319, the communication terminal 3 compares the network identification information PLMN_p of the PCell and the network identification information PLMN_k of the base station k with each other to determine whether the PLMN_p and the PLMN_k match each other.

When the PLMN_p and the PLMN_k do not match each other (step S319: No), the processing proceeds to the step S321, and the communication terminal 3 increments k. In other words, the communication terminal 3 shifts the base station of synchronization target (in other word, the measurement target of radio channel quality) to a next neighboring base station. After completion of the processing in the step S321, the processing returns to the step S307.

Meanwhile, when the PLMN_p and the PLMN_k match each other (step S319: Yes), the processing proceeds to the step S323, and the communication terminal 3 performs the RA between the communication terminal 3 and the base station k. This establishes a radio channel between the communication terminal 3 and the base station k (in other word, the SCell).

Next, a flow of the CA processing by the communication terminal 3 according to the first embodiment is described with reference to FIG. 23. In FIG. 23, steps identical with those of FIG. 22 are assigned with same reference numerals, and description thereof is omitted.

Specifically, in FIG. 23, after implementing the RA between the communication terminal 3 and the base station k or after establishing a radio channel between the communication terminal 3 and the base station k (in other word, the SCell), the communication terminal 3 compares PLMN_p and PLMN_k with each other.

<Hardware Configuration>

Figure 24:
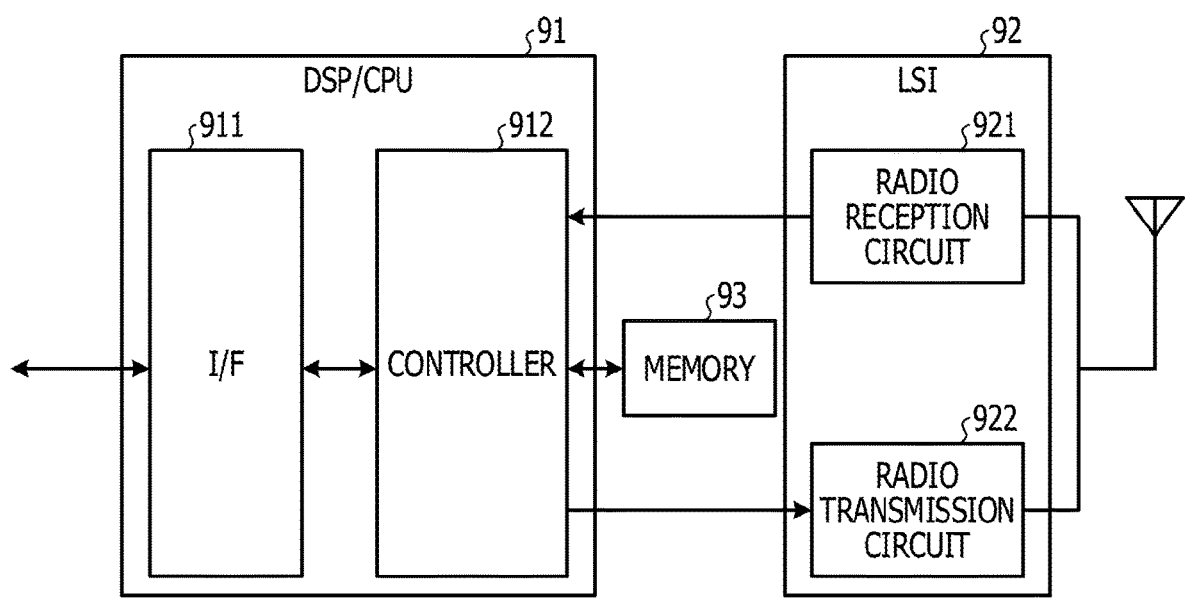
FIG. 24 is a diagram illustrating hardware configurations of base stations.

Next, a hardware configuration of the base stations 1 and 2 and the communication terminal 3 according to the first embodiment is described. FIG. 24 is a diagram illustrating a hardware configuration of base stations. For example, both of the base stations 1 and 2 include a hardware configuration illustrated in FIG. 24.

As illustrated in FIG. 24, the base stations 1 and 2 include a digital signal processor (DSP)/central processing unit (CPU) 91, a large scale integration (LSI) 92, and a memory 93.

The DSP/CPU 91 includes an interface (I/F) 911 and a controller 912. The I/F 911 is a communication interface between the controller 912 and a high-order network.

The memory 93 stores, in the case of the base station 1, various programs including programs that implement functions of the terminal performance information controller 156, the radio channel controller 157, the system information management and storage unit 158, and the high-order processor 159. The memory 93 implements functions of the system information management and storage unit 158.

Then, the controller 912 reads, in the base station 1, various programs stored in the memory 93 to implement functions of the terminal performance information controller 156, the radio channel controller 157, the system information management and storage unit 158, and the high-order processor 159.

In the base station 2, the memory 93 stores various programs including programs that implement functions of the radio channel controller 257, the system information management and storage unit 258, and the high-order processor 259. The memory 93 implements functions of the system information management and storage unit 258.

Then, the controller 912 reads, in the base station 2, various programs stored in the memory 93 to implement functions of the radio channel controller 257, the system information management and storage unit 258, and the high-order processor 259.

The LSI 92 includes a radio reception circuit 921 and a radio transmission circuit 922. In the base station 1, the radio reception circuit 921 implements functions of the radio receiver 151, the demodulation decoder 152, the terminal performance information extractor 153, the radio channel quality information extractor 154, and the radio channel control information extractor 155. In the base station 1, the radio transmission circuit 922 implements functions of the terminal performance information request generator 164, the radio channel control information generator 160, the pilot generator 161, the synchronization signal generator 162, the system information generator 163, the radio transmitter 165, and the code modulator 166.

In the base station 2, the radio reception circuit 921 implements functions of the radio receiver 251, the demodulation decoder 252, the radio channel quality information extractor 254, and the radio channel control information extractor 255. In the base station 2, the radio transmission circuit 922 implements functions of the radio channel control information generator 260, the pilot generator 261, the synchronization signal generator 262, the system information generator 263, the radio transmitter 265, and the code modulator 266.

Figure 25:
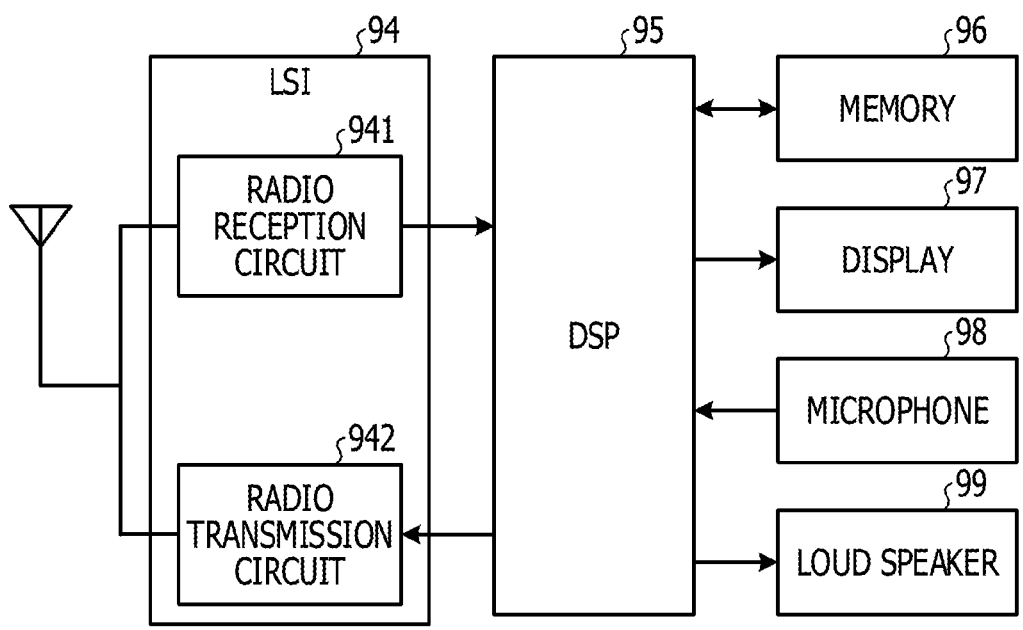
FIG. 25 is a diagram illustrating a hardware configuration of the communication terminal.

FIG. 25 is a diagram illustrating a hardware configuration of the communication terminal. The communication terminal 3 includes an LSI 94, a DSP 95, a memory 96, a display 97, a microphone 98, and a loudspeaker 99. The LSI 94 includes a radio reception circuit 941 and a radio transmission circuit 942.

The display 97 is a display device such as a liquid crystal display. The microphone 98 is a device with which an operator inputs voice in an operation such as voice communication. The loudspeaker 99 is a device such as a speaker which provides voice to the operator in an operation such as voice communication.

The radio reception circuit 941 implements functions of the radio receiver 301, the demodulation decoder 302, the system information extractor 303, the radio channel control information extractor 304, the pilot extractor 305, the synchronization controller 306, the synchronization signal extractor 307, and the cell ID extractor 308. The radio reception circuit 941 also implements functions of the terminal performance information request extractor 309, the synchronization signal generator 311, the pilot calculator 312, and the radio channel quality measurement unit 310.

The radio transmission circuit 942 includes a radio transmitter 331, a code modulator 332, a radio channel control information generator 333, a radio channel quality information generator 334, and a terminal performance information generator 335.

The memory 96 stores various programs including programs to implement functions of the terminal setting controller 321, the cell selection controller 322, the radio channel controller 324, and the terminal performance information controller 326. The memory 96 implements functions of the system information storage unit 323 and the terminal performance information storage unit 325.

Then, the DSP 95 reads various programs from the memory 96 and executes to implement functions of the terminal setting controller 321, the cell selection controller 322, the radio channel controller 324, and the terminal performance information controller 326. The DSP 95 also implements functions of the base band processor 34. Further, although FIG. 25 illustrates a configuration using the DSP 95, it may be implemented by the CPU.

As described above, the wireless communication system according to the first embodiment includes a base station that communicates using the licensed band, a base station that communicates using the unlicensed band, and a communication terminal. Then, the base station that communicates using the licensed band selects, out of base stations that communicate using the unlicensed band, a base station with which the communication terminal communicates simultaneously with the base station, based on the identification information of a communication network to which the base station belongs, and the identification information of a communication network to which a base station communicating with unlicensed band belongs. Thus, the communication terminal may implement the CA that uses the unlicensed band in the SCell. Enabling to implement the CA that uses the unlicensed band achieves high-speed transmission.

The PDCP SDU is used for data transfer between the PCell and the SCell. In this regard, as a radio access scheme in the field of the LTE and the LTE-Advanced, Femto using the LTE and the LTE-Advanced is called as the home eNB (HeNB). Meanwhile, in a field other than the LTE and the LTE-Advanced, Femto refers to a communication using <Wi-Fi but not the LTE. The Wi-Fi has no PDCP, but only a MAC operating differently from a MAC in the LTE and the LTE-Advanced. Therefore, data transfer based on the PDCP SDU is difficult. Consequently, data of the same service may be transmitted by the base station and the Femto by separating the data.

Second Embodiment

In the first embodiment, the communication terminal 3 compares network identification information of the PCell and network identification information of the SCell candidate with each other. In the second embodiment, the base station 1 of the PCell compares network identification information of the PCell (in other word, the base station 1) and network identification information of a cell of the SCell candidate with each other.

<Processing of CA>

Figure 26:
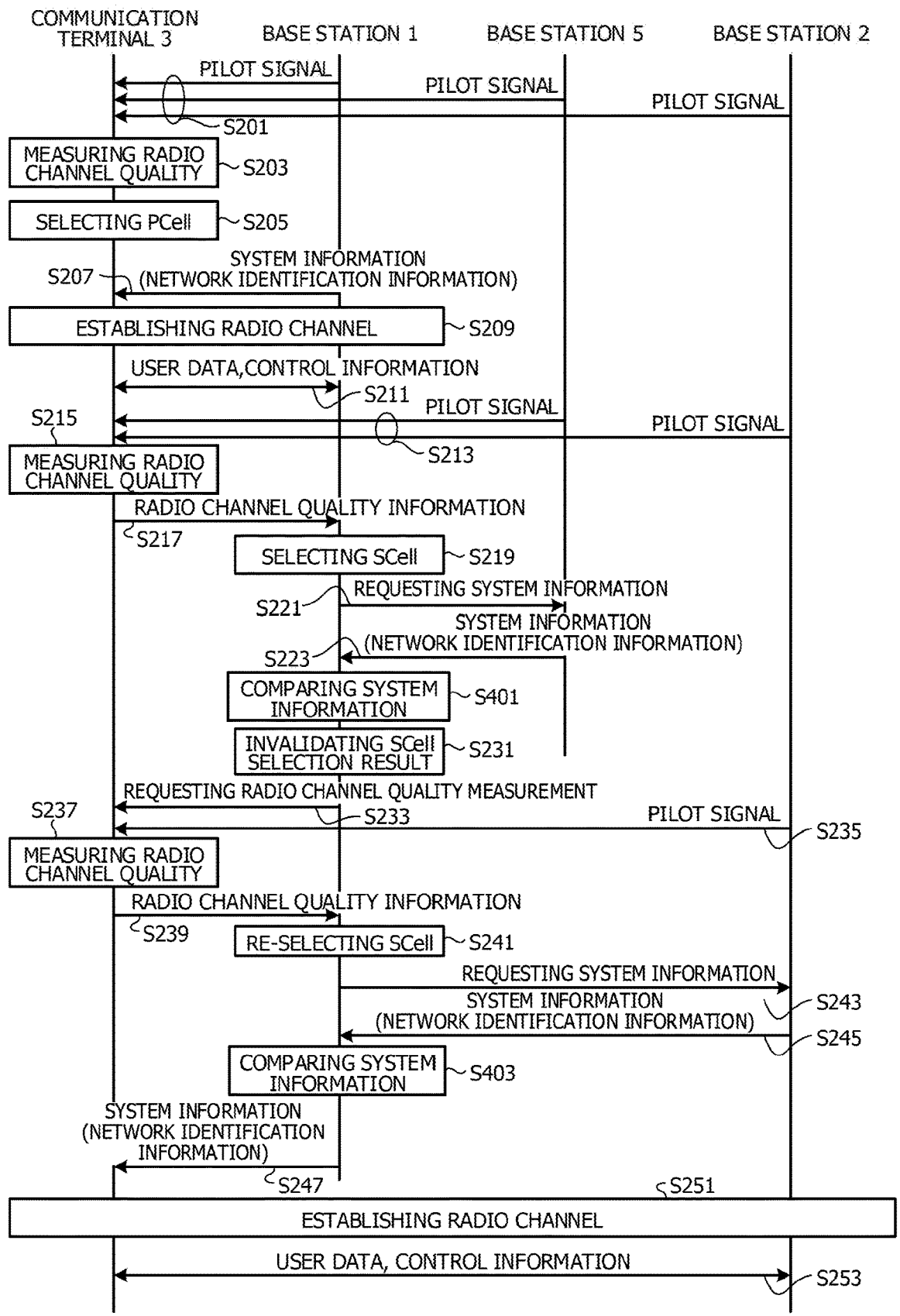
FIG. 26 is a diagram illustrating an example of a sequence of a CA processing in a wireless communication system according to a second embodiment.

FIG. 26 is a diagram illustrating an example of the sequence of the CA processing in a wireless communication system according to the second embodiment. In FIG. 26, steps identical with those of FIG. 20 are assigned with same reference numerals, and description thereof is omitted.

In the step S223, the base station 1 receives the system information of the base station 5 from the base station 5. The system information of the base station 5 includes the identification information of the communication network to which the base station 5 belongs (in other word, network identification information of the cell 50), and the DRAP.

In the step S401, the base station 1 compares the system information of the base station 1 and the system information of the base station 5 received in the step S223 with each other. Therefore, the base station 1 detects mismatch between the network identification information of the cell 10 and the network identification information of the cell 50, and thus determines that the cell 50 belongs to a communication network different from a communication network to which the cell 10 belongs. Thus, the base station 1 determines not to establish a radio channel between the communication terminal 3 and the cell 50. Therefore, the base station 1 does not transfer the system information of the base station 5 received in the step S223 to the communication terminal 3, and invalidates, in the step S231, the SCell selection result in the step S219. In other words, the base station 1 cancels selection of the cell 50 as the SCell.

Thus, in the step S233, the base station 1 transmits the radio channel quality measurement request to the communication terminal 3.

Processings in steps S235 to S243 are the same as in FIG. 20.

In the step S245, the base station 1 receives the system information of the base station 2 from the base station 2. The system information of the base station 2 includes the identification information of the communication network to which the base station 2 belongs (in other word, network identification information of the cell 20), and the DRAP.

In the step S403, the base station 1 compares the system information of the base station 1 and the system information of the base station 2 received in the step S245 with each other. Therefore, the base station 1 detects mismatch between the network identification information of the cell 10 and the network identification information of the cell 20, and thus determines that the cell 20 belongs to the same communication network as the communication network to which the cell 10 belongs. Thus, the base station 1 determines to establish a radio channel between the communication terminal 3 and the cell 20. In the step S247, the base station 1 transfers the system information of the base station 2 received in the step S245 to the communication terminal 3.

In the step S251, the base station 2 and the communication terminal 3 implement the RA procedure to establish a radio channel.

Processings in the steps S401 and S403 illustrated in FIG. 26 are performed by the radio channel controller 157 of the base station 1.

<Processing of Base Station>

Figure 27:
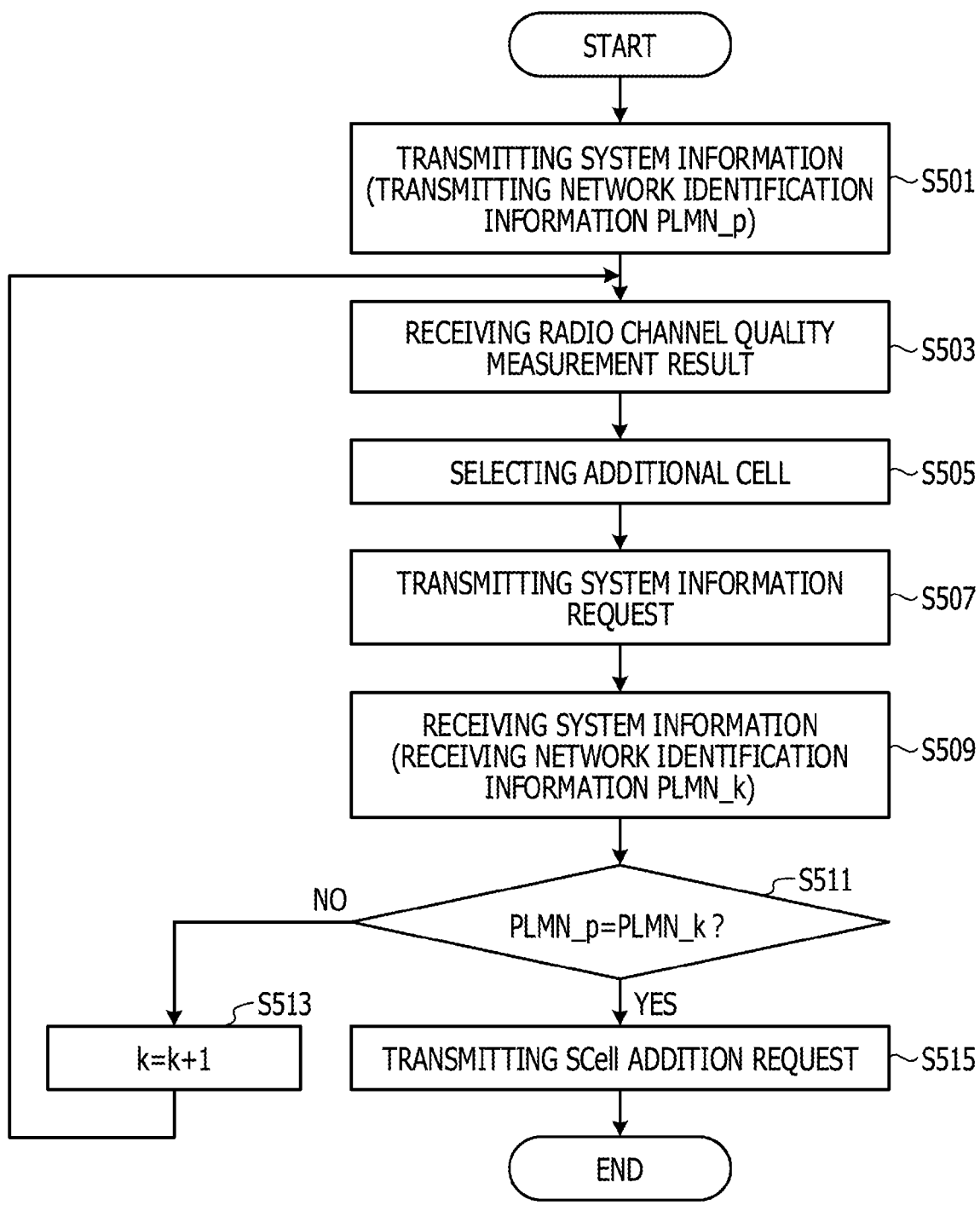
FIG. 27 is a flowchart for describing the CA processing by base stations according to the second embodiment.

Next, a flow of the CA processing by the base station 1 according to the second embodiment is described with reference to FIG. 27. FIG. 27 is a flowchart for describing the CA processing by the base station according to the second embodiment.

In the step S501, the base station 1 forming the PCell transmits the system information thereof (in other word, the PCell) to the communication terminal 3. The system information of the PCell includes the network identification information PLMN_p of the PCell.

In the step S503, the base station 1 receives the measurement result of the radio channel quality between the communication terminal 3 and base stations neighboring the communication terminal 3 from the communication terminal 3.

In the step S505, the base station 1 selects an additional cell k based on the measurement result of the radio channel quality received in the step S503.

In the step S507, the base station 1 transmits the system information request to a base station forming the additional cell k selected in the step S505.

In the step S509, the base station 1 receives the system information of the additional cell k. The system information of the additional cell k includes the network identification information PLMN_k of the additional cell k and the DRAP.

In the step S511, the base station 1 compares the network identification information PLMN_p thereof (in other word, of the PCell) and the network identification information PLMN_k of the additional cell k with each other to determine whether the PLMN_p and the PLMN_k match each other.

When the PLMN_p and the PLMN_k do not match each other (step S511: No), the processing proceeds to the step S513, and the base station 1 increments k. In other words, the base station 1 shifts a cell to be selected as an additional cell to a next cell. After completion of the processing in the step S513, the processing returns to the step S503.

Meanwhile, when the PLMN_p and the PLMN_k match each other (step S511: Yes), the processing proceeds to the step 515, and the base station 1 transmits the cell addition request for the additional cell k as the SCell to the communication terminal 3.

As described above, in the second embodiment, the base station compares network identification information. Thus, the communication terminal 3 may implement the CA that uses the unlicensed band in the SCell as in the first embodiment. Enabling of implementing the CA that uses the unlicensed band achieves high-speed transmission.

Third Embodiment

Figure 28:
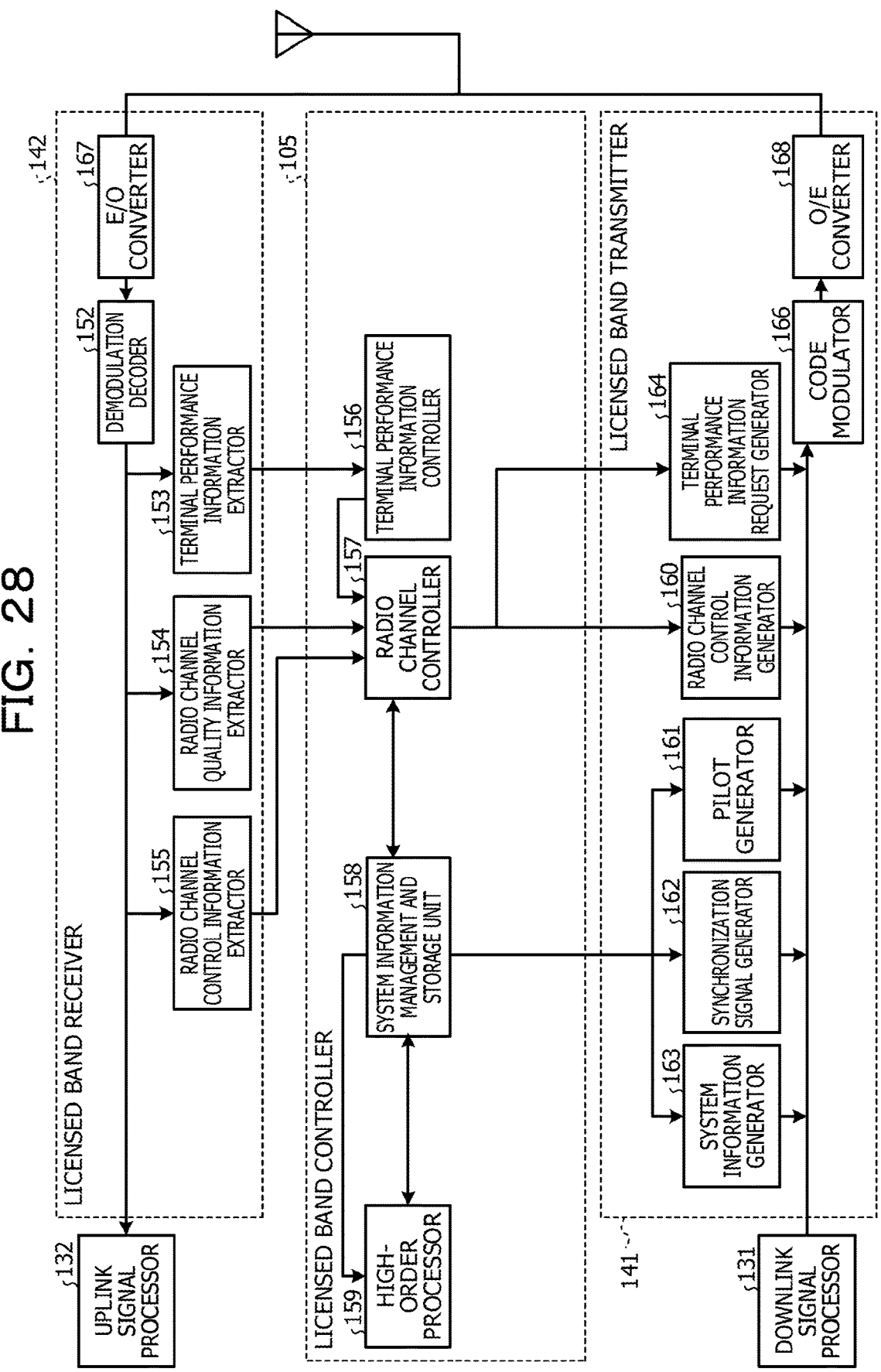
FIG. 28 is a block diagram illustrating a configuration example of CBBUs of base stations according to a third embodiment.
Figure 29:
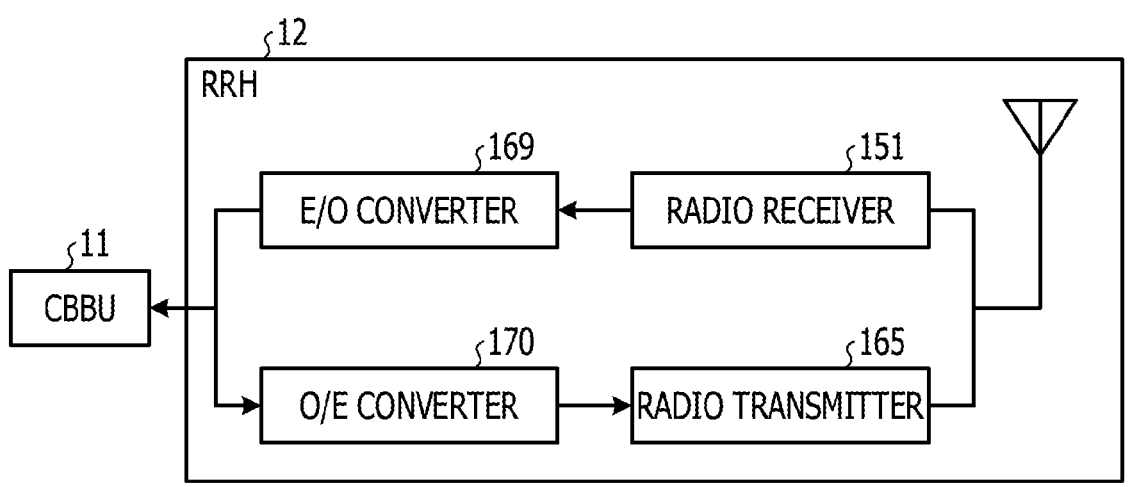
FIG. 29 is a block diagram illustrating a configuration example of RRHs of base stations according to the third embodiment.

A wireless communication system according to the third embodiment differs from the wireless communication system according to the first embodiment in that the base station is separated into two devices: a centralized base band unit (CBBU) and a remote radio head (RRH). FIG. 28 is a block diagram illustrating a configuration example of the CBBU of the base station according to the third embodiment. FIG. 29 is a block diagram illustrating a configuration example of the RRH of the base station according to the third embodiment. Hereinafter, description of components having similar functions as those in the first embodiment is omitted.

The CBBU 11 of the base station 1 according to the third embodiment includes an electrical/optical (E/O) converter 167 at the location of the radio receiver 151 in the base station 1 according to the first embodiment. The CBBU 11 includes an optical/electrical (O/E) converter 168 at the location of the radio transmitter 165 in the base station 1 according to the first embodiment.

The E/O converter 167 receives an optical signal transmitted from the RRH 12. Then, the E/O converter 167 converts the received optical signal to an electric signal. Thereafter, the E/O converter 167 outputs the signal converted to the electric signal to the demodulation decoder 152.

The demodulation decoder 152 performs demodulation processing and decoding processing of the signal received from the E/O converter 167 and transmits the processed signal.

The code modulator 166 performs coding processing and modulation processing of the received signal and outputs to the O/E converter 168.

The O/E converter 168 converts the signal received from the code modulator 166 from the electric signal to the optical signal. Then, the O/E converter 168 transmits the signal converted to the optical signal to the RRH 12.

The RRH 12 includes an E/O converter 169 and an O/E converter 170, in addition to the radio receiver 151 and the radio transmitter 165 in the base station 1 according to the first embodiment.

The E/O converter 169 receives a signal from the radio receiver 151. Then, the E/O converter 169 converts the received signal from the electric signal to the optical signal. Then, the E/O converter 169 transmits the signal converted to the optical signal to the CBBU 11.

The O/E converter 170 receives a signal from the CBBU 11. Then, the O/E converter 170 converts the received signal from the optical signal to the electric signal. Then, the O/E converter 170 outputs the signal converted to the electric signal to the radio transmitter 165.

As described above, the base station according to the third embodiment is separated into the CBBU and the RRH. Thus, even the base station separated into the two may operate in the same manner as in the first embodiment and perform a communication using the unlicensed band in a reliable manner.

Fourth Embodiment

Figure 30:
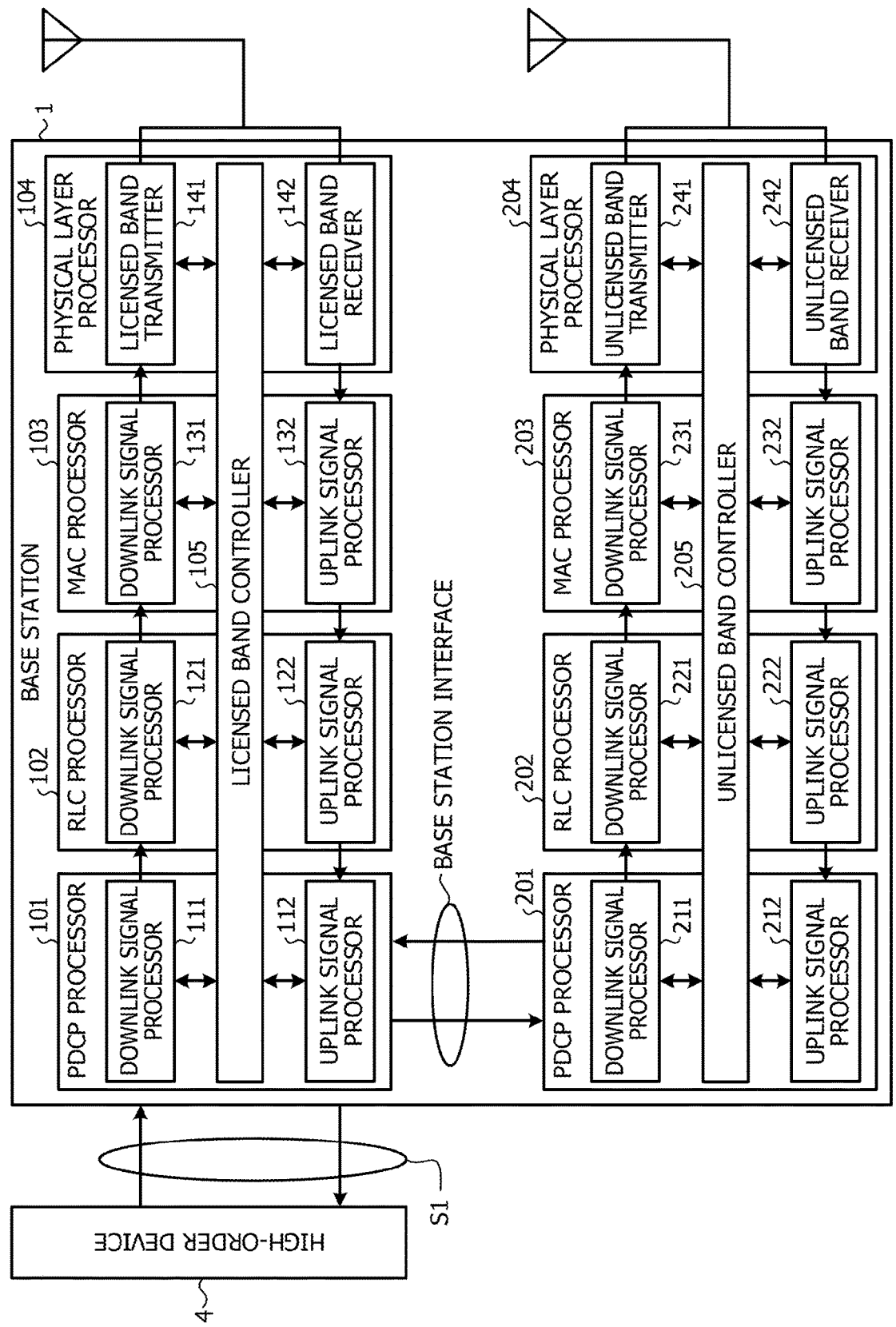
FIG. 30 is a block diagram illustrating configuration examples of base stations according to a fourth embodiment.

A wireless communication system according to the fourth embodiment differs from the first embodiment in that one base station includes the PCell and the SCell. FIG. 30 is a block diagram illustrating a configuration example of a base station according to the fourth embodiment. Hereinafter, description of components having similar functions as those of the first embodiment is omitted.

As illustrated in FIG. 30, a base station 1 according to the fourth embodiment includes a PDCP processor 101, a RLC processor 102, a MAC processor 103, and a physical layer processor 104. Further, the base station 1 includes a PDCP processor 201, a RLC processor 202, a MAC processor 203, and a physical layer processor 204, which communicate in the cell 20 being the SCell.

The PDCP processor 101, the RLC processor 102, the MAC processor 103, and the physical layer processor 104 communicate within the cell 10. Specifically, when the cell 10 is selected as the PCell, the PDCP processor 101, the RLC processor 102, the MAC processor 103, and the physical layer processor 104 communicate with the communication terminal 3 as the PCell.

The PDCP processor 201, the RLC processor 202, the MAC processor 203, and the physical layer processor 204 communicate using the unlicensed band in the cell 20. Specifically, when the cell 20 is selected as the SCell, the PDCP processor 201, the RLC processor 202, the MAC processor 203, and the physical layer processor 204 communicate with the communication terminal 3 as the SCell.

Thus, a function of communicating with the PCell and a function of communicating with the SCell may co-exist in one base station 1. Even in this case, the physical layer processors 104 and 204 include same functions as in the first embodiment. Thus, even when one base station includes the PCell and the SCell as in the fourth embodiment, communication may be performed using the unlicensed band in a reliable manner.

Also, even when one base station includes the PCell and the SCell as in the fourth embodiment, the base station may be separated into the CBBU and the RRH as in the third embodiment.

Fifth Embodiment

Figure 31:
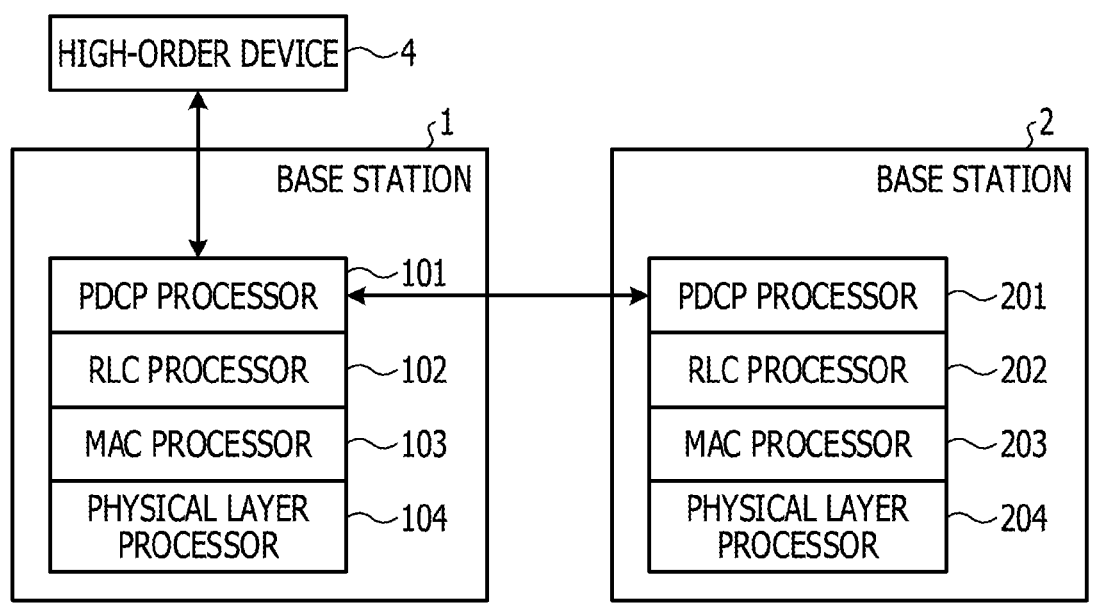
FIG. 31 is a schematic diagram representing processors and data transfer processing in respective layers of the base station.

In the above embodiments, the base station 1 having the PCell and the base station 2 having the SCell respectively include processors in respective layers as illustrated in FIG. 31. FIG. 31 is a schematic diagram representing processors in respective layers and data transfer processing of the base station. Data transfer between the base station 1 having the PCell and the base station 2 having the SCell is performed between the PDCP processor 101 processor and the PDCP processor 201 using the PDCP SDU. However, the configuration of processors in respective layers and the data transfer method are not limited thereto.

Figure 32A:
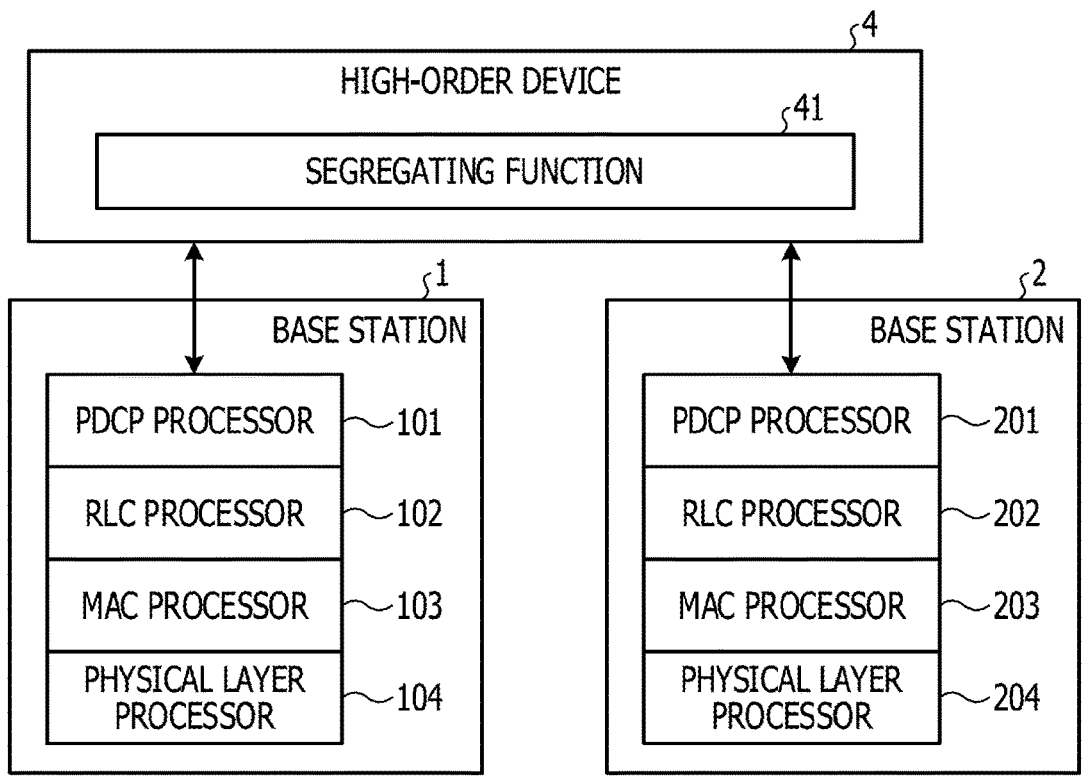
FIG. 32A is a diagram representing a configuration of dividing data in a high-order device.

For example, the data transfer location may be different. For example, as illustrated in FIG. 32A, the high-order device 4 of the base stations 1 and 2 may segment data using a segmenting function 41. FIG. 32A is a diagram representing a configuration of segmenting data in the high-order device. Specifically, downlink data may be segmented respectively to the base station 1 using the licensed band and the base station 2 using the unlicensed band, and the high-order device 4 may include the segmenting function 41 to concatenate respective uplink data. For example, when the conventional home eNB (HeNB) is used as the base station 2, data transfer between the base station 1 and the HeNB is not performed since a S-GW being the high-order device 4 of the base stations 1 and 2 and a S-GW of the HeNB are different from each other. In such a case, it is preferable to adopt the configuration as illustrated in FIG. 32A.

Further, functions in respective layers of the base station 1 using the licensed band and some functions in respective layers of the base station 2 using the unlicensed band may be aggregated.

Figure 32B:
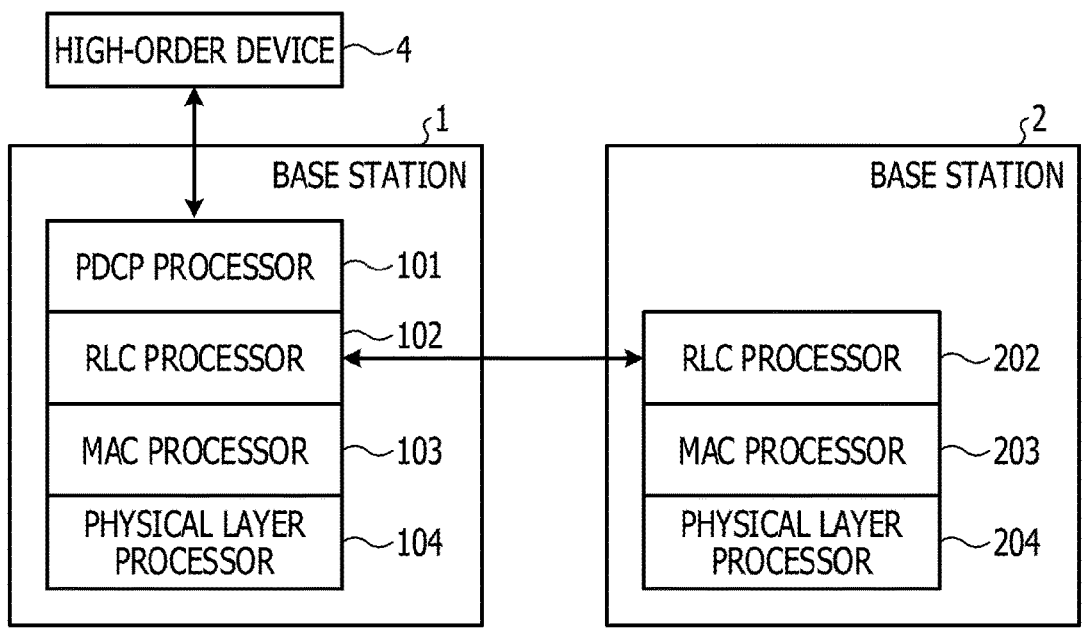
FIG. 32B is a diagram representing a configuration of a shared PDCP processor.

For example, when the PDCP is shared, the PDCP processor 101 may be shared as illustrated in FIG. 32B. FIG. 32B is a diagram representing a configuration of sharing the PDCP processor. When the PDCP is shared, data transfer between the base station 1 and the base station 2 is performed using the RLC SDU (PDCP PDU) or the RLC PDU (PDCP SDU). In this case, the RLC processors 102 and 202 have a new RLC function including a newly added data transfer function.

Figure 32C:
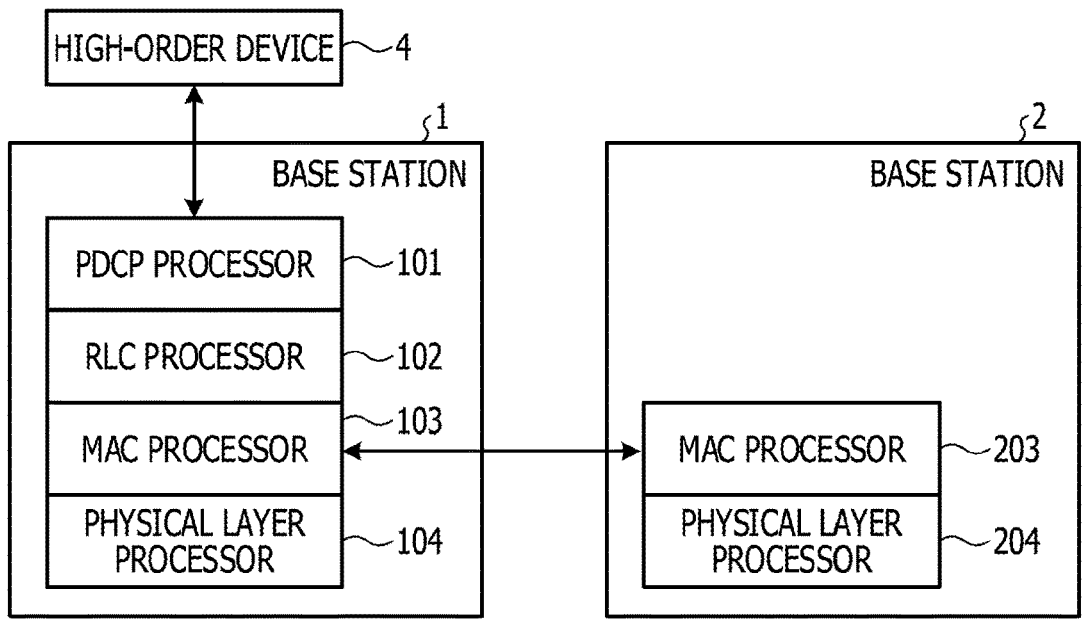
FIG. 32C is a diagram representing a configuration of a shared PDCP processor and a shared RLC processor.

When the PDCP and the RLC are shared, the PDCP processor 101 and the RLC processor 102 may be shared as illustrated in FIG. 32C. FIG. 32C is a diagram representing a configuration of sharing the PDCP processor and the RLC processor. When the PDCP and the RLC are shared, data transfer between functions of the base stations is performed using the MAC SDU (RLC PDU) or the MAC PDU (RLC SDU). In this case, the MAC processors 103 and 203 have a new MAC function including a newly added data transfer function.

Figure 32D:
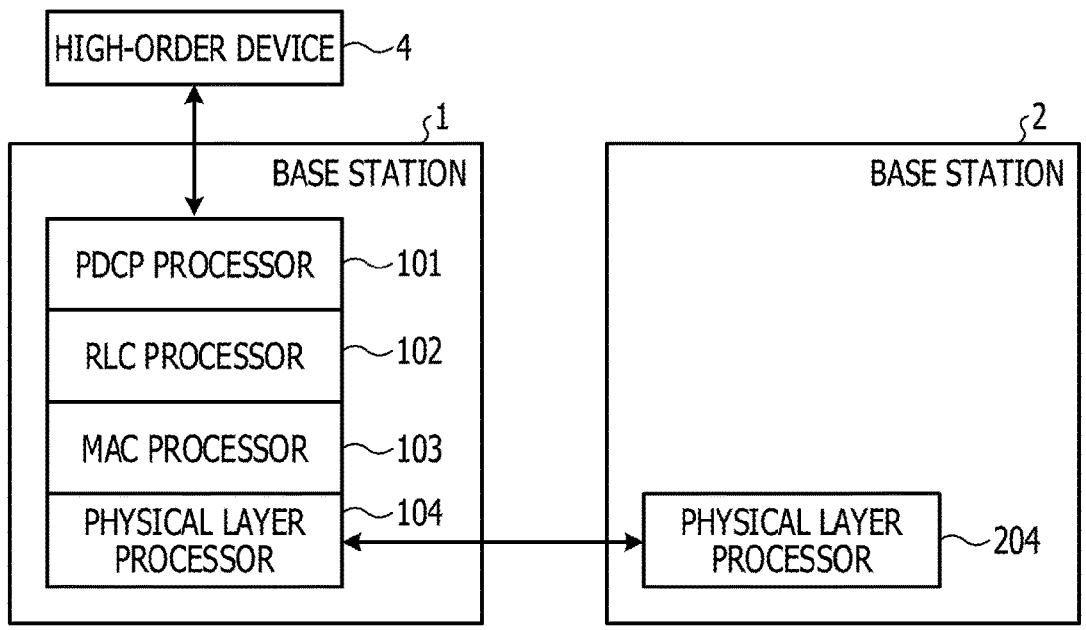
FIG. 32D is a diagram representing a configuration of sharing the PDCP processor, the RLC processor, and a MAC processor.

When the PDCP, the RLC, and the MAC are shared, the PDCP processor 101, the RLC processor 102, and the MAC processor 103 may be shared as illustrated in FIG. 32D. FIG. 32D is a diagram representing a configuration of sharing the PDCP processor, the RLC processor, and the MAC processor. When the PDCP, the RLC, and the MAC are shared, data transfer between functions of the base stations is performed using the MAC PDU. In this case, the physical layer processors 104 and 204 have a new function including a newly added data transfer function.

Here, in the configurations illustrated in FIGS. 32A to 32D, there is a high possibility that re-transmission at re-transmission intervals of the conventional hybrid ARQ (HARQ) is not available. Thus, the MAC is preferably renewed to a new MAC which is different from the conventional MAC, especially in the HARQ control. Also, since the frequency in use is different and the listen before talk (LBT) (CSMA/CA) is implemented, the physical layer is preferably renewed to a new physical layer which is different from the conventional physical layer.

Figure 33A:
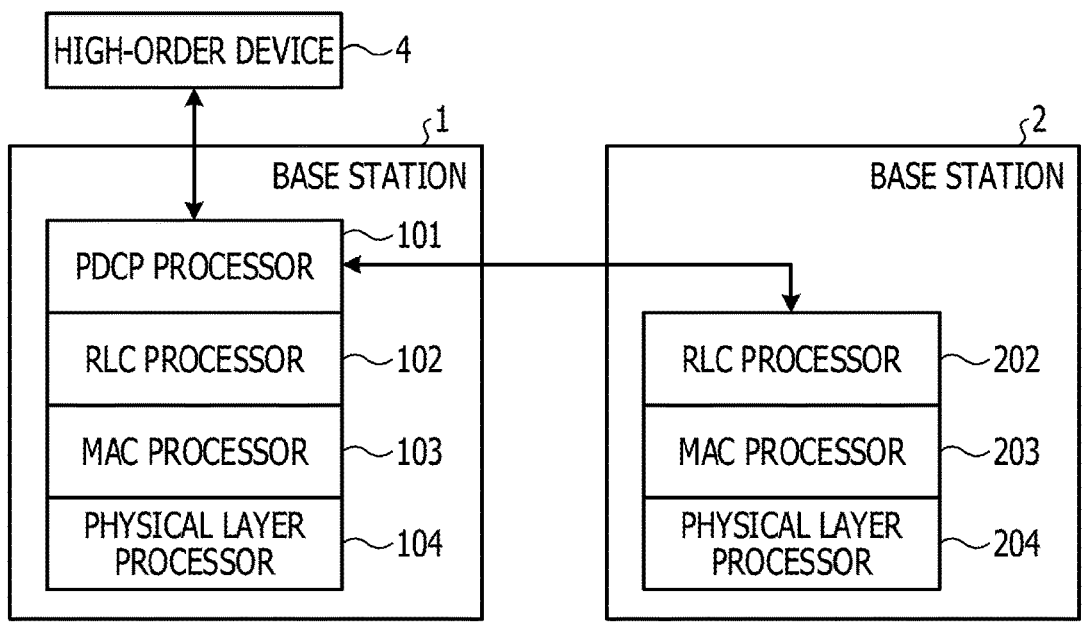
FIG. 33A is a diagram representing a configuration in which data is transferred from a PDCP processor of a base station using the licensed band to a RLC processor of a base station which uses the unlicensed band.

As illustrated in FIG. 33A, data may be transferred from the PDCP processor 101 of the base station 1 using the licensed band to the RLC processor 202 of the base station 2 using the unlicensed band. FIG. 33A is a diagram representing a configuration in which data is transferred from the PDCP processor of a base station using the licensed band to the RLC processor of a base station using the unlicensed band. In this case, the RLC processor 202 includes a new RLC processing function that incorporates the conventional PDCP processing function and RLC processing function.

Figure 33B:
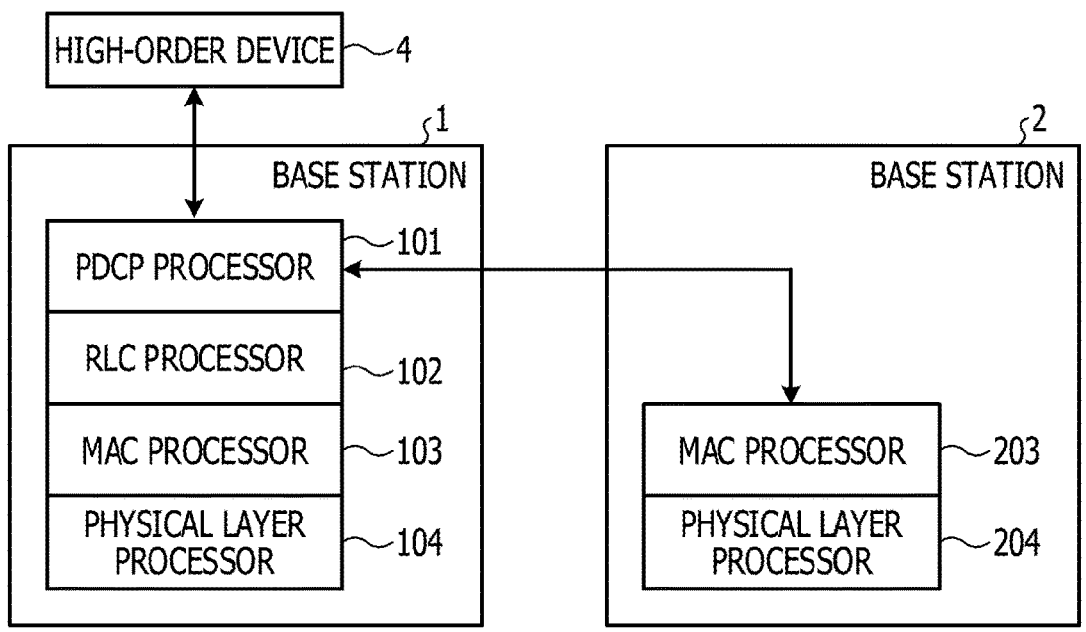
FIG. 33B is a diagram representing a configuration in which data is transferred from a PDCP processor of a base station which uses the licensed band to a RLC processor of a base station which uses the unlicensed band.

As illustrated in FIG. 33B, data also may be transferred from the PDCP processor 101 of the base station 1 using the licensed band to the MAC processor 203 of the base station 2 using the unlicensed band. FIG. 33B is a diagram representing a configuration in which data is transferred from the PDCP processor of a base station using the licensed band to the RLC processor of a base station using the unlicensed band. In this case, the RLC processor 202 and the MAC processor 203 respectively include a new RLC processing function and a new MAC processing function, respectively incorporating the conventional PDCP processing function and the conventional RLC processing function.

As described above, sharing the function of a base station using the licensed band and some of the functions of a base station using the unlicensed band enables one base station to include the function of a base station of the licensed band and some of the functions of a base station of the unlicensed band. This reduces the circuit scale of the base station and saves power consumption. Further, size of the base station may be reduced. Then, the smaller size reduces installation costs of the base station.

Figure 34A:
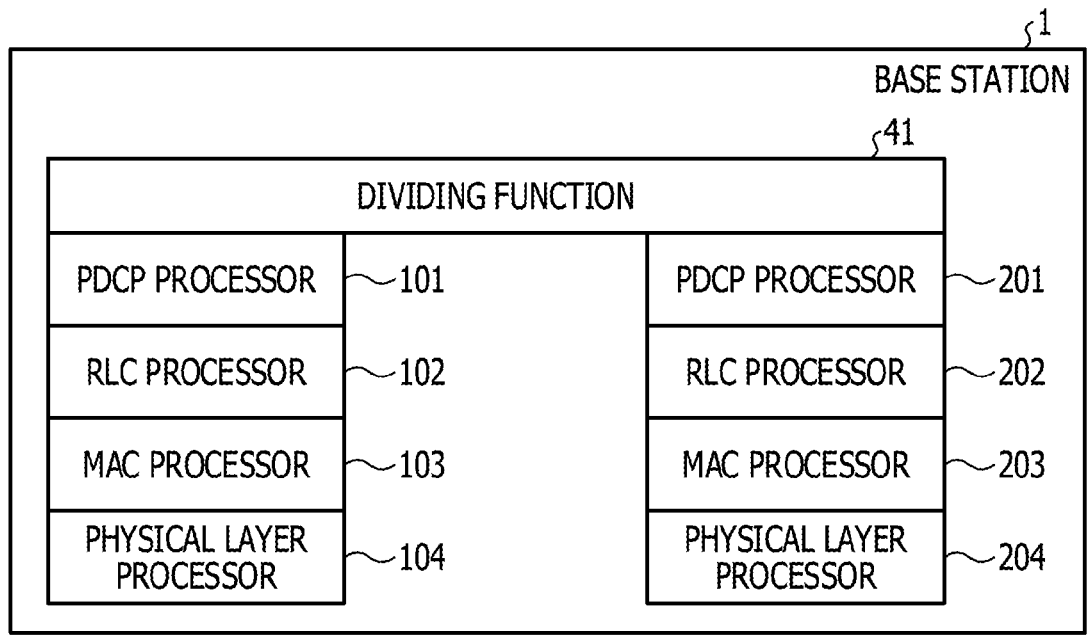
FIG. 34A is a diagram representing a configuration of dividing data in a high-order device within one base station.
Figure 34B:
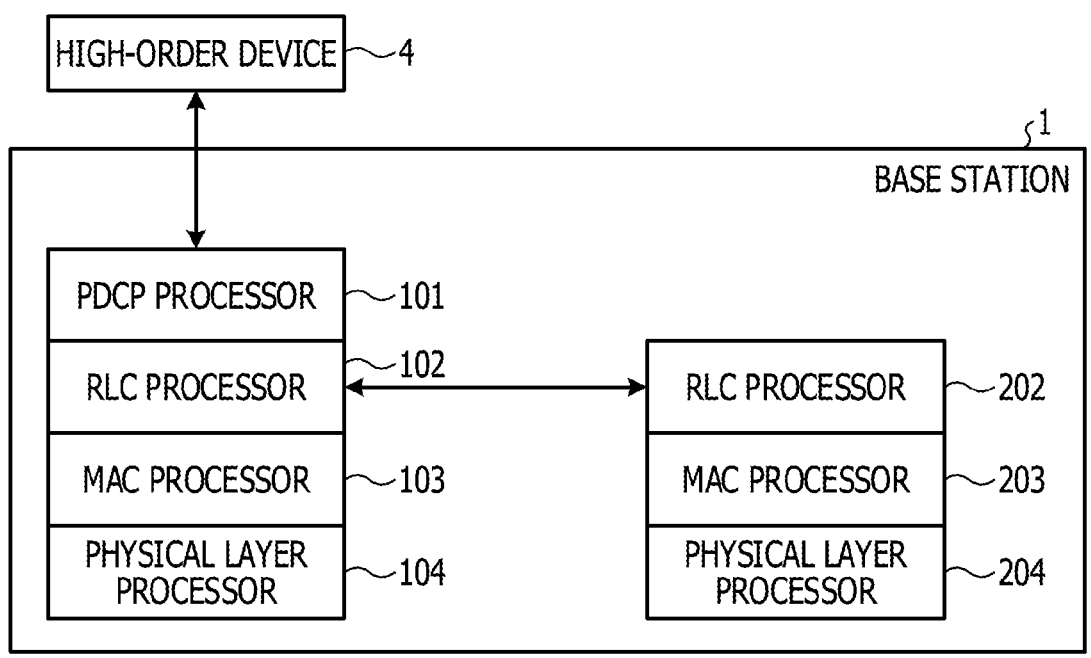
FIG. 34B is a diagram representing a configuration of sharing the PDCP processor within one base station.
Figure 34C:
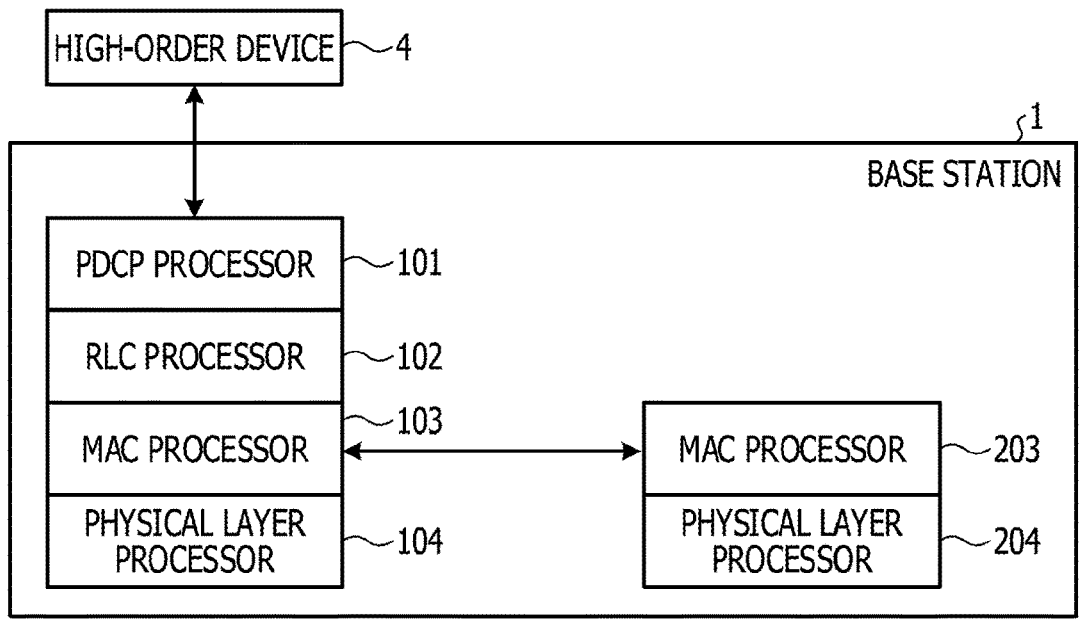
FIG. 34C is a diagram representing a configuration of sharing the PDCP processor and the RLC processor within one base station.
Figure 34D:
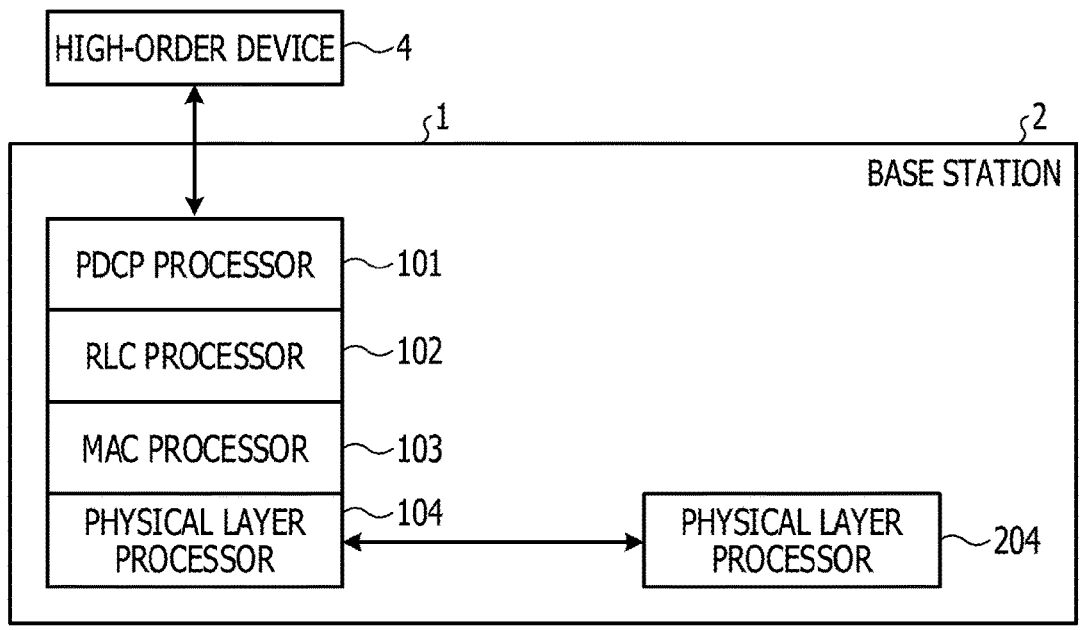
FIG. 34D is a diagram representing a configuration of sharing the PDCP processor, the RLC processor, and the MAC processor within one base station.

Further, in the first embodiment, configurations of the base station 1 using the licensed band and the base station 2 using the unlicensed band are different from each other. Meanwhile, as illustrated in FIGS. 34A to 34D, a function of communicating with the unlicensed band also may be incorporated into the base station 1. FIG. 34A is a diagram representing a configuration of segmenting data in a high-order device within one base station. FIG. 34B is a diagram representing a configuration of sharing the PDCP processor within one base station. FIG. 34C is a diagram representing a configuration of sharing the PDCP processor and the RLC processor within one base station. FIG. 34D is a diagram representing a configuration of sharing the PDCP processor, the RLC processor, and the MAC processor within one base station.

Further, when the function of a base station using the licensed band and the function of a base station using the unlicensed band are performed by devices different from each other, wiring such as an interface and an optical line is requested to connect the both with each other. Meanwhile, one device implementing the function of a base station using the unlicensed band and some of functions of a base station using the unlicensed band allows wiring such as an interface not to be used, and thereby reduces costs.

Sixth Embodiment

In the first embodiment, the network identification information is transmitted to the communication terminal 3 by including in the system information. Meanwhile, the sixth embodiment is different from the first embodiment in that the network identification information is transmitted to the communication terminal 3 by including in the RA response being a response to a RA preamble transmitted by the communication terminal 3. Since configurations of the base stations 1 and 2 and the communication terminal 3 according to the sixth embodiment are the same as those of the first embodiment, difference from the first embodiment is described below with reference to FIGS. 4, 9, and 10.

First, a base station 1 according to the sixth embodiment is described with reference to FIG. 4.

In FIG. 4, the radio channel controller 157 receives input of the RA preamble from the radio channel control information extractor 155. The radio channel controller 157 controls to reply the RA response to the RA preamble. The radio channel controller 157 outputs control information for the RA response to the radio channel control information generator 160. The radio channel controller 157 acquires the network identification information (in other word, network identification information of the cell 10) included in the system information stored in the system information management and storage unit 158, from the system information management and storage unit 158, and outputs the acquired network identification information to the radio channel control information generator 160.

The radio channel control information generator 160 receives input of control information for the RA response from the radio channel controller 157. The radio channel control information generator 160 receives input of the network identification information from the radio channel controller 157. Then, the radio channel control information generator 160 generates the RA response using the acquired control information. In this operation, the radio channel control information generator 160 generates the RA response including the network identification information of the cell 10. Then, the radio channel control information generator 160 outputs the generated RA response to the code modulator 166 and transmits to the communication terminal 3.

The radio channel control information generator 160 may generate the contention resolution including the network identification information of the cell 10.

Next, the base station 2 according to the sixth embodiment is described with reference to FIG. 9.

In FIG. 9, the radio channel controller 257 receives input of the RA preamble from the radio channel control information extractor 255. The radio channel controller 257 controls to reply the RA response to the RA preamble. The radio channel controller 257 outputs control information for the RA response to the radio channel control information generator 260. The radio channel controller 257 acquires the network identification information (in other word, network identification information of the cell 20) included in the system information stored in the system information management and storage unit 258 from the system information management and storage unit 258, and outputs the acquired network identification information to the radio channel control information generator 260.

The radio channel control information generator 260 receives input of the control information for the RA response from the radio channel controller 257. The radio channel control information generator 260 receives input of the network identification information from the radio channel controller 257. Then, the radio channel control information generator 260 generates the RA response using the acquired control information. In this operation, the radio channel control information generator 260 generates the RA response including the network identification information of the cell 20. Then, the radio channel control information generator 260 outputs the generated RA response to the code modulator 266 and transmits to the communication terminal 3.

Next, the communication terminal 3 according to the sixth embodiment is described with reference to FIG. 10.

In FIG. 10, the radio channel controller 324 acquires a RA response from the base station 1 or the base station 2 as control information extracted by the radio channel control information extractor 304. RA response transmitted from the base station 1 includes the network identification information of the cell 10, and a RA response transmitted from the base station 2 includes the network identification information of the cell 20.

When acquired the RA response transmitted from the base station 1, the radio channel controller 324 extracts the network identification information of the cell 10 from the RA response and stores the extracted network identification information into the system information storage unit 323. Thereafter, when acquired the RA response transmitted from the base station 2, the radio channel controller 324 extracts the network identification information of the cell 20 from the RA response and acquires the network identification information of the cell 10 from the system information storage unit 323. Then, the radio channel controller 324 compares the network identification information of the cell 10 and the network identification information of the cell 20 with each other.

When the network identification information of the cell 10 and the network identification information of the cell 20 match each other, the radio channel controller 324 ends the RA in the non-contention based random access procedure, or instructs the radio channel control information generator 333 to generate the scheduled transmission in the contention based random access procedure.

As described above, in the sixth embodiment, the network identification information is transmitted to the communication terminal 3 by including in the RA response. Thus, the communication terminal 3 may implement the CA that uses the unlicensed band in the SCell as in the first embodiment. Enabling of implementing the CA that uses the unlicensed band achieves high-speed transmission.

Now, description of first to sixth embodiments ends.

Selection basis of the base station of the CA target is not limited to the network identification information. For example, a base station that communicates using the licensed band may select a base station of the CA target communicating with the base station, based on whether a communication network to which the base station belongs and a communication network to which a base station communicating using the unlicensed band belongs are deemed identical with each other or the same. Also, for example, a base station that communicates using the licensed band may select a base station of the CA target communicating with the base station, by using information on a communication network to which the base station belongs and information on a communication network to which a base station communicating using the unlicensed band belongs.

Components illustrated in above embodiments may not to be physically configured in the same manner as illustrated. That is, specific forms of separation and integration of components are not limited to those illustrated herein, and components may be configured by functionally or physically separating and/or integrating a whole or a portion thereof on an optional basis depending on various loads and utilization status.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a first base station configured to communicate using a frequency within a licensed band;
   a plurality of second base stations configured to communicate using a frequency within an unlicensed band; and
   a communication terminal configured to be able to communicate with the first base station and any of the plurality of second base stations,
   wherein the communication terminal is further configured to
      detect first identification information broadcasted from the first base station, the first identification information indicating a first communication network to which the first base station belongs,
      generate a measurement report including a measurement result regarding one or more of the plurality of second base station,
      transmit the measurement report to the first base station,
      detect second identification information broadcasted from third base station selected by the first base station in accordance with the measurement report and being any of the plurality of second base stations, the second identification information indicating a second communication network to which the second base stations belong,
      establish a connection with the third base station when the second communication network indicated by the second identification information is same as the first communication network indicated by the first identification information,
      transmit a notification to the first base station when the second communication network indicated by the second identification information is not same as the first communication network indicated by the first identification information, the notification being configured to cause the first base station to execute a reselection processing.

2. The wireless communication system according to claim 1,
   wherein the first identification information is included in a random access response transmitted from the first base station to the communication terminal, and
   wherein the second identification information is included in a random access response transmitted from the second base station to the communication terminal, and
   wherein the communication terminal is configured to compare the first identification information and the second identification information with each other.

3. A communication terminal comprising:
   a radio circuit configured to be capable of simultaneously communicating with a first base station configured to communicate using a frequency for a licensed band and with a second base station configured to communicate using a frequency for an unlicensed band; and
   a processor coupled to the radio circuit and configured to
      detect first identification information broadcasted from the first base station, the first identification information indicating a first communication network to which the first base station belongs,
      generate a measurement report including a measurement result regarding one or more of the plurality of second base station,
      transmit the measurement report to the first base station,
      detect second identification information broadcasted from third base station selected by the first base station in accordance with the measurement report and being any of the plurality of second base stations, the second identification information indicating a second communication network to which the second base stations belong,
      establish a connection with the third base station when the second communication network indicated by the second identification information is same as the first communication network indicated by the first identification information,
      transmit a notification to the first base station when the second communication network indicated by the second identification information is not same as the first communication network indicated by the first identification information, the notification being configured to cause the first base station to execute a reselection processing.

4. A base station for wireless communication using a first frequency for a licensed band, the base station comprising:

a memory configured to store first identification information indicating a first communication network to which the base station belongs; and a processor coupled to the memory and configured to broadcast the first identification information by the first frequency, receive a measurement report from a communication terminal configured to be able to communicate with the base station and any of a plurality of second base stations which are configured to use a second frequency within an unlicensed band, the measurement report including a measurement result regarding one or more of the plurality of second base stations, select third base station being any of the plurality of second base stations to be established a connection with the communication terminal, in accordance with the measurement report, select new third base station being another one of the plurality of second base station after the base station receives a notification from the communication terminal, the communication terminal being configured to transmit the notification when the communication terminal determine that the first communication network indicated by the first identification information is not same as the second communication network indicated by second identification information, the second identification information being transmitted from the third base station and being received by the communication terminal and indicating a second communication network to which the third base station belongs.

5. A method for cell control in a wireless communication system including a first base station configured to communicate using a first frequency within a licensed band and a plurality of second base stations configured to communicate using a second frequency within an unlicensed band, and a communication terminal configured to be able to communicate with the base station and any of the plurality of second base stations, the method comprising:

broadcasting first identification information by the first frequency, the first identification information indicating a first communication network to which the base station belongs, receiving a measurement report from the communication terminal, the measurement report including a measurement result regarding one or more of the plurality of second base stations, selecting third base station being any of the plurality of second base stations to be established a connection with the communication terminal, in accordance with the measurement report, selecting new third base station being another one of the plurality of second base station after the base station receives a notification from the communication terminal, the communication terminal being configured to transmit the notification when the communication terminal determine that the first communication network indicated by the first identification information is not same as the second communication network indicated by second identification information, the second identification information being transmitted from the third base station and being received by the communication terminal and indicating a second communication network to which the third base station belongs.

* * * * *